US011575779B2

(12) United States Patent
Moon et al.

(10) Patent No.: US 11,575,779 B2
(45) Date of Patent: Feb. 7, 2023

(54) ELECTRONIC DEVICE INCLUDING DISPLAY WITH BENT AREA

(71) Applicant: Samsung Electronics Co., Ltd., Suwon-si (KR)

(72) Inventors: Hee-Cheul Moon, Seongnam-si (KR); Sang-In Baek, Suwon-si (KR); Kwon-Ho Son, Suwon-si (KR); Min-Sung Lee, Suwon-si (KR); Bong-Suk Choi, Seoul (KR); Gyeong-Tae Kim, Suwon-si (KR); Jae-Il Seo, Suwon-si (KR); Na-Young Chu, Gumi-si (KR); Kyung-Pil Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 146 days.

(21) Appl. No.: 16/692,376

(22) Filed: Nov. 22, 2019

(65) Prior Publication Data
US 2020/0092408 A1 Mar. 19, 2020

Related U.S. Application Data

(63) Continuation of application No. 15/402,695, filed on Jan. 10, 2017, now Pat. No. 10,530,912, which is a (Continued)

(30) Foreign Application Priority Data
May 7, 2015 (KR) .................. 10-2015-0063939

(51) Int. Cl.
H04M 1/02 (2006.01)
H04M 1/18 (2006.01)
H04B 1/3827 (2015.01)

(52) U.S. Cl.
CPC .......... H04M 1/0268 (2013.01); H04B 1/385 (2013.01); H04M 1/0202 (2013.01); H04M 1/0266 (2013.01); H04M 1/185 (2013.01)

(58) Field of Classification Search
CPC ............... H04M 1/0268; H04M 1/185; H04M 1/0266; H04B 1/385; H05K 5/03;
(Continued)

(56) References Cited

U.S. PATENT DOCUMENTS 5,176,733 A 1/1993 Koss
D609,233 S 2/2010 Wood et al.
(Continued)

FOREIGN PATENT DOCUMENTS

CN 101727234 A 6/2010
CN 102110887 A 6/2011
(Continued)

OTHER PUBLICATIONS

Powerful Xiaomi New Flagship—Mi Note, YouTube, Jan. 2015 https://www.youtube.com/watch?v=-pboav4GXPQ (Year: 2015).*
(Continued)

Primary Examiner — Jianxun Yang
(74) Attorney, Agent, or Firm — Jefferson IP Law, LLP

(57) ABSTRACT

A portable electronic device is provided. The electronic device includes a transparent front glass cover including a planar portion that forms a front surface of the electronic device, a planar rear glass cover that forms a rear surface of the electronic device, a metal bezel that surrounds a space formed by the front glass cover and the rear glass cover, and a flexible display device that is embedded in the space and exposed through the front glass cover. The front cover includes a left bent portion and a right bent portion on the left and right of the planar portion at the center of the front cover.

15 Claims, 93 Drawing Sheets

Related U.S. Application Data continuation of application No. 14/990,458, filed on Jan. 7, 2016, now Pat. No. 9,578,149.

(60) Provisional application No. 62/113,108, filed on Feb. 6, 2015.

(58) Field of Classification Search
CPC ............ H05K 3/0014; H05K 2201/057; C03B 40/04; H01Q 1/243; H01Q 13/10; G06F 3/0488; G06F 1/1637; G06F 2203/04102; G06F 2203/04103
See application file for complete search history.

(56) References Cited

U.S. PATENT DOCUMENTS

| | | |
|---|---|---|
| D687,800 S | 8/2013 | Lee |
| 8,737,045 B2 | 5/2014 | Dai et al. |
| 8,896,563 B2 | 11/2014 | Myers |
| 9,047,044 B2 | 6/2015 | Raff |
| 9,454,179 B2 | 9/2016 | Shin et al. |
| 9,557,770 B2 | 1/2017 | Shin et al. |
| 9,894,787 B2 | 2/2018 | Merz et al. |
| 10,234,906 B2 | 3/2019 | Meyers et al. |
| 10,411,327 B2 | 9/2019 | Kim et al. |
| 11,031,717 B2 | 6/2021 | Cho et al. |
| 11,056,769 B2 | 7/2021 | Jeon et al. |
| 2003/0019662 A1 | 1/2003 | Higuchi et al. |
| 2003/0103510 A1 | 6/2003 | Svanberg et al. |
| 2006/0089171 A1 | 4/2006 | Yoo et al. |
| 2009/0040115 A1 | 2/2009 | Zhang et al. |
| 2009/0256759 A1 | 10/2009 | Hill et al. |
| 2010/0090981 A1 | 4/2010 | Park et al. |
| 2010/0315769 A1 | 12/2010 | Mathew et al. |
| 2011/0186345 A1 | 8/2011 | Pakula et al. |
| 2011/0228494 A1 | 9/2011 | Xiao |
| 2011/0241949 A1 | 10/2011 | Nickel et al. |
| 2011/0287812 A1 | 11/2011 | Joo |
| 2012/0013510 A1 | 1/2012 | Yagi et al. |
| 2012/0021701 A1 | 1/2012 | Wong et al. |
| 2012/0044123 A1 | 2/2012 | Rothkopf et al. |
| 2012/0050962 A1 | 3/2012 | Hsiung |
| 2012/0175165 A1 | 7/2012 | Merz et al. |
| 2012/0178503 A1 | 7/2012 | Merz et al. |
| 2012/0218723 A1 | 8/2012 | Kwak et al. |
| 2012/0229347 A1 | 9/2012 | Jin et al. |
| 2012/0243151 A1 | 9/2012 | Lynch |
| 2012/0314350 A1 | 12/2012 | Choi et al. |
| 2013/0250504 A1 | 9/2013 | Choi |
| 2013/0300697 A1 | 11/2013 | Kim et al. |
| 2013/0303092 A1 | 11/2013 | Penafiel |
| 2013/0318766 A1 | 12/2013 | Kiple et al. |
| 2013/0321237 A1 | 12/2013 | Woodhull et al. |
| 2013/0323579 A1 | 12/2013 | Hwang et al. |
| 2013/0343015 A1 | 12/2013 | Malek et al. |
| 2014/0080552 A1 | 3/2014 | Yoon et al. |
| 2014/0085780 A1 | 3/2014 | Hsu et al. |
| 2014/0085836 A1 | 3/2014 | Mo et al. |
| 2014/0091983 A1 | 4/2014 | Nakano et al. |
| 2014/0099527 A1 | 4/2014 | Seong et al. |
| 2014/0104762 A1 | 4/2014 | Park |
| 2014/0111927 A1 | 4/2014 | Raff |
| 2014/0153211 A1 | 6/2014 | Malek et al. |
| 2014/0198436 A1 | 7/2014 | Lim et al. |
| 2014/0218878 A1 | 8/2014 | Choi et al. |
| 2014/0228080 A1 | 8/2014 | Choi et al. |
| 2014/0233170 A1 | 8/2014 | Hobson et al. |
| 2014/0234581 A1 | 8/2014 | Immerman et al. |
| 2014/0267097 A1 | 9/2014 | Lee et al. |
| 2014/0307370 A1 | 10/2014 | Zadesky et al. |
| 2014/0311767 A1 | 10/2014 | Merz et al. |
| 2014/0323063 A1 | 10/2014 | Xu et al. |
| 2014/0335322 A1 | 11/2014 | Luo et al. |
| 2014/0361671 A1 | 12/2014 | Degner et al. |
| 2014/0367237 A1 | 12/2014 | Taylor et al. |
| 2014/0368228 A1 | 12/2014 | Kim |
| 2015/0007501 A1 | 1/2015 | Liang |
| 2015/0070236 A1 | 3/2015 | Walters et al. |
| 2015/0070825 A1 | 3/2015 | Perko et al. |
| 2015/0140291 A1 | 5/2015 | Kim |
| 2015/0155614 A1 | 6/2015 | Youn et al. |
| 2016/0182112 A1 | 6/2016 | Kim et al. |
| 2016/0254588 A1 | 9/2016 | Kim et al. |
| 2017/0041443 A1 | 2/2017 | Rostami |
| 2017/0060182 A1 | 3/2017 | Shin et al. |
| 2017/0322480 A1 | 11/2017 | Kanemaki et al. |
| 2018/0168058 A1 | 6/2018 | Merz et al. |
| 2020/0052428 A1 | 2/2020 | Cho et al. |

FOREIGN PATENT DOCUMENTS

| | | |
|---|---|---|
| CN | 202262106 U | 5/2012 |
| CN | 102684722 A | 9/2012 |
| CN | 102710817 A | 10/2012 |
| CN | 103296385 A | 9/2013 |
| CN | 203260731 U | 10/2013 |
| CN | 103458641 A | 12/2013 |
| CN | 203386889 U | 1/2014 |
| CN | 103685627 A | 3/2014 |
| CN | 203466292 U | 3/2014 |
| CN | 103702540 A | 4/2014 |
| CN | 203589193 U | 5/2014 |
| CN | 103987218 A | 8/2014 |
| CN | 103987223 A | 8/2014 |
| CN | 104051842 A | 9/2014 |
| CN | 203895602 U | 10/2014 |
| CN | 104167605 A | 11/2014 |
| CN | 105376354 A | 3/2016 |
| CN | 105892568 A | 8/2016 |
| EP | 2498336 A2 | 9/2012 |
| EP | 2533502 A1 | 12/2012 |
| EP | 2709283 A1 | 3/2014 |
| EP | 2993872 A1 | 3/2016 |
| JP | 2014/219989 A | 11/2014 |
| KR | 10-0716761 B1 | 5/2007 |
| KR | 10-2008-0043998 A | 5/2008 |
| KR | 10-2010-0136719 A | 12/2010 |
| KR | 10-2011-0006039 A | 1/2011 |
| KR | 10-2011-0080630 A | 7/2011 |
| KR | 10-2011-0127483 A | 11/2011 |
| KR | 10-2013-0014784 A | 2/2013 |
| KR | 10-2013-0015535 A | 2/2013 |
| KR | 10-2013-0099499 A | 6/2013 |
| KR | 10-1279793 B1 | 6/2013 |
| KR | 10-2013-011711 A | 10/2013 |
| KR | 10-2013-0127050 A | 11/2013 |
| KR | 10-2013-0135386 A | 12/2013 |
| KR | 10-2014-0101240 A | 8/2014 |
| KR | 10-2014-0113178 A | 9/2014 |
| KR | 10-1529933 B1 | 6/2015 |
| KR | 10-2015-0136934 A | 12/2015 |
| KR | 10-2016-0018164 A | 2/2016 |
| WO | 2015/001181 A1 | 1/2015 |

OTHER PUBLICATIONS

Samsung To Release New 4.99 Inch touch screen phone, tekArticle, 2013 http://tekarticles.com/article/samsung-to-release-new-4-99-inch-touch-screen-phone-906/ (Year: 2013).*

Samsung shows off flexible OLED phone prototype, D'Orazio, 2013; Samsung shows off flexible OLED phone prototype, D'Orazio, 2013 (Year: 2013).*

Xiaomi announces new Mi Note phablet, gsmarena, Jan. 2015; https://www.gsmarena.com/xiaomi_announced_new_mi_note_phablet_with_57inch_display-news-10772.php (Year: 2015).*

Australian Office Action dated Nov. 3, 2020, issued in Australian Application No. 2019204571.

Korean Office Action dated Jan. 4, 2021, issued in Korean Application No. 10-2015-0063939.

Korean Office Action dated Jan. 7, 2021, issued in Korean Application No. 10-2015-0060745.

(56) References Cited

OTHER PUBLICATIONS

Australian Examination Report dated Jul. 20, 2020, issued in Australian Application No. AU2019204571.
European Office Action dated Aug. 13, 2020, issued in European Application No. 16150921.1.
Indian Office Action dated Aug. 24, 2020, issued in Indian Application No. 201717028192.
European Office Action dated May 4, 2021, issued in European Application No. 19155149.8.
Partial European Search Report dated Jul. 5, 2021, issued in European Application No. 21176586.2.
"Notice of Patent Grant", dated Jun. 29, 2021, in Korean Application No. 10-2015-0063939.
Thomas Halleck, "Samsung Will Release Galaxy S6 With Two Curved Edges, A Glass Back And Non-Removable Battery, Reports Say", http://www.ibtimes.com/samsung-will-release-galaxy-s6-two-curved-edges-glass-back-non-removable-battery-1788104, published on Jan. 20, 2015.
Michael Maier, "MWC: Samsung teasert Galaxy S6 Edge an, TechStage", http://www.techstage.de/news/mwc-samsung-teasert-Galaxy-S6-Edge-an-2535441.html, published on Feb. 3, 2015.
Mark Prigg, Samsung's Galaxy S6 could have curved screens that cover its sides: 'special edition' handset is set to take on Apple's iPhone 6, MailOnline, Jan. 20, 2015.
U.S. Office Action dated Jan. 17, 2018, issued in U.S. Appl. No. 14/996,149.
U.S. Office Action dated Feb. 13, 2018, issued in U.S. Appl. No. 14/997,126.
European Search Report dated Mar. 6, 2018, issued in European Patent Application No. 17209860.0.
Chinese Office Action dated May 23, 2018, issued in Chinese Application No. CN201610023927.6.
Chinese Office Action dated May 25, 2018, issued in Chinese Application No. CN201610028066.0.
Australian Office Action dated Jun. 7, 2018, issued in Australian Patent Application No. AU2016216322.
Chinese Office Action dated Jun. 21, 2018, issued in Chinese Patent Application No. CN201610027955.5.
European Office Action dated Nov. 2, 2018, issued in European Application No. 16 150 921.1-1216.
Chinese National Intellectual Property Administration Office Action dated Nov. 23, 2018, issued in the Chinese Application No. 201610027955.5.
Chinese National Intellectual Property Administration Office Action dated Oct. 12, 2018, issued in the Chinese Application No. 201610023927.6.
Australian Government Examination Report No. 3 dated Oct. 19, 2018, issued in Australian Application No. 2016216322.
U.S. Office Action dated Nov. 11, 2018, issued in the U.S. Appl. No. 14/997,126.
Australian Notice of Acceptance dated Mar. 22, 2019; Reference #: P106553.AU; Application #: 2016216322.
U.S. Final Office Action for related case dated Feb. 27, 2019; Application #: U.S. Appl. No. 14/997,126.
Extended European Search Report dated May 28, 2019, issued in a counterpart European Application No. 19155149.8-1216.
Chinese Reexamination Notice dated May 22, 2019, issued in a counterpart Chinese application No. 201610023927.6.
Chinese Notice of Allowance dated May 22, 2019, issued in a counterpart Chinese application No. 201610027955.5.

"Mail Online"; Samsung's Galaxy S6 could have curved screens that cover its sides: 'special edition' handset is set to take on Apple's iPhone 6; May 11, 2016.
Chinese Decision of Reexamination dated Oct. 25, 2019, issued in Chinese Patent Application No. 201610023927.6.
U.S. Non-Final Office Action dated Aug. 23, 2019, issued in U.S. Appl. No. 14/997,126.
Australian Notice of Acceptance dated Feb. 3, 2021, issued in Australian Application No. 2019204571.
Samsung To Release New 4.99 inch touch screen phone, tekArticle, Jan. 19, 2013, tekarticles.com/article/samsung-to-release-new-4-99-inch-touch-screen-phone-906/.
Hands on Xiaomi Mi Note, Seng, Jan. 15, 2015, hardwarezone.eom.sg/feature-hands-xiaomi-mi-not.
Motorola Moto X (2nd Gen), DetroitBORG, Oct. 2, 2014, youtube.com/watch?v=v8XJy0a4IG8.
"MWC: Samsung teasert Galaxy S6 Edge," Techstage, techstage.de/pwe3y02, Mar. 2, 2012.
"Samsung aims for variety with Galaxy S6, leaked photo suggests," cnet.com/tech/mobile/leaked-photos-is-this-the-samsung-galaxy-s6/ CNET Tech, Feb. 5, 2015.
"Samsung Galaxy S5 Review," UNDERkg, youtube.com/watch?v=-IQ5TLYE3F4 (English CC available), Apr. 9, 2014.
Korean Office Action dated Oct. 4, 2021, issued in Korean Application No. 10-2021-0119126.
U.S. Non Final Office Action dated Sep. 9, 2021, issued in U.S. Appl. No. 16/880,637.
European Office Action dated Sep. 13, 2021, issued in European Application No. 21176586.2.
Korean Notice of Patent Grant dated Jul. 24, 2021, issued in Koran Application No. 10-2015-0060745.
U.S. Final Office Action dated Feb. 3, 2022, issued in U.S. Appl. No. 16/880,637.
Korean Office Action dated Dec. 6, 2021, issued in Korean Application No. 10-2021-0137736.
Maier: "MWC: Samsung teasert Galaxy S6 Edge . . . ", https www.techstage.de/news/mwc-samsung-teasert-galaxy-s6-edge-an/pwe3y02, Mar. 2, 2015.
Healey et al.: "Samsung aims for variety with Galaxy S6", https www.cnet.com/tech/mobile/leaked-photos-is-this-the-samsung-galaxy-s6/, Feb. 5, 2015.
Hall: "Let's talk about the Samsung Galaxy S Edge", https www.pocket-lint.com/phones/news/samsung/132513-let-s-talk-about-the-samsung-galaxy-s-edge, Feb. 2, 2015.
UNDERkg: "Samsung Galaxy S5 Review", https www.youtube.com/watch?v=-IQ5TLYE3F4, Apr. 9, 2014.
Korean Office Action dated Apr. 21, 2022, issued in Korean Application No. 10-2021-0119126.
Notice of Patent Grant dated Jun. 24, 2022, issued in Korean Application No. 10-2021-0137736.
U.S. Non-Final Office Action dated Jun. 8, 2022, issued in U.S. Appl. No. 16/880,637.
Summons to attend oral proceedings dated Jul. 15, 2022, issued in European Application No. 19155149.8.
Substantive Examination Clear Report dated Aug. 10, 2022, issued in Malaysian Application No. MYPI2017702879.
European Office Action dated Mar. 4, 2020, issued in European Application No. 19155149.8-1216.
Notice of Patent Grant dated Oct. 30, 2022, issued in Korean Application No. 10-2021-0119126.

\* cited by examiner

ELECTRONIC DEVICE INCLUDING DISPLAY WITH BENT AREA

CROSS-REFERENCE TO RELATED APPLICATION(S)

This application is a continuation application of prior application Ser. No. 15/402,695, filed on Jan. 10, 2017, which is a continuation application of prior application Ser. No. 14/990,458, filed on Jan. 7, 2016, which issued as U.S. Pat. No. 9,578,149 on Feb. 21, 2017, which claimed the benefit under 35 U.S.C. § 119(e) of a U.S. provisional patent application filed on Feb. 6, 2015 in the United States Patent and Trademark Office and assigned Ser. No. 62/113,108, and under 35 U.S.C. § 119(a) of a Korean patent application filed on May 7, 2015 in the Korean Intellectual Property Office and assigned Serial number 10-2015-0063939, the entire disclosure of each of which is hereby incorporated by reference.

TECHNICAL FIELD

The present disclosure relates to an electronic device. More particularly, the present disclosure relates to an electronic device that includes a display with a bent or curved area.

BACKGROUND

With the advancement of electronic communication technologies, electronic devices having various functions have appeared. Such electronic devices generally have a convergence function that performs one or more function compositely.

As the functional differences between electronic devices of respective manufacturers have recently been greatly reduced, the manufacturers tend to make an effort to increase the rigidity of the electronic devices, which are being gradually slimmed in order to satisfy consumers' purchasing needs, and to strengthen the design features of the electronic devices. As a part of the effort, various structures (e.g., exteriors) of the electronic devices are at least partially implemented by using a metal material so as to appeal to the luxuriousness and elegance of the exterior of electronic devices.

In addition, terminal manufacturers make an effort to deliver intuitive and diverse information to users through slimmed electronic devices, and as a part of the effort, the terminal manufacturers tend to release displays of various shapes to display information.

Further, the manufacturers make an effort to address, for example, a weakened rigidity issue, a ground issue (e.g., an electric shock issue), and the issue of reduced antenna radiating performance, which are encountered when a metal material is used.

Electronic devices of the related art have adopted standardized planar displays as an information output means. Such displays promote information delivery merely by enlarging a screen thereof. As such, it is unavoidable that the entire volume of the electronic devices increase by the enlarged area of the display. In addition, since the standardized planar displays allow information to be confirmed in only one direction according to the disposed condition of the electronic devices, the information delivery capability is inevitably limited.

Therefore, a need exists for an electronic device that includes a display with a bent or curved area.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device including a display with a bent area.

Another aspect of the present disclosure is to provide an electronic device including a display with a bent area, which is configured to enable information delivery in various directions.

Another aspect of the present disclosure is to provide an electronic device including a display with a bent area, which is capable of improving the convenience of use by intuitively providing diverse information to users.

In accordance with an aspect of the present disclosure, an electronic device is provided. The electronic device includes a transparent front glass cover that includes a planar surface that forms a front surface of the electronic device, a planar rear glass cover that forms a rear surface of the electronic device, a metal bezel that surrounds a space formed by the front glass cover and the rear glass cover, and a flexible display device that is embedded in the space and exposed through the front glass cover.

The front glass cover includes a first curved surface that extends from a first side edge of the planar surface, and a second curved surface that extends from a second side edge of the planar surface and is formed opposite to the first curved surface. The flexible display device includes a touch screen that extends along the first curved surface, the planar surface, and the second curved surface.

The metal bezel includes a first side surface that encloses an edge of the first curved surface, a second side surface that encloses an edge of the second curved surface, a third side surface that interconnects one end of the first side surface and one end of the second side surface, and a fourth side surface that interconnects the other end of the first side surface and the other end of the second side surface.

The first side surface and the second side surface have a first height, and the third side surface and the fourth side surface have a second height that is larger than the first height.

In accordance with another aspect of the present disclosure, an electronic device is provided. The electronic device includes a transparent front glass cover that includes a first planar surface that forms a front surface of the electronic device, a planar rear glass cover that includes a second planar surface that forms a rear surface of the electronic device, a metal bezel that surrounds a space formed by the front glass cover and the rear glass cover, and a flexible display device that is embedded in the space and exposed through the front glass cover.

The front glass cover includes a first curved surface that extends from a first side edge of the first planar surface, and a second curved surface that extends from a second side edge of the first planar surface and is formed opposite to the first curved surface.

The rear glass cover includes a third curved surface that extends from a first side edge of the second planar surface, and a fourth curved surface that extends from a second side edge of the second planar surface and is formed opposite to the third curved surface.

The flexible display device includes a touch screen that extends along the first curved surface, the first planar surface, and the second curved surface.

The metal bezel includes a first side surface that encloses edges of the first curved surface and the third curved surface, a second side surface that encloses edges of the second curved surface and the fourth curved surface, a third side surface that interconnects one end of the first side surface and one end of the second side surface, and a fourth side surface that interconnects the other end of the first side surface and the other end of the second side surface.

The first side surface and the second side surface have a first height and the third side surface and the fourth side surface have a second height that is larger than the first height.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
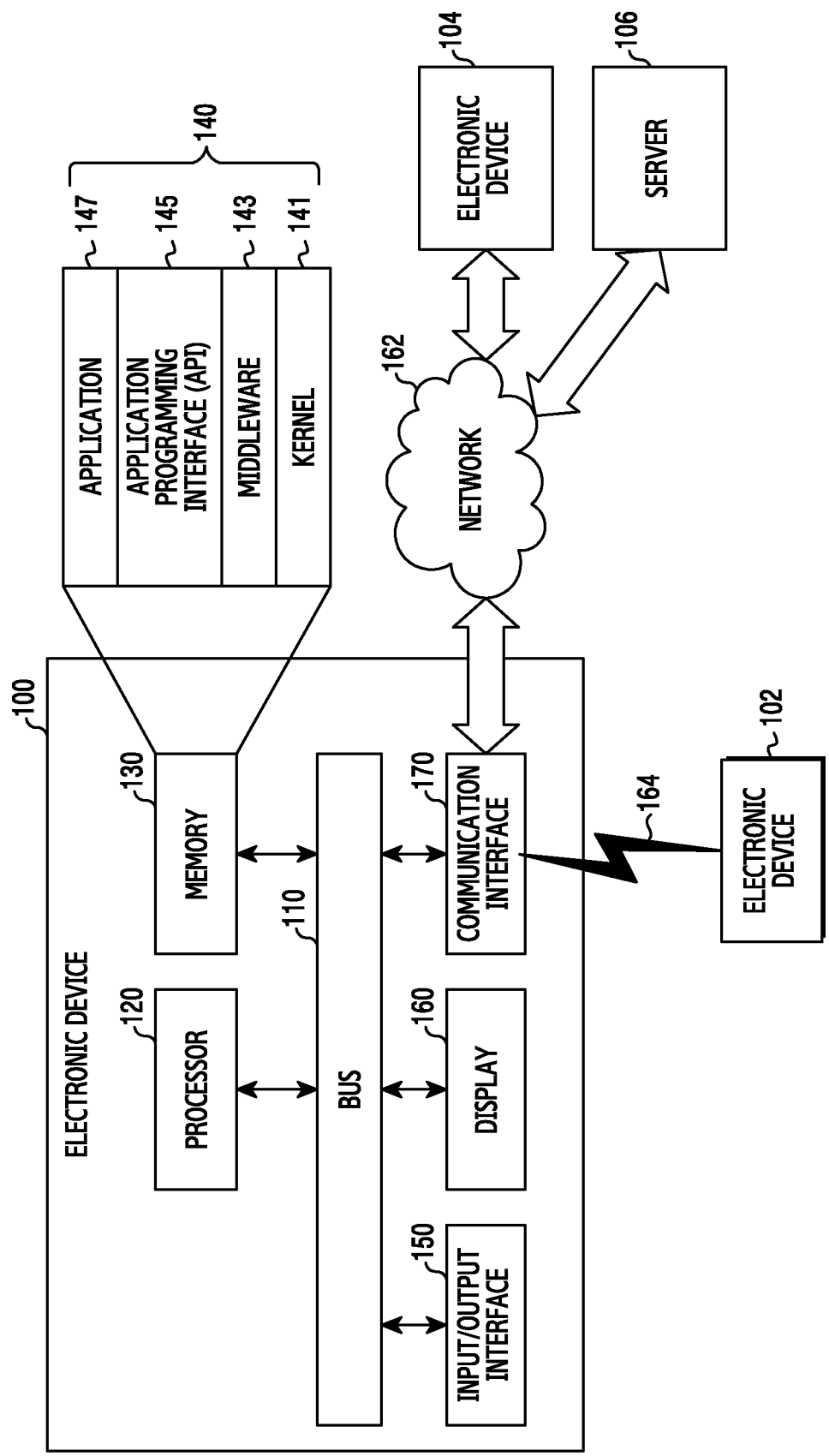
FIG. 1 is a block diagram of a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have", "may have", "include", or "may include" as used herein indicate the presence of disclosed corresponding functions, operations, elements, and the like, and do not limit additional one or more functions, operations, elements, and the like. In addition, the terms "include" or "have" indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" as used herein include any and all combinations of words enumerated with it. For example, "A or B", "at least one of A and B" or "at least one of A or B" describes (1) including A, (2) including B, or (3) including both A and B.

Although terms, such as "first" and "second" as used herein may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be named a second element without departing from the scope of the present disclosure, and similarly, a second element may be named a first element.

When an element (e.g., a first element) is "connected to" or "(operatively or communicatively) coupled with/to" another element (e.g., a second element), the first element may be directly connected or coupled to the second element, and there may be an intervening element (e.g., a third element) between the first element and the second element. To the contrary, when an element (e.g., the first element) is "directly connected" or "directly coupled" to another element (e.g., the second element), there is no intervening element (e.g., the third element) between the first element and the second element.

The expression "configured to (or set to)" as used herein may be replaced with "suitable for", "having the capacity to", "designed to", "adapted to", "made to", or "capable of" according to the situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments of the present disclosure and are not intended to limit the present disclosure. Further, all the terms used herein, including technical and scientific terms, should be interpreted to have the same meanings as commonly understood by those skilled in the art to which the present disclosure pertains, and should not be interpreted to have ideal or excessively formal meanings, unless explicitly defined herein.

A module or programming module, according to various embodiments of the present disclosure, may further include at least one or more constituent elements among the aforementioned constituent elements, or may omit some of them, or may further include additional constituent elements. Operations performed by a module, programming module, or other constituent elements may be executed in a sequential, parallel, repetitive, or heuristic manner. In addition, some of the operations may be executed in a different order or may be omitted, or other operations may be added.

An electronic device, according to various embodiments of the present disclosure, may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device (e.g., a head-mounted-device (HMD), an electronic glasses, an electronic clothing, an electronic bracelet, an electronic necklace, an electronic appcessory, an electronic tattoo, a smart mirror, a smart watch, and the like).

An electronic device may also be a smart home appliance. For example, smart home appliances may include at least one of a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® PlayStation®), an electronic dictionary, an electronic key, a camcorder, an electronic frame, and the like.

An electronic device may also include at least one of a medical equipment (e.g., a mobile medical device (e.g., a blood glucose monitoring device, a heart rate monitor, a blood pressure monitoring device, a temperature meter, and the like), a magnetic resonance angiography (MRA) machine, a magnetic resonance imaging (MRI) machine, a computed tomography (CT) scanner, an ultrasound machine, and the like), a navigation device, a global positioning system (GPS) receiver, an event data recorder (EDR), a flight data recorder (FDR), an in-vehicle infotainment device, an electronic equipment for a ship (e.g., a ship navigation equipment and/or a gyrocompass), an avionics equipment, a security equipment, a head unit for vehicle, an industrial or home robot, an automatic teller machine (ATM), point of sale (POS) device, or an internet of things device (e.g., a light bulb, various sensors, an electronic meter, a gas meter, a sprinkler, a fire alarm, a thermostat, a streetlamp, a toaster, a sporting equipment, a hot-water tank, a heater, a boiler, and the like).

An electronic device may also include at least one of a piece of furniture or a building/structure, an electronic board, an electronic signature receiving device, a projector, and various measuring instruments (e.g., a water meter, an electricity meter, a gas meter, a wave meter, and the like).

An electronic device may also include a combination of one or more of the above-mentioned devices.

Further, it will be apparent to those skilled in the art that an electronic device is not limited to the above-mentioned examples.

Herein, the term "user" may indicate a person who uses an electronic device or a device (e.g., an artificial intelligence electronic device) that uses the electronic device.

An electronic device of a single radio environment can provide long-term evolution (LTE) service using circuit switched fall back (CSFB) which determines whether paging information of a CS service network is received over an LTE network. When receiving a paging signal of the CS service network over the LTE network, the electronic device connects (or accesses) the CS service network (e.g., a 2nd generation (2G)/$3^{rd}$ generation (3G) network) and provides a voice call service. For example, the 2G network can include one or more of a global system for mobile communications (GSM) network and a code division multiple access (CDMA) network. The 3G network can include one or more of a wideband-CDMA (WCDMA) network, a time division-synchronous CDMA (TD-SCDMA) network, and an evolution-data optimized (EV-DO) network.

Alternatively, the electronic device of the single radio environment can provide LTE service using single radio LTE (SRLTE) which determines whether the paging information is received by periodically switching every radio resource (e.g., receive antennas) to the CS service network (e.g., the 2G/3G network). Upon receiving the paging signal of the CS service network, the electronic device provides the voice call service by connecting the CS service network (e.g., the 2G/3G network).

Alternatively, the electronic device of the single radio environment can provide LTE service using single radio dual system (SRDS) which determines whether the paging information is received by periodically switching some of radio resources (e.g., receive antennas) to the CS service network (e.g., the 2G/3G network). Upon receiving the paging signal of the CS service network, the electronic device provides the voice call service by connecting the CS service network (e.g., the 2G/3G network).

FIG. 1 is a block diagram of a configuration of an electronic device according to various embodiments of the present disclosure.

Referring to FIG. 1, an electronic device 100 includes a bus 110, a processor 120, a memory 130, an input/output interface 150, a display 160, and a communication interface 170. In various embodiments of the present disclosure, the electronic device 100 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a CPU, an AP, and a communication processor (CP). The processor 120 processes an operation or data on control of and/or communication with another component of the electronic device 100.

The processor 120, which is connected to the LTE network, determines whether a call is connected over the CS service network using caller identification information (e.g., a caller phone number) of the CS service network (e.g., the 2G/3G network). For example, the processor 120 receives incoming call information (e.g., a CS notification message or a paging request message) of the CS service network over the LTE network (e.g., CSFB). For example, the processor 120 being connected to the LTE network receives incoming call information (e.g., a paging request message) over the CS service network (e.g., SRLTE).

When receiving the incoming call information (e.g., a CS notification message or a paging request message) of the CS service network over the LTE network, the processor 120 obtains caller identification information from the incoming call information. The processor 120 displays the caller identification information on its display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 obtains caller identification information from the incoming call information. The processor 120 determines whether to connect the call by comparing the caller identification information with a reception control list. For example, when the caller identification information is included in a first reception control list (e.g., a blacklist), the processor 120 restricts the voice call connection and maintains the connection to the LTE network. For example, when the caller identification information is not included in the first reception control list (e.g., the blacklist), the processor 120 connects the voice call by connecting to the CS service network. For example, when the caller identification information is included in a second reception control list (e.g., a white list), the processor 120 connects the voice call by connecting to the CS service network.

When receiving the incoming call information (e.g., a paging request message) of the CS service network over the LTE network, the processor 120 transmits an incoming call response message (e.g., a paging response message) to the CS service network. The processor 120 suspends the LTE service and receives the caller identification information (e.g., a CS call (CC) setup message) from the CS service network. The processor 120 determines whether to connect the call by comparing the caller identification information with the reception control list. For example, when the caller identification information is included in the first reception control list (e.g., the blacklist), the processor 120 restricts the voice call connection and resumes the LTE network connection. For example, when the caller identification information is not included in the first reception control list (e.g., the blacklist), the processor 120 connects the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. The memory 130 stores commands or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 controls or manages system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 connects the individual elements of the electronic device 100 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources (e.g., the bus 110, the processor 120, the memory 130, and the like) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, and the like.

The input/output interface 150 functions as an interface that transfers instructions or data input from a user or another external device to the other element(s) of the electronic device 100. Furthermore, the input/output interface 150 outputs the instructions or data received from the other element(s) of the electronic device 100 to the user or an external electronic device.

The display 160 may include a liquid crystal display (LCD), a light emitting diode (LED) display, an organic LED (OLED) display, a micro electro mechanical system (MEMS) display, an electronic paper display, and the like. The display 160 displays various types of content (e.g., a text, images, videos, icons, symbols, and the like) for the user. The display 160 may include a touch screen and receive, for example, a touch, a gesture, proximity, a hovering input, and the like, using an electronic pen or the user's body part. The display 160 may display a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102 through a wireless communication or a wired communication 164, and also communicate with the second external electronic device 104, or the server 106 in connection to a network 162 through wireless communication or wired communication. For example, the wireless communication can conform to a cellular communication protocol including at least one of LTE, LTE-advanced (LTE-A), CDMA, WCDMA, universal mobile telecommunications system (UMTS), wireless broadband (WiBro), and GSM.

The wired communication can include at least one of universal serial bus (USB), high definition multimedia interface (HDMI), recommended standard 232 (RS-232), and plain old telephone service (POTS).

The network 162 can include at least one of telecommunications networks, for example, a computer network (e.g., a local area network (LAN) or a wide area network (WAN)), the Internet, a telephone network, and the like.

The electronic device 100 provides the LTE service in the single radio environment by use of at least one module functionally or physically separated from the processor 120. Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Each of the first external electronic device 102 and the second external electronic device 104 may be a type of device that is the same as or different from the electronic device 101. According to an embodiment of the present disclosure, the server 106 may include a group of one or more servers. According to various embodiments of the present disclosure, all or some of the operations to be executed by the electronic device 101 may be executed by another electronic device or a plurality of other electronic devices (e.g., the first external electronic device 102 and the second external electronic device 104 or the server 106). According to an embodiment of the present disclosure, in the case where the electronic device 101 should perform a certain function or service automatically or by request, the electronic device 101 may request some functions that are associated therewith from the other electronic devices (e.g., the first external electronic device 102 and the second external electronic device 104 or the server 106) instead of or in addition to executing the function or service by itself. The other electronic devices (e.g., the first external electronic device 102 and the second external electronic device 104 or the server 106) may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Figure 2A:
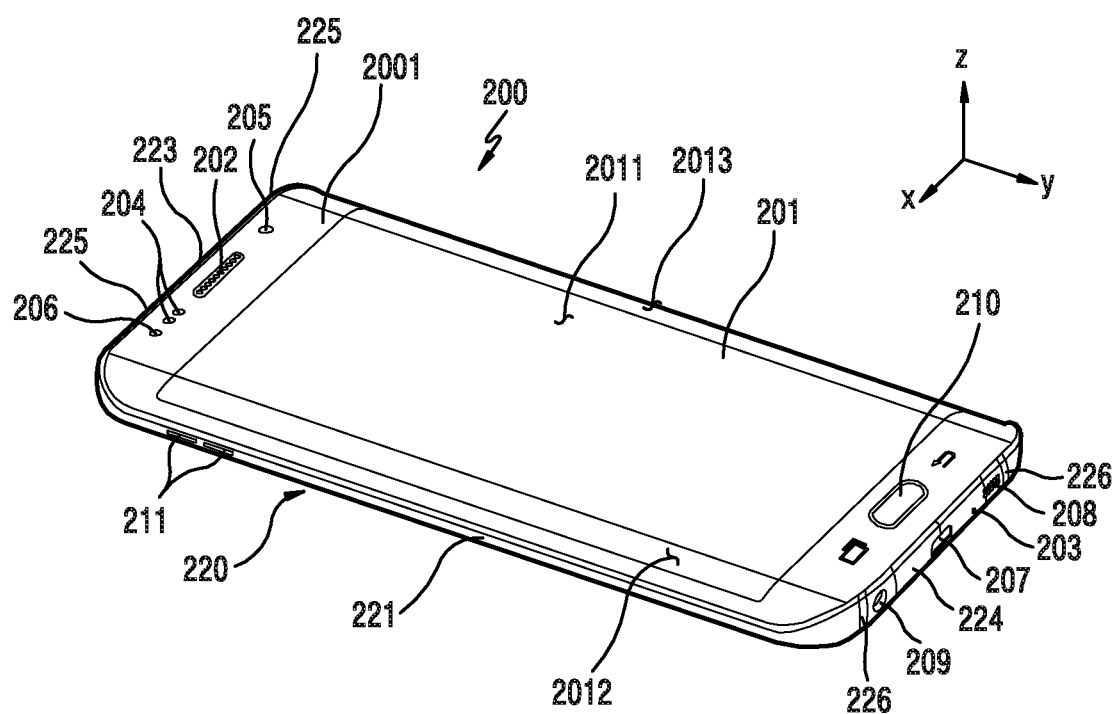
FIG. 2A is a front perspective view of an electronic device according to various embodiments of the present disclosure.
Figure 2B:
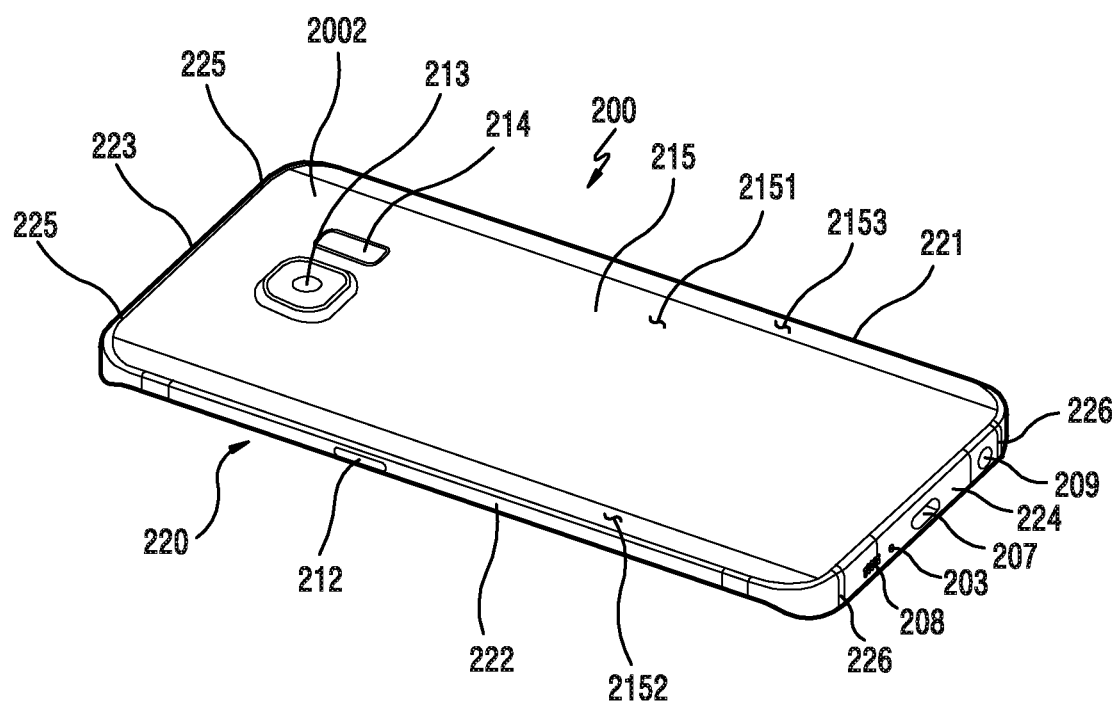
FIG. 2B is a rear perspective view of an electronic device according to various embodiments of the present disclosure.
Figure 2C:
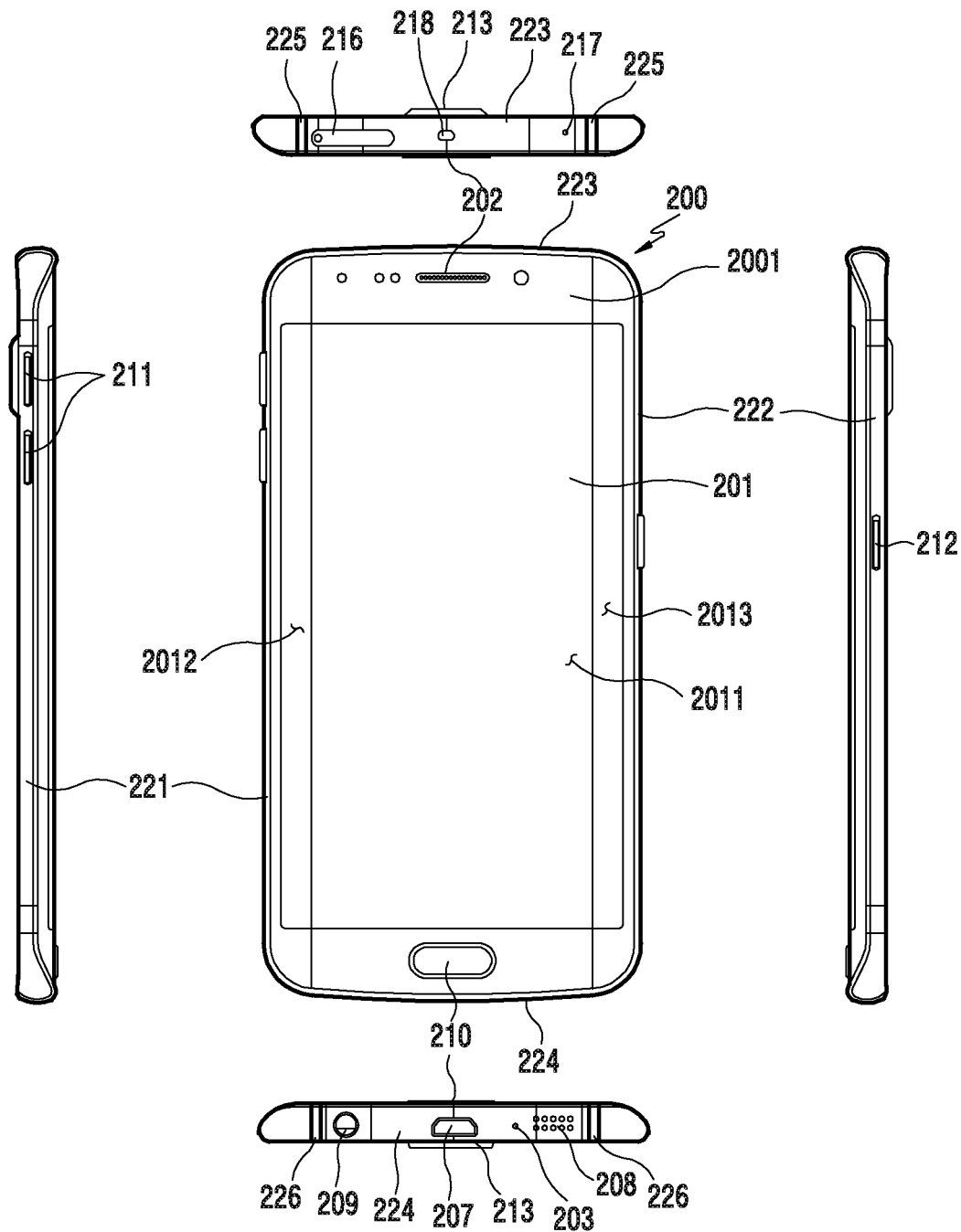
FIG. 2C illustrates views obtained by viewing an electronic device according to various embodiments of the present disclosure in various directions.

FIG. 2A is a front perspective view of an electronic device according to various embodiments of the present disclosure. FIG. 2B is a rear perspective view of an electronic device according to various embodiments of the present disclosure. FIG. 2C illustrates views obtained by viewing an electronic device according to various embodiments of the present disclosure.

Referring to FIGS. 2A to 2C, a display 201 may be installed on a front surface 2001 of an electronic device 200. A receiver 202 for receiving a voice of a counterpart may be disposed at the upper side of the display 201. A microphone device 203 for transmitting a voice of a user of the electronic device to the counterpart may be disposed at the lower side of the display 201.

According to an embodiment of the present disclosure, components for performing various functions of the electronic device 200 may be disposed around the receiver 202. The components may include at least one sensor module 204. The sensor module 204 may include at least one of, for example, an illuminance sensor (e.g., an optical sensor), a proximity sensor (e.g., an optical sensor), an infrared sensor, an ultrasonic sensor, and the like. According to an embodiment of the present disclosure, the components may include a front camera device 205. According to an embodiment of the present disclosure, the components may include an indicator 206 to inform the user of state information of the electronic device 200.

According to various embodiments of the present disclosure, the electronic device 200 may include a metal bezel 220 as a metal housing. According to an embodiment of the present disclosure, the metal bezel 220 may be disposed along the outer periphery of the electronic device 200 and may be disposed to extend to at least a part of the rear surface of the electronic device 200, which is continuous to the outer periphery. According to an embodiment of the present disclosure, the metal bezel 220 defines at least a part of the thickness of the electronic device 200 along the outer periphery of the electronic device 200, and may be formed in a closed loop shape. Without being limited thereto, however, the metal bezel 220 may be formed in a manner that contributes to at least a part of the thickness of the electronic device 200. According to an embodiment of the present disclosure, the metal bezel 220 may only be disposed in a part or more of the outer periphery of the electronic device 200. According to an embodiment of the present disclosure, when the metal bezel 220 may contribute to a part of the housing of the electronic device 200, the remaining portion of the housing may be replaced by a non-metal material. In such a case, the housing may be formed in a manner of insert-molding the non-metal member to the metal bezel 220. According to an embodiment of the present disclosure, the metal bezel 220 may include one or more cut-off portions 225 and 226 so that a unit bezel portion separated by the cut-off portions 225 and 226 may be utilized as an antenna radiator. According to an embodiment of the present disclosure, an upper bezel portion 223 may be configured as a unit bezel portion by one pair of cut-off portions 225 that are formed at a certain interval. According to an embodiment of the present disclosure, a lower bezel portion 224 may be configured as a unit bezel portion by one pair of cut-off portions 226 that are formed at a certain interval. According to an embodiment of the present disclosure, the cut-off portions 225 and 226 may be formed in unison when the non-metal member is insert-molded to the metal member.

According to various embodiments of the present disclosure, the metal bezel 220 may have a closed loop shape along the outer periphery and may be disposed in a manner of contributing to the entire thickness of the electronic device 200. According to an embodiment of the present disclosure, when the electronic device 200 is viewed from the front side thereof, the metal bezel 220 may include a left bezel portion 221, a right bezel portion 222, an upper bezel portion 223, and a lower bezel portion 224.

According to various embodiments of the present disclosure, on the lower bezel portion 224 of the electronic device, various electronic components may be disposed. According to an embodiment of the present disclosure, a speaker device 208 may be disposed at one side of the microphone device 203. According to an embodiment of the present disclosure, at the other side of the microphone device 203, an interface connector port 207 may be disposed to perform a data transmission/reception function with respect to an external device and to charge the electronic device 200 by receiving an external power applied thereto. According to an embodiment of the present disclosure, at one side of the interface connector port 207, an ear jack hole 209 may be disposed. According to an embodiment of the present disclosure, all the microphone device 203, the speaker device 208, the interface connector port 207, and the ear jack hole 209 as described above may be disposed within the area of the unit bezel portion that is formed by one pair of cut-of portions 226 disposed in the lower bezel portion 224. Without being limited thereto, however, at least one of the above-described electronic components may be disposed in the area that includes the cut-off portion 226, or may be disposed outside the unit bezel portion.

According to various embodiments of the present disclosure, various electronic components may also be disposed on the upper bezel portion 223 of the electronic device 200. According to an embodiment of the present disclosure, on the upper bezel portion 223, a socket device 216 for insertion of a card-type external device may be disposed. According to an embodiment of the present disclosure, the socket device 216 may accommodate at least one of an inherent identification (ID) card for the electronic device (e.g., a subscriber identity module (SIM) card or a user identity module (UIM)), and a memory card for extending a storage space. According to an embodiment of the present disclosure, at one side of the socket device 216, an infrared sensor module 218 may be disposed, and at one side of the infrared sensor module 218, an auxiliary microphone device 217 may be disposed. According to an embodiment of the present disclosure, all the socket device 216, the infrared sensor module 218, and the auxiliary microphone device 217 may be disposed within the area of the unit bezel portion formed by one pair of cut-off portions 225 that are disposed in the upper bezel portion 223. Without being limited thereto, however, at least one of the above-mentioned electronic components may be disposed in the area that includes of the cut-off portion 225, or may disposed outside the cut-off portion.

According to various embodiments of the present disclosure, one or more first side key buttons 211 may be disposed on the left bezel portion 221 of the metal bezel 220. According to an embodiment of the present disclosure, one pair of first side key buttons 211 may be disposed on the left bezel portion 221 to partially protrude to contribute to the execution of a volume up/down function, a scroll function, and the like. According to an embodiment of the present disclosure, one or more side key buttons 212 may be disposed on the right bezel portion 222 of the metal bezel 220. According to an embodiment of the present disclosure, the second side key button 212 may be configured to perform a power ON/OFF function, an electronic device wake-up/sleep function, and the like. According to an embodiment of the present disclosure, at least one key button 210 may be disposed in at least a portion of the lower area, except for the display on the front surface 2001 of the electronic device 200. According to an embodiment of the present disclosure, the key button 210 may perform a home key button function. According to an embodiment of the present disclosure, a fingerprint recognition sensor device may be disposed on the top surface of the home key button. According to an embodiment of the present disclosure, the home key button may be configured to perform a first function (a home screen return function, a wake-up/sleep function, and the like) by physically pressing the home key button, and to perform a second function (e.g., a fingerprint recognition function) by swiping the top surface of the home key button. Although not illustrated, touch pads may be disposed on the left and right of the key button 210 so as to perform a touch function.

According to various embodiments of the present disclosure, a rear camera device 213 may be disposed on the rear surface 2002 of the electronic device 200, and one or more electronic components 214 may be disposed at a side of the rear camera device 213. According to an embodiment of the present disclosure, the electronic components 214 may include at least one of an illuminance sensor (e.g., an optical sensor), a proximity sensor (e.g., an optical sensor), an infrared sensor, an ultrasonic sensor, a heartrate sensor, a flash device, and the like.

According to various embodiments of the present disclosure, the front surface 2001, in which the display 201 is provided, may include a planar portion 2011, and a left bent portion 2012 and a right bent portion 2013 which are formed on the left and right of the planar portion 2011, respectively. According to an embodiment of the present disclosure, the front surface 2001 of the electronic device 200 may include a display area 201 and the other areas (e.g., a black matrix (BM) area) by using a single window. According to an embodiment of the present disclosure, the left and right bent portions 2012 and 2013 may be formed to extend in an x-axis direction of the electronic device 200 of FIG. 2A from the planar portion 2011. According to an embodiment of the present disclosure, each of the left and right bent portions 2012 and 2013 may be configured as a part of the side surfaces of the electronic device 200. In such a case, the left and right bent portions 2012 and 2013 may be configured as the side surfaces of the electronic device 200 together with the left and right bezel portions 221 and 222 of the metal bezel 220, respectively. Without being limited thereto, however, the front surface 2001, in which the display 201 is provided, may include at least one of the left and right bent portions 2012 and 2013. According to an embodiment of the present disclosure, the front surface 2001 may be configured to include only the left bent portion 2012 along the planar portion 2011, or to include only the right bent portion 2013 along the planar portion 2011.

According to various embodiments of the present disclosure, the front surface 2001 may include a flexible display module that is applied to at least a portion of the window that includes the bent portions 2012 and 2013 on the left and right thereof, and the lower side of the window. According to an embodiment of the present disclosure, the area including the flexible display module may be configured as a display area 201. According to an embodiment of the present disclosure, the window may be formed in a manner in which the top and rear surfaces thereof are simultaneously bent (hereinafter, a "three-dimensional (3D) type"). Without being limited thereto, the window may be formed in a manner in which the left and right portions of the top surface are formed in a curved shape and the rear surface is formed in a planar shape (hereinafter, "two-and-a-half dimensional (2.5D) type"). According to an embodiment of the present disclosure, the window may be formed of a transparent glass material (e.g., a sapphire glass) or a transparent synthetic resin material.

According to various embodiments of the present disclosure, the electronic device 200 may control the display module so as to selectively display information. According to an embodiment of the present disclosure, the electronic device 200 may control the display module so as to configure a screen only on the planar portion 2011. According to an embodiment of the present disclosure, the electronic device 200 may control the display module to configure a screen by any one of the left and right bent portions 2012 and 2013 together with the planar portion 2011. According to an embodiment of the present disclosure, the electronic device 200 may control the display module to configure a screen by at least one of the left and right bent portions 2012 and 2013, excluding the planar portion 2011.

According to various embodiments of the present disclosure, the rear surface 2002 of the electronic device 200 may also be entirely formed by one window 215. According to an embodiment of the present disclosure, the rear surface 2002 may include a planar portion 2151 that is substantially formed in the central portion to be the center, and a left bent portion 2152 and a right bent portion 2153, which are formed on the left and right of the planar portion 2151, respectively. According to an embodiment of the present disclosure, the window 215 may be configured in the 2.5D type in which the left and right bent portions 2152 and 2153 of the outer surface are formed in a curved shape and the rear surface is formed as a planar surface. Without being limited thereto, however, the window 215 may be formed in the 3D type similar to the window disposed on the front surface 2001. According to an embodiment of the present disclosure, each of the left and right bent portions 2152 and 2153 may be configured as a part of the side surfaces of the electronic device 200. In such a case, the left and right bent portion 2152 and 2153 may be configured as the side surfaces of the electronic device 200 together with the left and right bezel portions 221, 222 of the metal bezel 220. Without being limited thereto, however, the rear surface 2002 may include only at least one of the left and right bent portions 2152 and 2153. According to an embodiment of the present disclosure, the rear surface 2002 may be configured to include only the left bent portion 2152 along the planar portion 2151, or to include only the right bent portion 2153 along the planar portion 2151.

According to various embodiments of the present disclosure, the upper side left and right corner portions and the lower side left and right corner portions of the front surface 2001 may be formed to be simultaneously inclined in the x-axis direction, the y-axis direction, and the z-axis direction in FIG. 2A while the window is bent. With this shape, the upper side left and right corner portions and the lower side left and right corner portions of the metal bezel 220 may be formed such that the heights thereof gradually decrease towards the side surfaces, respectively.

While a metal bezel, which is configured as a part of the housing of the electronic device, has been illustrated and described above, various embodiments of the present disclosure are not limited thereto. For example, various metal members disposed on the electronic device may be used for various embodiments of the present disclosure.

Figure 3:
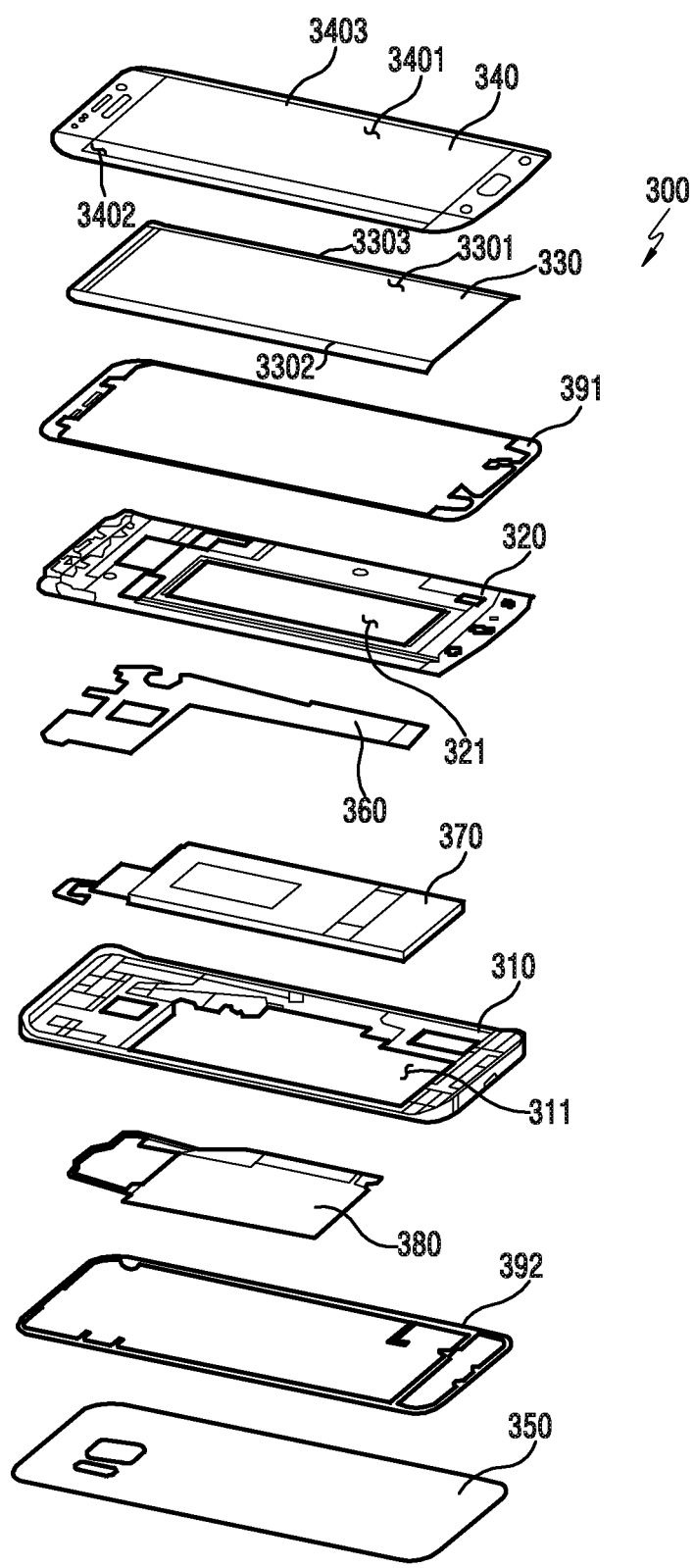
FIG. 3 is a perspective view illustrating an electronic device in a disassembled state according to various embodiments of the present disclosure.

FIG. 3 is a perspective view of an electronic device according to various embodiments of the present disclosure in a disassembled state. Hereinafter, the electronic device illustrated in FIG. 3 may be an electronic device which is the same as the above-described electronic device 200.

Referring to FIG. 3, an electronic device 300 may include a printed circuit board (PCB) 360, a bracket 320, a display module 330, and a front window 340, which may be disposed in a manner of being sequentially staked on the upper side of the housing 310. According to an embodiment of the present disclosure, the electronic device may include a wireless power transmission/reception member 380 and a rear window 350, which may be disposed in a manner of being sequentially staked on the lower side of the housing 310. According to an embodiment of the present disclosure, the battery pack 370 is accommodated in an accommodation space 311 of the battery pack 370, which is formed in the housing 310, and may be disposed to avoid the PCB 360. According to an embodiment of the present disclosure, the battery pack 370 and the PCB 360 may be disposed in parallel not to overlap with each other. According to an embodiment of the present disclosure, the display module 330 may be fixed to the bracket 320, and the front window 340 may be fixed by being attached to the bracket 320 by a first adhesive member 391. According to an embodiment of the present disclosure, the rear window 350 may be fixed by being attached to the housing 310 by a second adhesive member 392.

According to various embodiments of the present disclosure, the front window 340 may include a planar portion 3401, and a left bent portion 3402 and a right bent portion 3403, which are bent in opposite directions from the planar portion 3401. According to an embodiment of the present disclosure, the front window 340 is positioned on the electronic device 300 so as to form the front surface, and is formed of a transparent material so as to display a screen presented by the display module 330 and to provide an input/output window for various sensors. According to an embodiment of the present disclosure, while a shape in which the left and right bent portions 3402 and 3403 are formed in the 3D type is illustrated, a shape in which the upper and lower portions as well as the left and right portions are single-bent, or a shape in which the upper, lower, left, and right portions are dual-bent, may be applied. According to an embodiment of the present disclosure, a touch panel may be further disposed on the rear surface of the front window 340 and may receive a touch input signal from the outside.

According to various embodiments of the present disclosure, the display module 330 may also be formed in a shape corresponding to that of the front window 340 (a shape having a curvature corresponding to that of the front window 340). According to an embodiment of the present disclosure, the display module 330 may include a planar portion 3301, and left and right bent portions 3302 and 3303 on the left and right of the planar portion 3301. According to an embodiment of the present disclosure, a flexible display module may be used as the display module 330. According to an embodiment of the present disclosure, in the case of a window in a type where the rear surface of the front window 340 is formed in a planar shape (hereinafter, 2D type or 2.5 D type), since the rear surface of the front window 340 is planar, an ordinary LCD or an on-cell touch screen panel (TSP) active matrix OLED (AMOLED) (OCTA) may be applied.

According to various embodiments of the present disclosure, the first adhesive member 391 is a component for fixing the front window 340 to a bracket 320 that is disposed within the electronic device 300, and may be a kind of tape, such as a double-sided tape, or a liquid adhesive layer, such as a bond. According to an embodiment of the present disclosure, when the double-sided tape is applied as the first adhesive member 391, a general polyethylene terephthalate (PET) or a functional base may be applied as the internal base of the adhesive member 391. For example, by using a base formed of a foam type or shock-resistive fabric material so as to reinforce the shock resistance, it is possible to prevent the front window from being destroyed by external impact.

According to various embodiments of the present disclosure, the bracket 320 may be used as a component for reinforcing the entire rigidity of the electronic device 300 by being disposed within the electronic device 300. According to an embodiment of the present disclosure, the bracket 320 may be formed of at least one metal selected from aluminum (Al), magnesium (Mg), and STS. According to an embodiment of the present disclosure, the bracket 320 may be formed of a highly rigid plastic, in which glass fibers are contained, or may be formed of a combination of a metal and a plastic. According to an embodiment of the present disclosure, when a metal member and a non-metal member are used in combination, the bracket 320 may be formed by insert-molding the non-metal member to the metal member. According to an embodiment of the present disclosure, the bracket 320 is placed on the rear surface of the display module 330. The bracket 320 may have a shape (curvature) that is similar to the shape of the rear surface of the display module 330 and may support the display module 330. According to an embodiment of the present disclosure, between the bracket 320 and the display module 330, an elastic member, such as a sponge or a rubber and an adhesive layer, such as a double-sided tape or a kind of sheet, such as a single-sided tape, may be additionally disposed so as to protect the display module 330. According to an embodiment of the present disclosure, a section of the bracket 320 may further include a slot-sinking or hole area 321 for securing a component mounting space or a marginal space based on a change of a component during use, such as the swelling of the battery pack 370. According to an embodiment of the present disclosure, as needed, a sheet-type meal or composite material may be added to the corresponding hole area 321 so as to reinforce the internal rigidity, or an auxiliary device for improving a thermal characteristic, an antenna characteristic, and the like, may be further provided in the hole area 321. According to an embodiment of the present disclosure, the bracket 320 may be fastened to the housing (e.g., the rear case) 310 so as to form a space therein, and at least one electronic component may be disposed in such a space. The at least one electronic component may include a PCB 360. Without being limited thereto, however, the at least one electronic component may include an antenna device, a sound device, a power supply device, a sensor device, and the like in addition to the PCB 360.

According to various embodiments of the present disclosure, the battery pack 370 may supply power to the electronic device 300. According to an embodiment of the present disclosure, one surface of the battery pack 370 may be close to the display module 330 and the other surface may be close to the rear window 350 so that when the battery pack 370 swells during charge, counterpart objects may be deformed or destroyed. In order to prevent this, a space (swelling gap) may be provided between the battery pack 370 and the counterpart objects (e.g., the display module 330 and the rear window 350) so as to protect the counterpart objects. According to an embodiment of the present disclosure, the battery pack 370 may be disposed in a form of being integrated with the electronic device 300. Without being limited thereto, however, when the rear window 350 is implemented to be attachable to/detachable from the electronic device 300, the battery pack 370 may be implemented to be attachable/detachable.

According to various embodiments of the present disclosure, the housing 310 forms the exterior of the electronic device 300 (e.g., side surfaces including a metal bezel), and may be coupled to the bracket 320 so as to form an internal space. According to an embodiment of the present disclosure, a front window 340 may be disposed on the front surface of the housing 310, and a rear window 350 may be disposed on the rear surface of the housing 310. Without being limited thereto, however, the rear surface of the housing 310 may be variously implemented by molding a synthetic resin, or by using a metal, a composite of a metal and a synthetic resin, and the like. According to an embodiment of the present disclosure, an inter-structure gap formed by the housing 310 and the rear window 350 may prevent the destruction of the rear window 350 from the secondary impact by an internal structure when an external impact occurs, such as the drop of the electronic device 300.

According to various embodiments of the present disclosure, a wireless power transmission/reception member 380 may be disposed on the rear surface of the housing 310. According to an embodiment of the present disclosure, the wireless power transmission/reception member 380 mainly has a thin film form and is disposed by being attached to one surface of an internally mounted component or an area of the inner surface of the housing 310, in particular to an area that is generally close to the rear window 350. The wireless power transmission/reception member 380 includes a structure that forms a contact with the PCB 360 within the housing 310. According to an embodiment of the present disclosure, the wireless power transmission/reception member 380 may be embedded or attached as a component of the battery pack 370, and the like, or a part of the housing 310, and may be provided in the form of being attached to both of a component and the housing 310.

According to various embodiments of the present disclosure, the second adhesive member 392 is a component that fixes the rear window 350 to the housing 310 and may be applied in a form similar to that of the first adhesive member 391 described above.

According to various embodiments of the present disclosure, the rear window 350 may be applied in a form similar to that of the front window 340. According to an embodiment of the present disclosure, the front surface (the surface exposed to the outside) of the rear window 350 may be formed in a curvature that is more inclined as going to both of the left and right ends. According to an embodiment of the present disclosure, the rear surface of the rear window 350 may be formed in a planar surface to be attached to the hosing 310 by the second adhesive member 392.

Figure 4A:
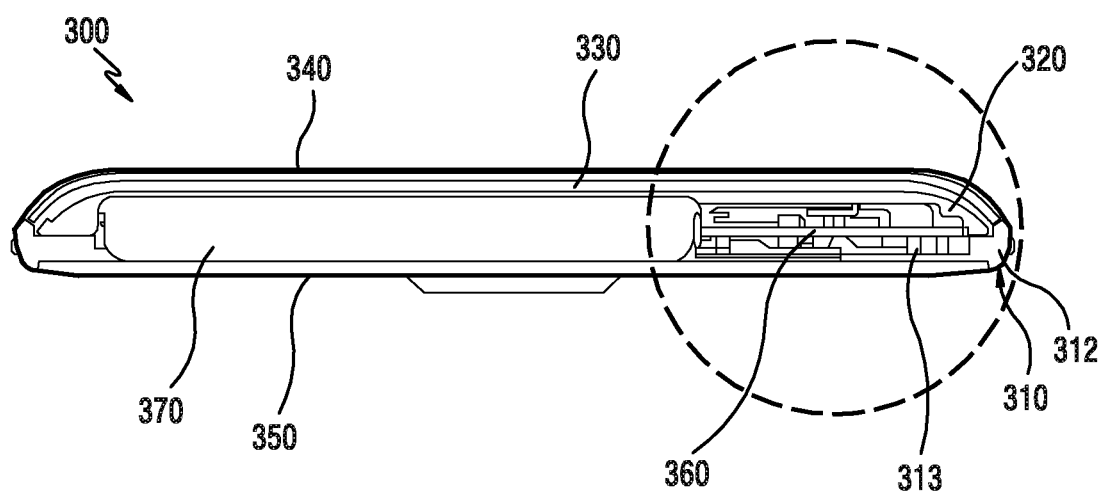
FIG. 4A is a cross-sectional view illustrating an electronic device in an assembled state according to various embodiments of the present disclosure.
Figure 4B:
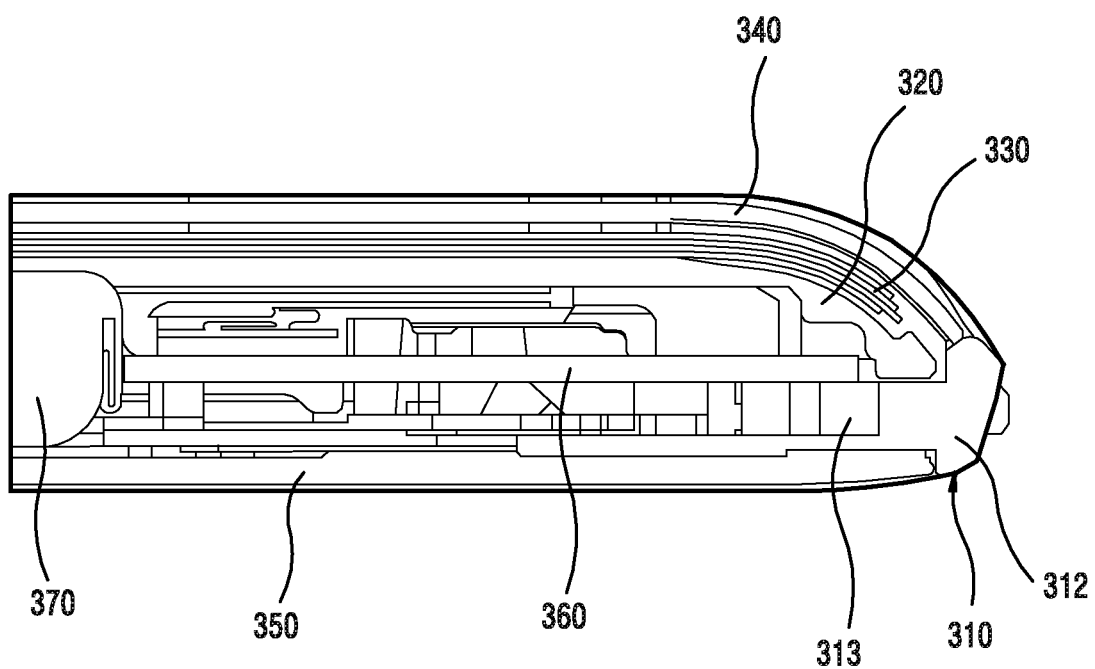
FIG. 4B is a cross-sectional view of a principal portion according to various embodiments of the present disclosure.

FIG. 4A is a cross-sectional view illustrating an electronic device in the assembled state according to various embodiments of the present disclosure. FIG. 4B is a cross-sectional view of a principal portion of FIG. 4A according to various embodiments of the present disclosure.

Referring to FIGS. 4A and 4B, the bracket 320 may be fixed to the housing 310. According to an embodiment of the present disclosure, the housing 310 may be formed by injection-molding a non-metal member (e.g., polycarbonate (PC)) 313 to the metal bezel 312. According to an embodiment of the present disclosure, the display module 330 may be fixed to the front surface of the bracket 320, and the front window 340 may be disposed on the display module 330. According to an embodiment of the present disclosure, the front window 340 may be fixed by being attached to the bracket 320 by the first adhesive member 391 adjacent to an end of the housing 310. According to an embodiment of the present disclosure, the front window 340 may be fixed by being attached to the bracket 320 by the first adhesive member 391 to correspond to the shape thereof on the end of the housing 310. According to an embodiment of the present disclosure, the front window 340 may be fixed by being attached to the bracket 320 by the first adhesive member 391 while being supported by the end of the housing 310. According to an embodiment of the present disclosure, the front window 340 may have a uniform thickness and may be formed in a shape having a certain curvature. According to an embodiment of the present disclosure, all of the planar portion and the left and right bent portions of the front window 340 may be formed to have a certain thickness.

According to various embodiments of the present disclosure, the rear window 350 may also be fixed to the housing 310 by the second adhesive member 392. According to an embodiment of the present disclosure, the rear window 350 may be formed to have a thickness that is reduced towards the left and right edges (a shape which is formed in the 2.5D type).

According to various embodiments of the present disclosure, in the space between the bracket 320 and the housing 310, an electronic component, such as the PCB 360, may be accommodated, and the battery pack 370 may be disposed in parallel with the PCB 360 to avoid the PCB 360.

Figure 4C:
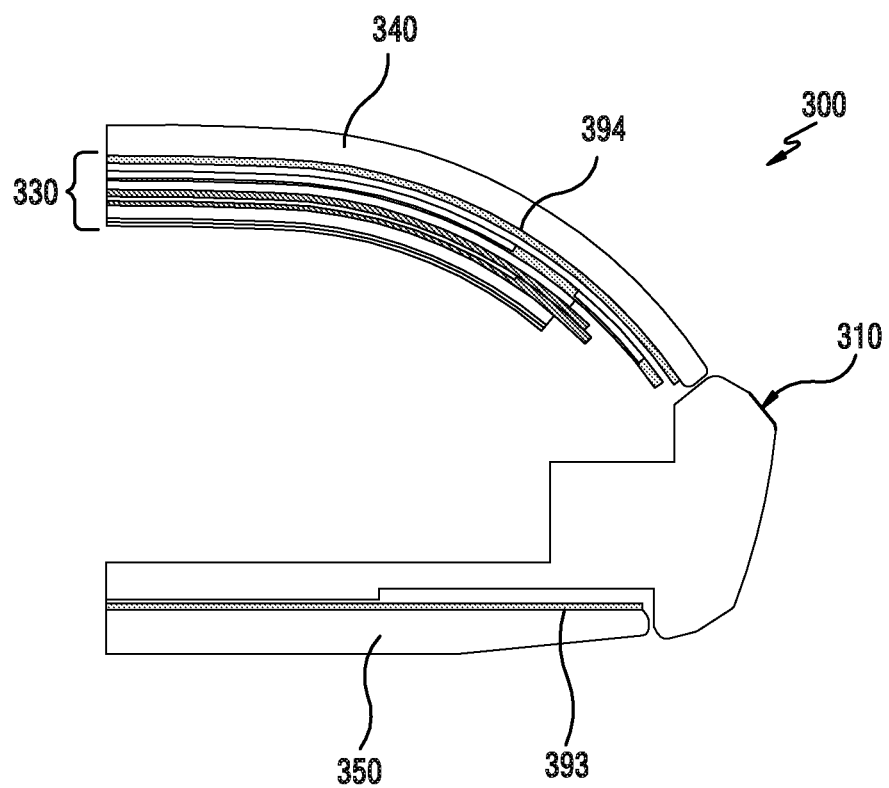
FIG. 4C is a cross-sectional view of a principal portion illustrating an electronic device in the assembled state, which includes opaque layers, according to various embodiments of the present disclosure.

FIG. 4C is a cross-sectional view of a principal portion illustrating an electronic device, which includes opaque layers, in an assembled state according to various embodiments of the present disclosure.

Referring to FIG. 4C, according to an embodiment of the present disclosure, opaque layers 393 and 394 may be disposed between the rear surface of the front window 340 and the display module 330 and between the housing 310 and the rear surface of the rear window 350, respectively, so as to conceal the interior of the electronic device 300. According to an embodiment of the present disclosure, the opaque layer 394 disposed on the front window 340 may be applied to the area (e.g., the BM area), excluding the display area. According to an embodiment of the present disclosure, the opaque layers 393 and 394 may be implemented through a process, such as printing, vapor deposition, or painting, or a subsidiary material, such as a film-type sheet may be additionally attached thereto. According to an embodiment of the present disclosure, the sheet may include various forms of patterns on one surface thereof, which are formed through various processes, such as ultraviolet (UV) molding, printing, and painting. According to an embodiment of the present disclosure, the sheet may be applied not only to the rear window 350, but also to the front window 340. According to an embodiment of the present disclosure, the light transmittance of the window itself may be lowered by coloring the window glass itself, or the aesthetics may be enhanced by applying various colors thereto. According to an embodiment of the present disclosure, on the rear surface of the rear window 350, one or more electronic components may be further disposed. According to an embodiment of the present disclosure, the electronic components may include an input device, such as a touch panel, and a charge device, such as a wireless charge module, a communication module, such as a near field communication (NFC) antenna, or a display module may be additionally disposed.

Figure 5A:
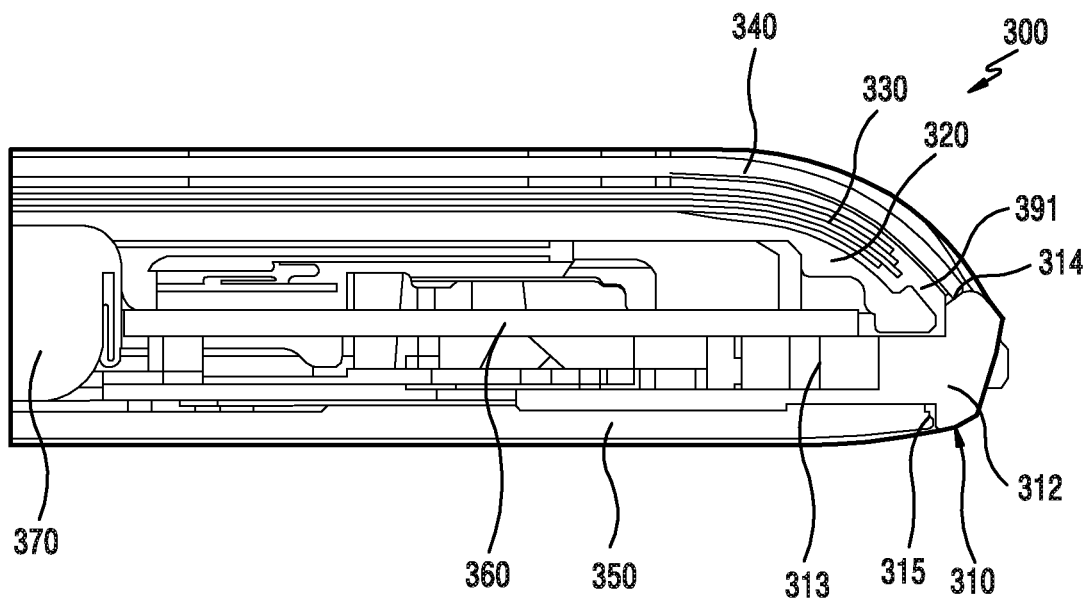
FIGS. 5A to 5C are views illustrating a front window in the assembled state according to various embodiments of the present disclosure.
Figure 5B:
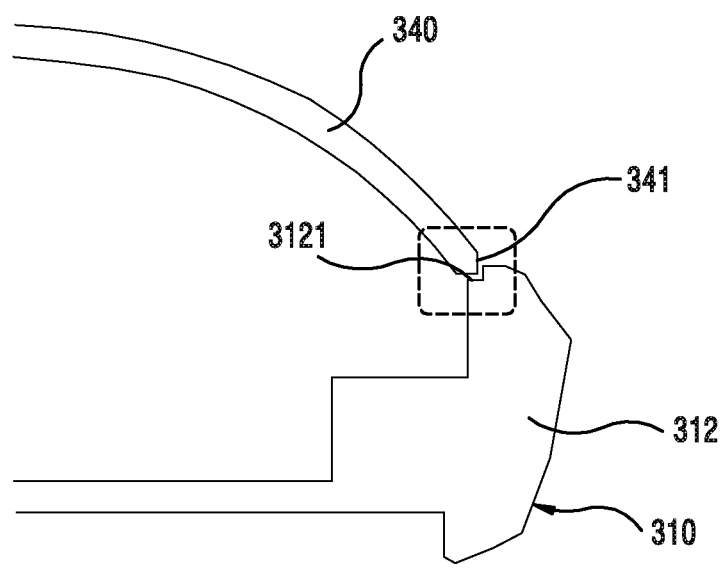
Figure 5C:
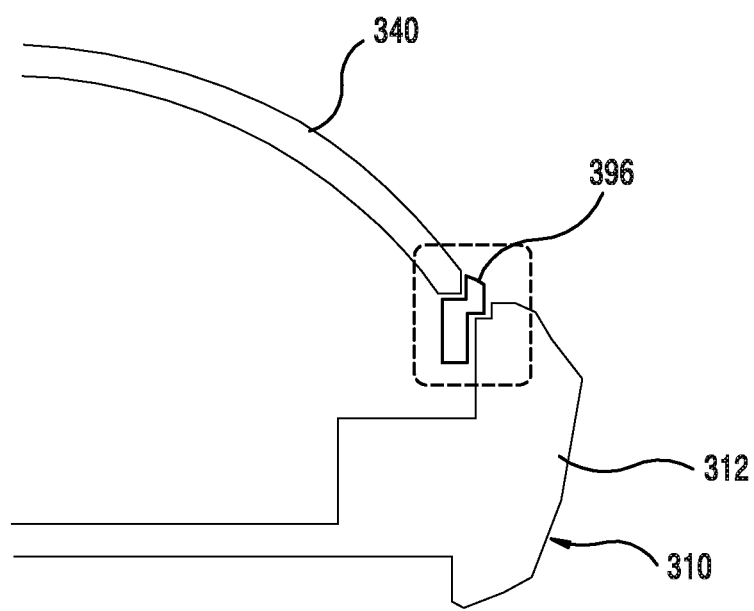

FIGS. 5A to 5C are views illustrating a front window in the assembled state according to various embodiments of the present disclosure.

Referring to FIGS. 5A to 5C, each of the front window 340 and the rear window 350 has an outer edge portion, and a single housing 310 may be implemented to enclose the edge portions of the front and rear windows 340 and 350. The housing 310 may include a front opening portion 314 and a rear opening portion 315, and the front window 340 and the rear window 350 may be seated on the front and rear opening portions 314 and 315, respectively. The front window 340 may have a shape that is implemented by bending a flat glass while applying heat/pressure thereto, and on a cross-sectional view, the tip end of the edge portion of the front window 340 may be implemented in the form of being orthogonal to the surface of the window. The surface of the housing 310, which is close to the tip end of the edge portion of the front window 340, may be implemented in a shape that is parallel with the edge portion.

According to an embodiment of the present disclosure, the tip end of the edge portion of the front window 340 may be fabricated in various shapes through processing, and corresponding to this, the housing 310 may have an assembly portion having a shape corresponding to the shape of the tip end. For example, as illustrated in FIG. 5B, the tip end face may be processed to have a wedge shape 341 in cross-section, of which the sides are parallel to the X-axis and the Y-axis, respectively, rather than a slope shape, and the shape of a seat portion 3121 of the housing may be implemented to correspond to the processed wedge shape 341. In another example, as illustrated in FIG. 5C, the tip end face may be processed to have a wedge shape in cross-section, of which the sides are parallel to the X-axis and the Y-axis, respectively, rather than a slope shape and a separate interface member 396 may be added between the window 340 and the housing 310. According to an embodiment of the present disclosure, the interface member 396 may be first attached to the window 340 so as to be easily assembled to the housing 310. The interface member 396 may be in the form of enclosing the edge portion of the window 340 so as to protect the edge portion of the window 340 against external impact. According to an embodiment of the present disclosure, the interface member 396 may be disposed along the outer periphery of the electronic device 300 such that a part of the interface member 396 may be exposed so as to improve the aesthetic feeling of the electronic device 300. According to an embodiment of the present disclosure, the interface member 396 may be formed of a plastic material, such as PC or PC-glass fiber (GF). Alternatively, the interface member 396 may be formed of an elastic material, such as rubber or urethane.

Figure 6:
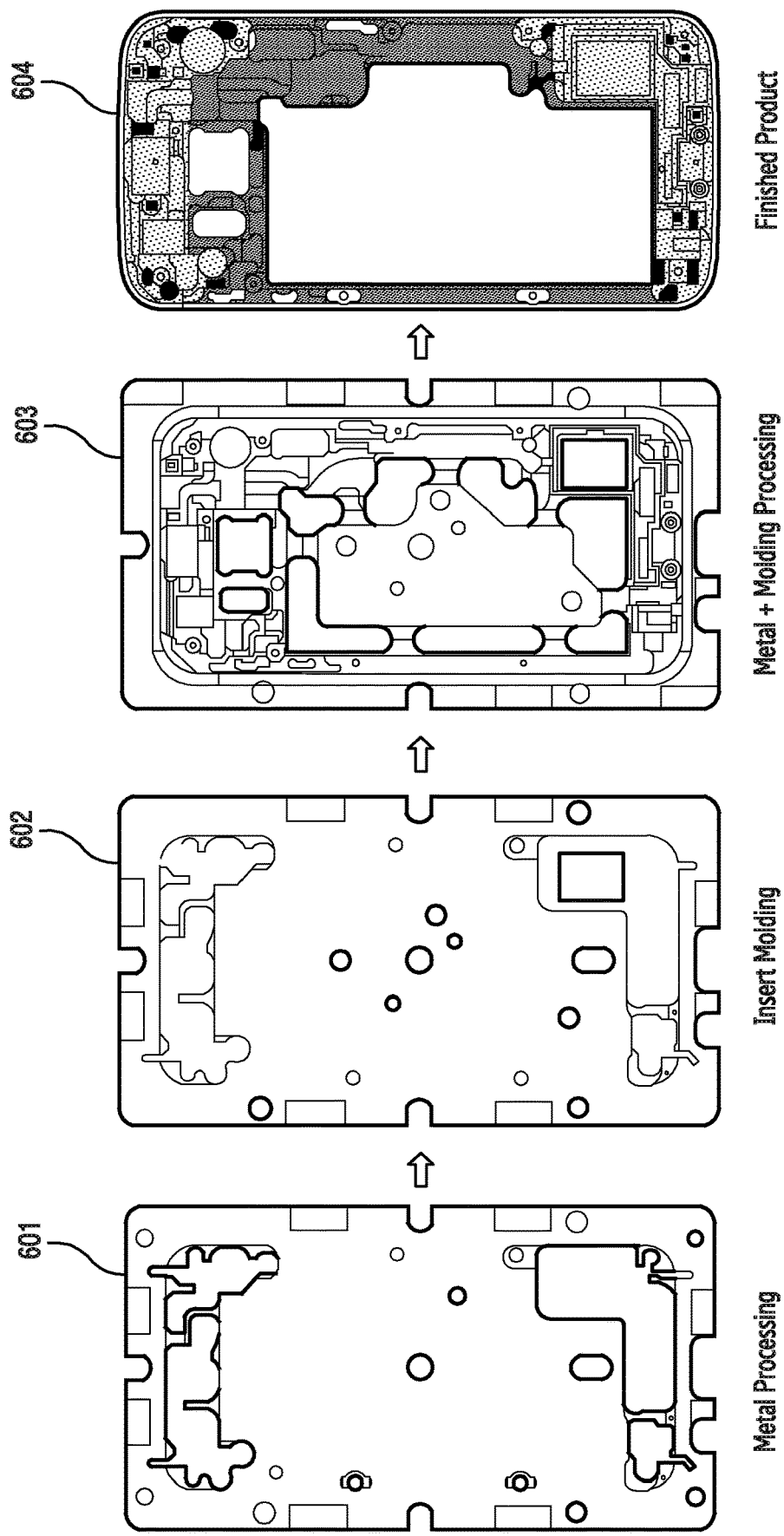
FIG. 6 is a view illustrating a manufacturing process of a housing according to various embodiments of the present disclosure.

FIG. 6 is a view illustrating a manufacturing process of a housing according to various embodiments of the present disclosure.

Referring to FIG. 6, a housing 604 may be manufactured through a process as follows. In the first operation, a metal 601, such as Al or Mg, is provided, and a portion to be filled by injection molding the housing and principal shapes may be processed. The processing may be performed through not only a computer numerical control (CNC), but also any other processing apparatus or method. In the second operation, a processed insert portion may be inserted into a mold so as to progress injection molding 602. Areas required for injection molding in the housing 604, such as a portion for antenna radiation and a portion for preventing electric shock, may be manufactured through the insert molding. In the third operation, it is possible to further process a shape additionally with a product which has been completely insert-molded 603. In such an operation, the metal and a molded product may be simultaneously processed, and only one of the metal and the molded product may be processed. In such an operation, the processing of operations in the corner portions of the housing (see FIGS. 7A to 7C) may progress. In the fourth operation, the above-described operations are completed and thus a complete product (a housing that includes a metal member and a non-metal member which are dually injection-molded) may be provided.

Figure 7A:
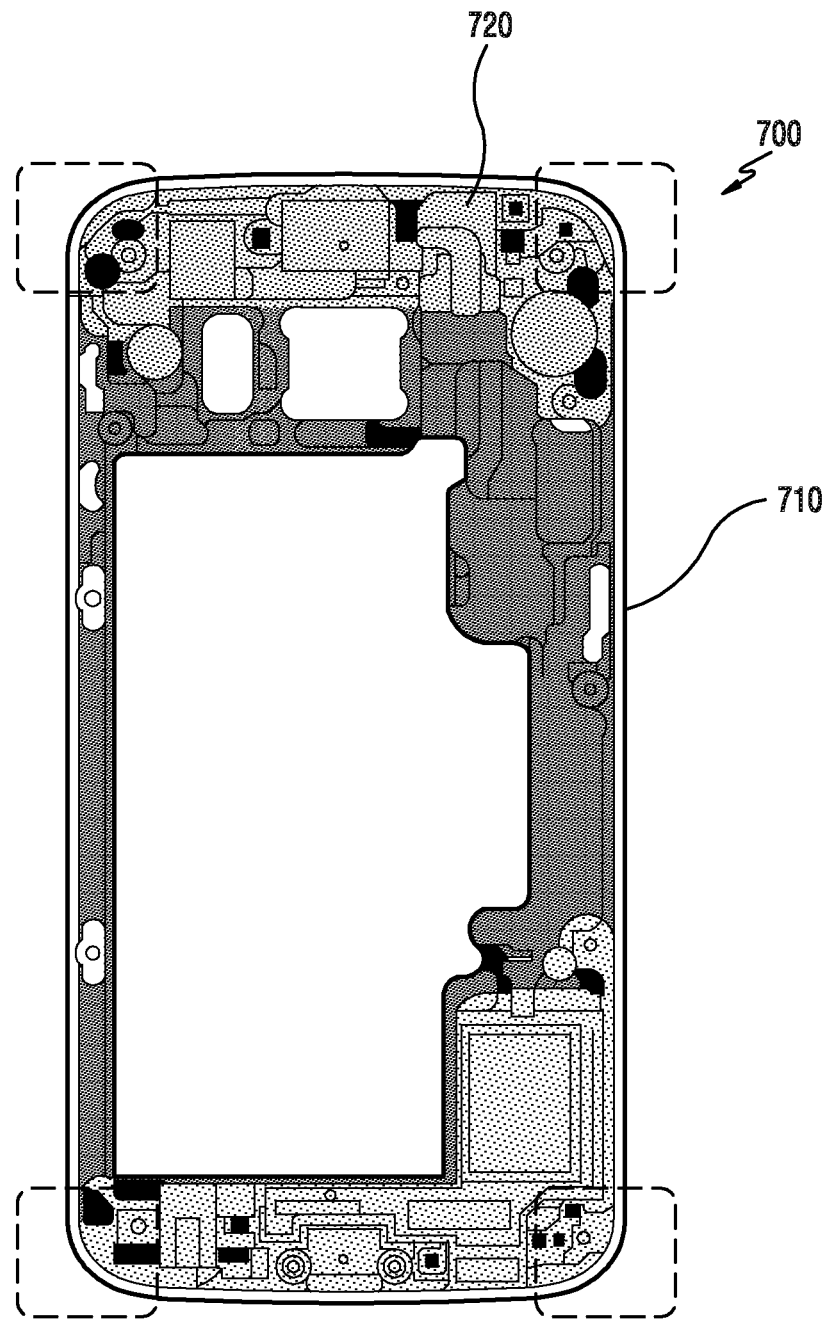
FIG. 7A is a configuration view illustrating a housing by a dual injection molding according to various embodiments of the present disclosure.
Figure 7B:
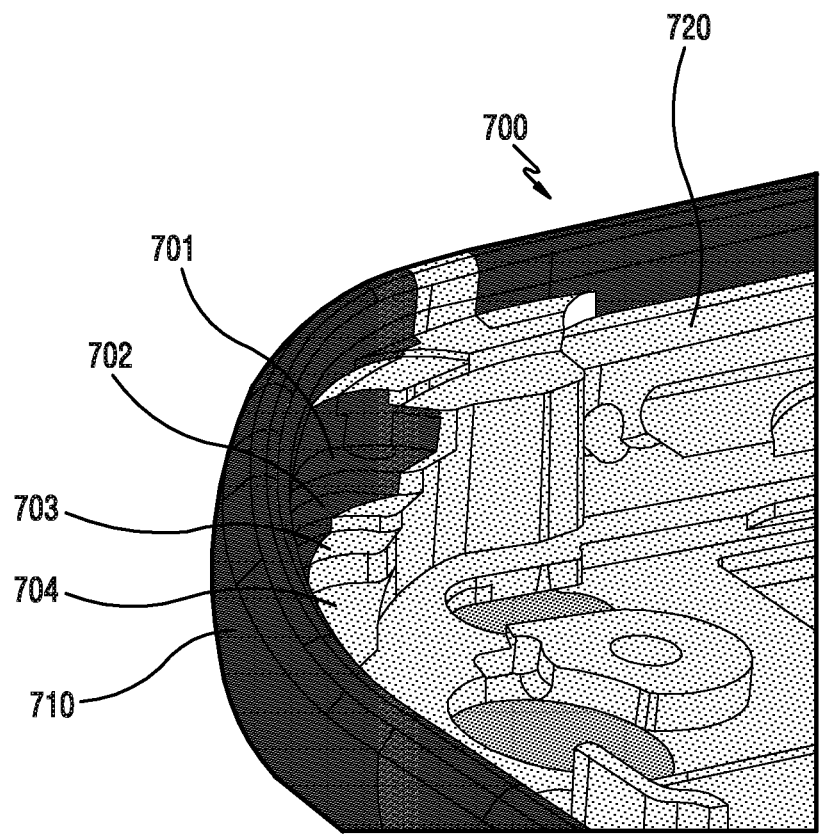
FIG. 7B is a perspective view of a principal portion is illustrated where a housing and a bracket are coupled to each other according to various embodiments of the present disclosure.
Figure 7C:
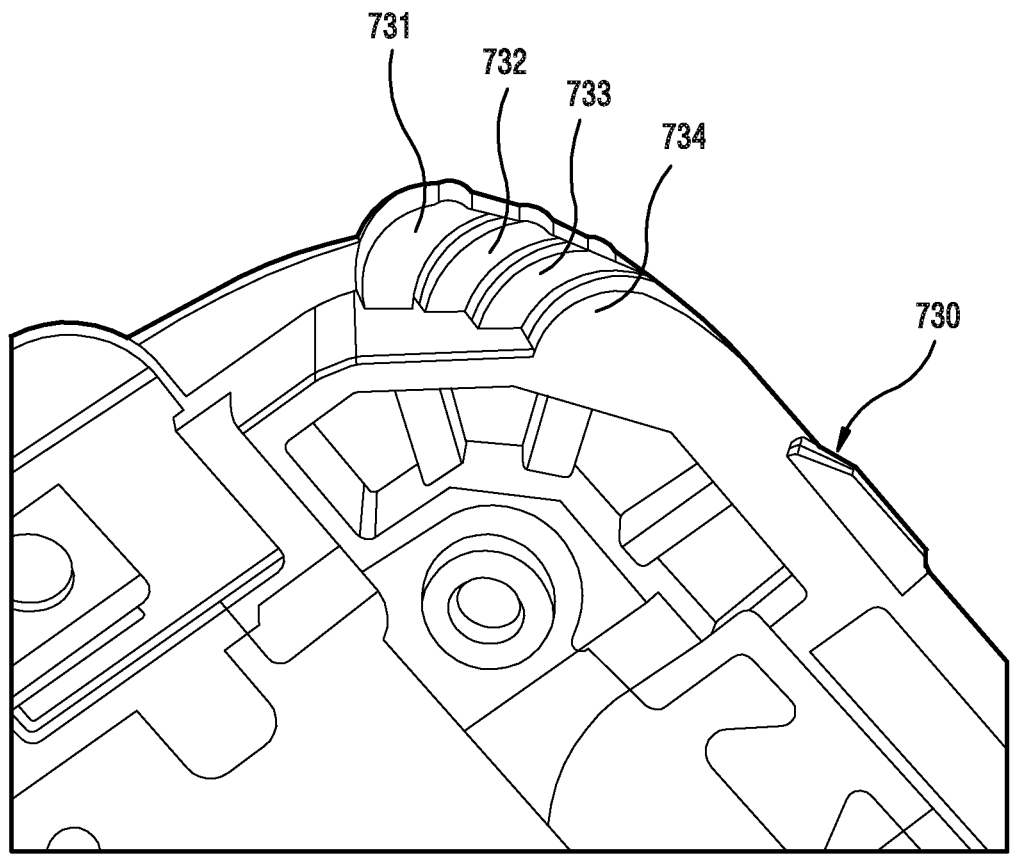
FIG. 7C is a perspective view of a principal portion in which a portion of a bracket is illustrated which is coupled to a housing coupling portion in FIG. 7B according to various embodiments of the present disclosure.

FIG. 7A is a configuration view illustrating a housing by a dual injection molding according to various embodiments of the present disclosure. FIG. 7B is a perspective view of a principal portion in which a portion is illustrated where a housing and a bracket are coupled to each other according to various embodiments of the present disclosure. FIG. 7C is a perspective view of a principal portion in which a portion of a bracket is illustrated which is coupled to a housing coupling portion in FIG. 7B according to various embodiments of the present disclosure.

Referring to FIGS. 7A to 7C, a housing 700, in which a non-metal member 720 is insert-molded to a metal member 710, may be provided. According to an embodiment of the present disclosure, the edge portions of the housing 700 (the portions illustrated by dotted lines in the four corner portions in FIG. 7A) may be formed in a shape corresponding to the edge portions of the front window. More particularly, each of the corner portions may be implemented in a curved shape, which is changed in the directions of all the three axes of the X, Y, and Z-axes. According to an embodiment of the present disclosure, when the housing 700 is manufactured by injection molding, the shapes of the corner portions and the inner portions of the corner portions may be easily manufactured according to the shapes of cavities of a manufactured mold. However, when the housing is manufactured using a metal, it is difficult to process the shape of each of the corner portions in the curved shape, which is changed in the directions of all the three axes of the X, Y, and Z-axes. More particularly, the inner portion of each of the corner portions is a portion that is mated in shape with the bracket, and may cause an assembly issue due to a processing deviation, and the like when it is processed as a 3-dimensionally curved surface.

Accordingly, when the inner portion of each corner of the housing 700 is formed in a single planar shape in order to facilitate assembly and to reduce a processing deviation, the processed area may be widened so that the processing time increases, and a deformation may be caused in the product according to the processing. Accordingly, by processing the inner portion of each corner portion stepwise such that the inner portion has a plurality of operation portions 701 to 704, it is possible to reduce the processing deviation that occurs during the processing of a 3-dimensionally curved surface, and to improve the long processing time that is required to process an end surface, the deformation of the product, and the like. According to an embodiment of the present disclosure, a counterpart (e.g., the bracket 730) that is mated in shape with the housing 700 may also be processed to have a plurality of corresponding operational portions 731 to 734. Through this, by making the corner portions of the housing and the corner portions of the bracket be strongly engaged with each other, it is possible to prevent the electronic device from being distorted, and by minimizing the deformation of the electronic device when an external impact is applied thereto, it is possible to prevent the front and rear windows, as well as the display module of the electronic device, from being destroyed.

Figure 8A:
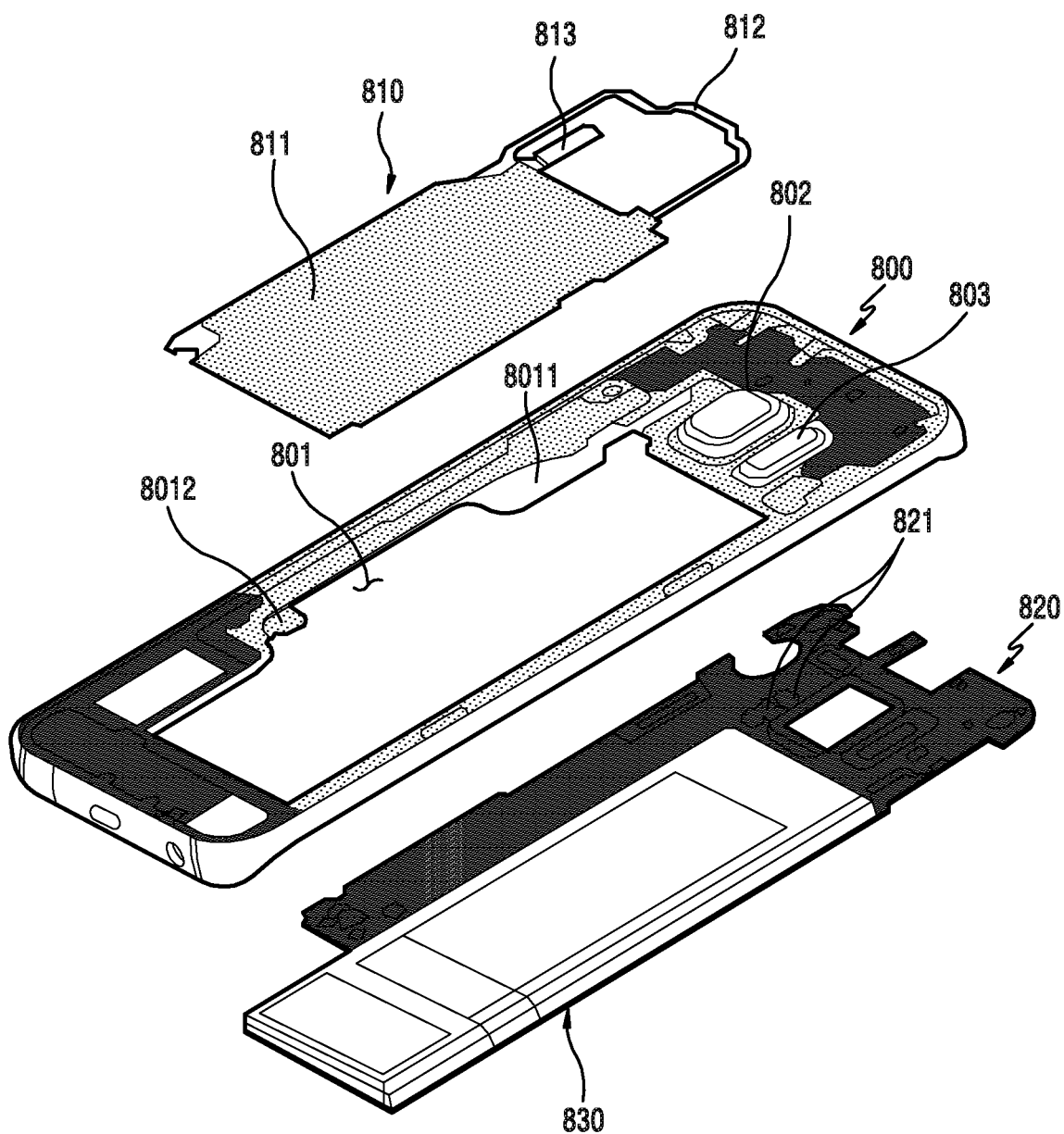
FIG. 8A is an exploded perspective view illustrating a state in which a wireless power transmission/reception member is applied to an electronic device according to various embodiments of the present disclosure.
Figure 8B:
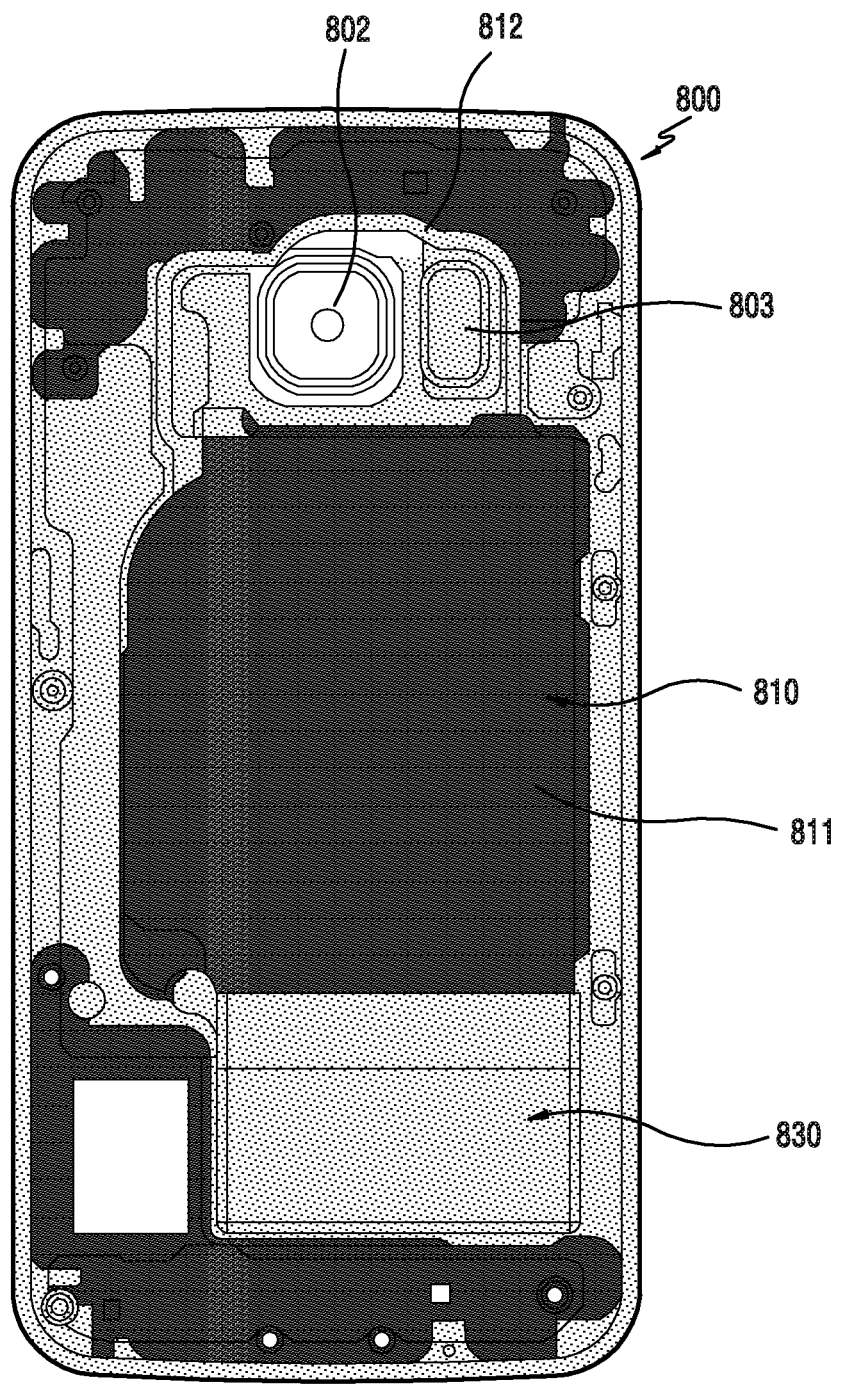
FIG. 8B is a view illustrating a housing to which a wireless power transmission/reception member is applied according to various embodiments of the present disclosure.
Figure 8C:
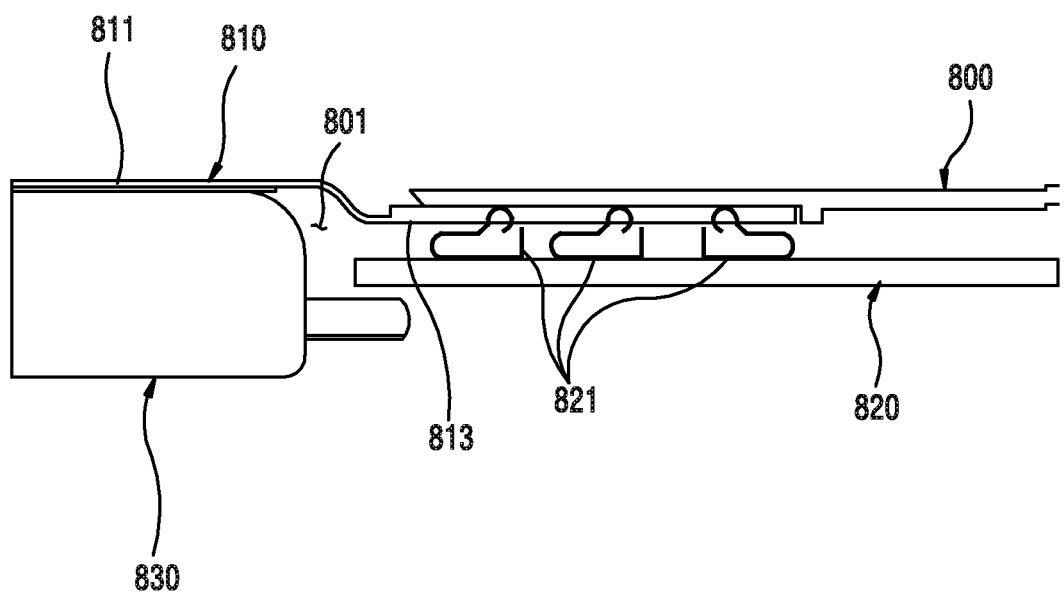
FIG. 8C is a cross-sectional view illustrating a principal portion in a state where a wireless power transmission/reception member is electrically connected to a printed circuit board (PCB) according to various embodiments of the present disclosure.

FIG. 8A is an exploded perspective view illustrating a state in which a wireless power transmission/reception member is applied to an electronic device according to various embodiments of the present disclosure. FIG. 8B is a view illustrating a housing to which a wireless power transmission/reception member is applied according to various embodiments of the present disclosure. FIG. 8C is a cross-sectional view illustrating a principal portion in a state in which a wireless power transmission/reception member is electrically connected to a PCB according to various embodiments of the present disclosure.

Referring to FIGS. 8A to 8C, a wireless power transmission/reception member 810 may be disposed such that the wireless power transmission/reception member 810 faces the rear window over a portion of a housing 800 and a battery pack 830 (corresponding to the battery pack 370 of FIG. 3). According to an embodiment of the present disclosure, the wireless power transmission/reception member 810 may be a wireless charge module, or a communication module, such as an NFC/magnetic security transmission (MST) antenna.

According to various embodiments of the present disclosure, the housing 800 may include an opening 801 for accommodating the battery pack 830, and one or more flanges 8011 and 8012 may be formed to protrude in the direction of the opening 801 along the periphery of the opening 801. According to an embodiment of the present disclosure, the wireless power transmission/reception member 810 may be disposed in a manner of being attached to the flanges 8011 and 8012 and the surface of the battery pack 830.

According to various embodiments of the present disclosure, the wireless power transmission/reception member 810 may be formed in the form of a thin film, and may include a plurality of coil-type antenna radiators. According to an embodiment of the present disclosure, the plurality of antenna radiators may be wound in various manners (e.g., in a spiral manner) according to the characteristic of a corresponding communication module. According to an embodiment of the present disclosure, each of the plurality of coil-type antenna radiators may be disposed on the same plane in one film to be parallel with each other.

According to various embodiments of the present disclosure, the wireless power transmission/reception member 810 may include a body portion 811 to be disposed on the flanges 8011 and 8012 of the opening 801 and a part of the surface of the battery pack 830, a tail portion 812 drawn out from the body portion 811, and a contact portion 813 drawn from the body portion 811. According to an embodiment of the present disclosure, the contact portion 813 may be disposed to correspond to a plurality of contact terminals 821 mounted on a PCB 820. According to an embodiment of the present disclosure, when the body portion 811 is disposed to be flush with the front surface of the housing 800 or above the front surface, the contact portion 813 may be disposed on the rear surface of the housing 800 so as to be in physical contact with the contact terminals 821 of the PCB 820 that is positioned below the contact portion 813.

According to various embodiments of the present disclosure, a plurality of electronic components 802 and 803 may be mounted in the housing 800, and the tail portion 812 may be disposed to accommodate the electronic components 802 and 803. According to an embodiment of the present disclosure, the tail portion 812 may include an inner space, and the wireless power transmission/reception member 811 may be disposed such that the electronic components 802 and 803 are disposed within the inner space. According to an embodiment of the present disclosure, the electronic components may include the above-described rear camera 802, various sensor modules, and a flash device 803.

Figure 8D:
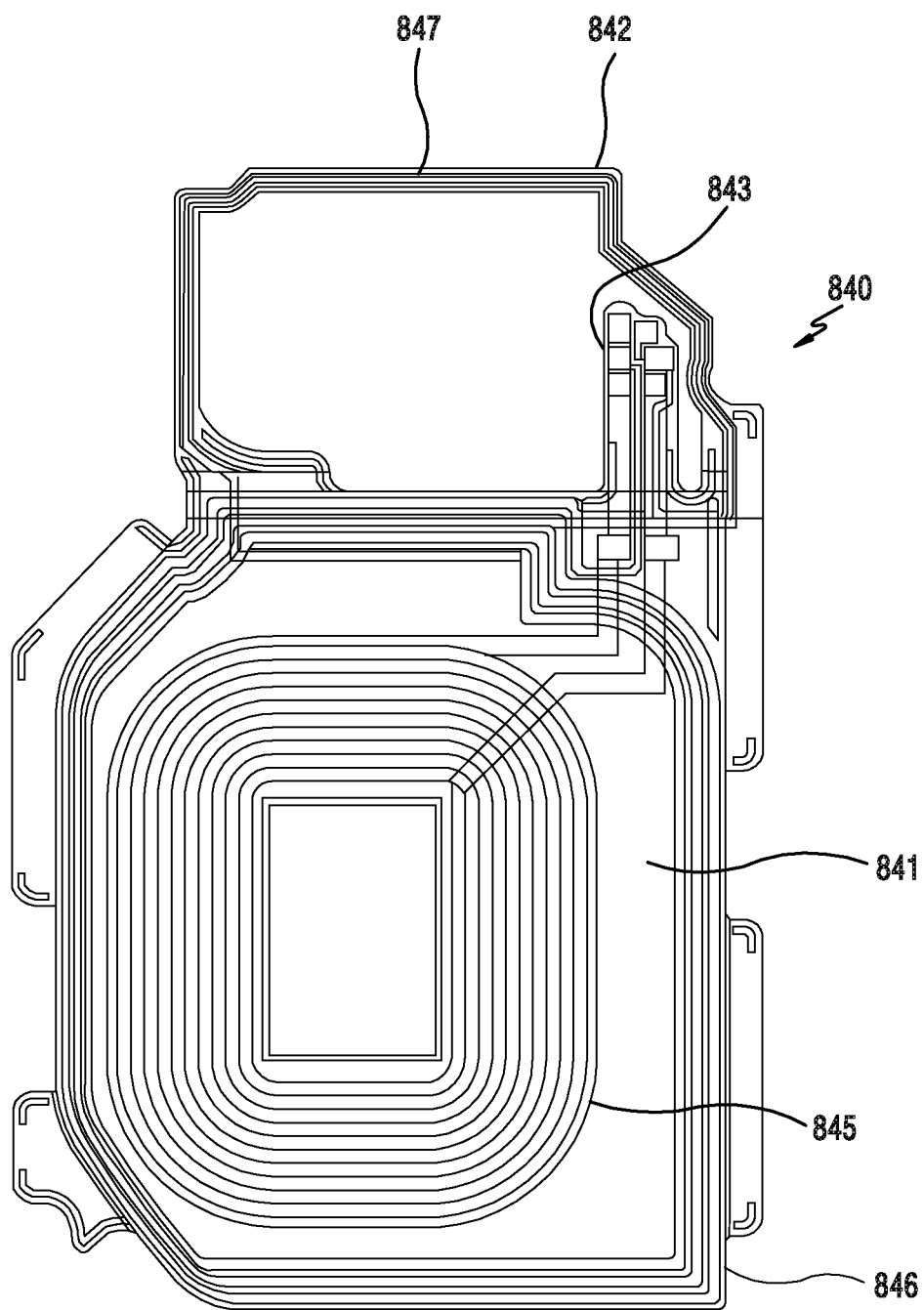
FIG. 8D is a configuration view illustrating a wireless power transmission/reception member according to various embodiments of the present disclosure.

FIG. 8D is a configuration view illustrating a wireless power transmission/reception member 840 according to various embodiments of the present disclosure.

Referring to FIG. 8D, the wireless power transmission/reception member 840 may include the body portion 841 applied to an opening of the housing, the tail portion 842 drawn out from the body portion 841 to have a certain inner space, and the contact portion 843 drawn from the body portion 841 to be in electrical and physical contact with contact terminals of the PCB.

According to various embodiments of the present disclosure, the wireless power transmission/reception member 840 may be formed in a film type, and may be disposed such that a plurality of coil-type antenna radiators are disposed on the same plane to be spaced apart from each other. Each of the antenna radiators may be connected to the contact portion 843. According to an embodiment of the present disclosure, in the body portion 841, a coil-type wireless charge antenna radiator 845 for use in wireless power charge (WPC) may be wound in a spiral type around the central portion of the body portion 841. According to an embodiment of the present disclosure, in the body portion 841, a coil-type antenna radiator 846 for use in MST may be disposed to surround the coil-type wireless charge antenna radiator 845. According to an embodiment of the present disclosure, a coil-type antenna radiator 847 for use in NFC may be disposed in a spiral type along the tail portion 842. According to an embodiment of the present disclosure, each of the coil-type antenna radiators 845, 846, 847 may be disposed on the same plane of a film to be spaced apart from each other.

Figure 9A:
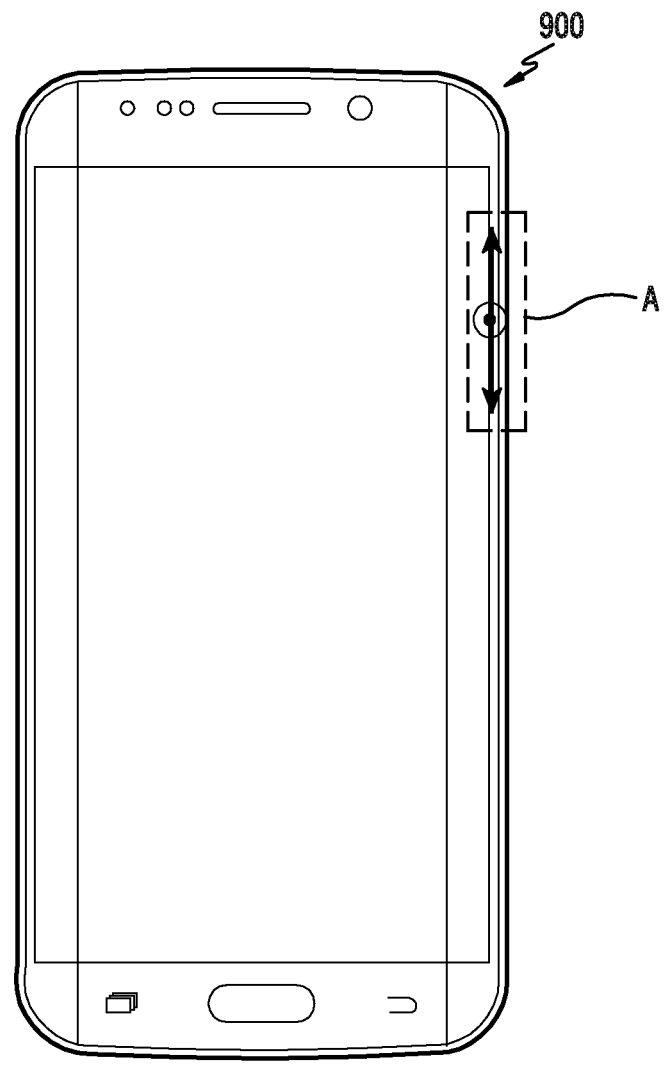
FIGS. 9A and 9B are views illustrating a use state of an electronic device according to various embodiments of the present disclosure.
Figure 9B:
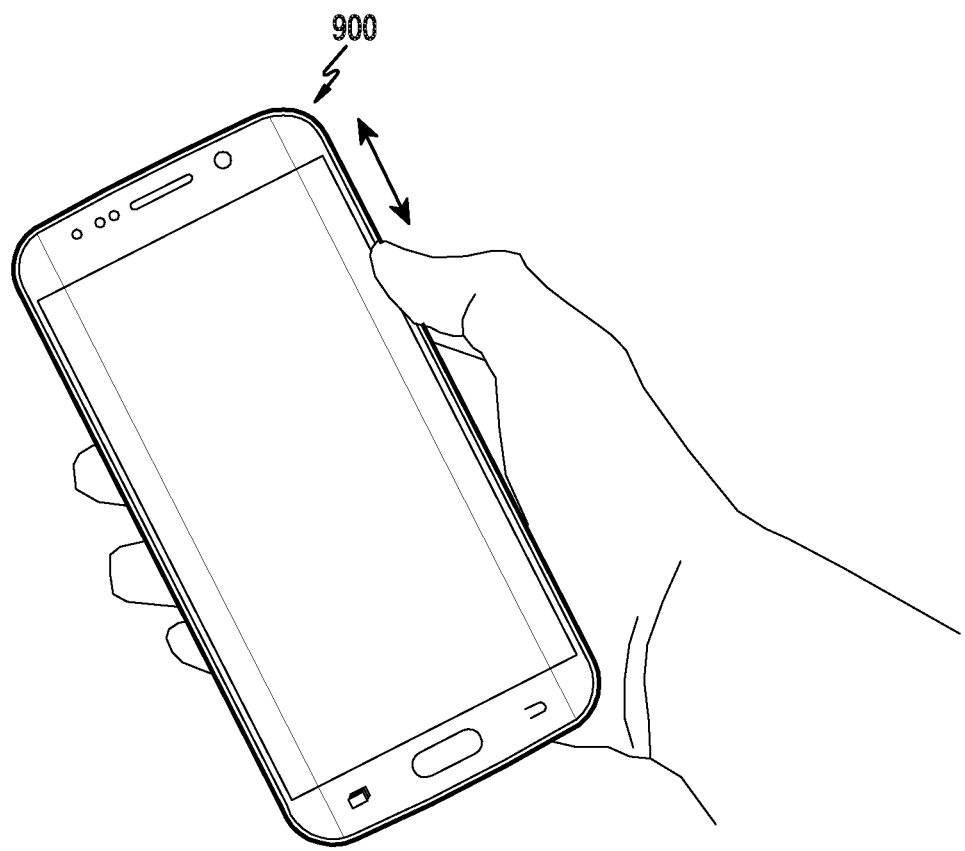

FIGS. 9A and 9B are views illustrating a use state of an electronic device according to various embodiments of the present disclosure.

Referring to FIGS. 9A and 9B, an electronic device 900, which includes a display having a curved area as described above, may not be equipped with physical key buttons on the side surfaces thereof as the left and right curvatures of the front and rear windows increase. In such a case, a structure, which is capable of implementing side key button functions in the left and right bent portions of the display area that occupies the side spaces of the electronic device 900, may be required. In such a case, in an "A" area in FIG. 9A, a corresponding function may be performed by an operation as illustrated in FIG. 9B, in addition to a touch function corresponding to a side key button function. Such a function may include a volume up/down function, a wake-up/sleep function, a power ON/OFF function, a power supply/cut-off function, and the like.

According to various embodiments of the present disclosure, such a finger touch recognition method enables recognition by a capacitive touch method similar to the display, and may be implemented by separately mounting a pressure sensor on the rear surface of the window in an additional method. According to an embodiment of the present disclosure, in order to allow the user to know a finger touch and a volume control, operation-related feedback transfer to the user may be performed using a vibration motor or a sound device.

Figure 10A:
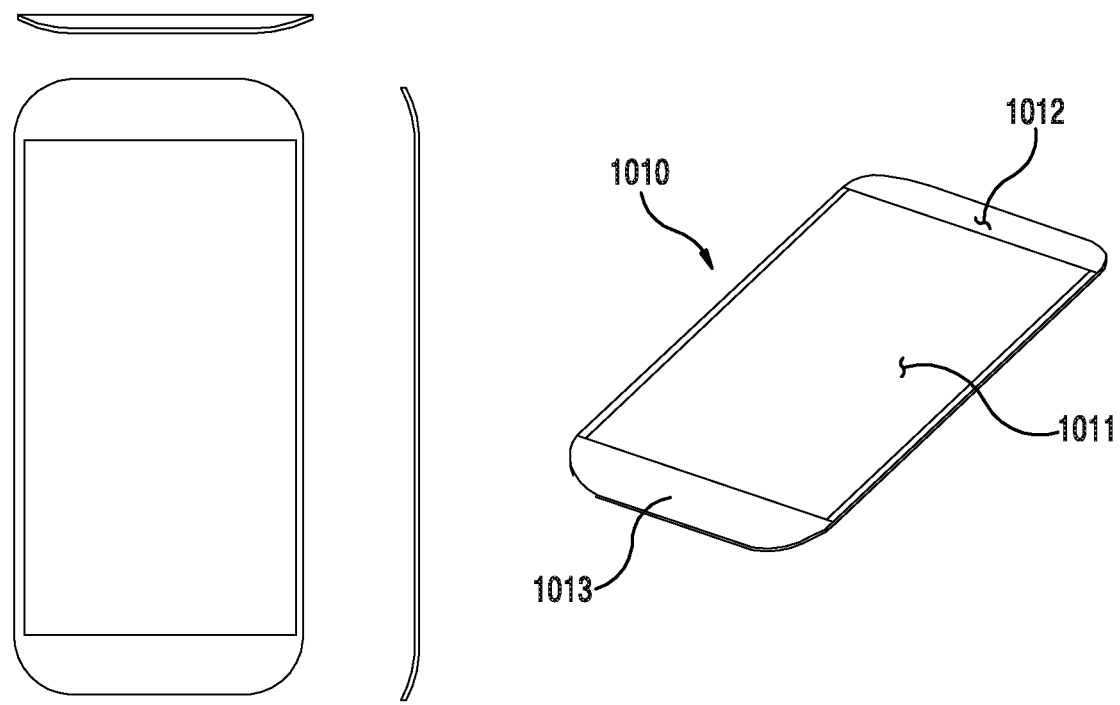
FIGS. 10A and 10B are views illustrating various shapes of front windows applied to an electronic device according to various embodiments of the present disclosure.
Figure 10B:
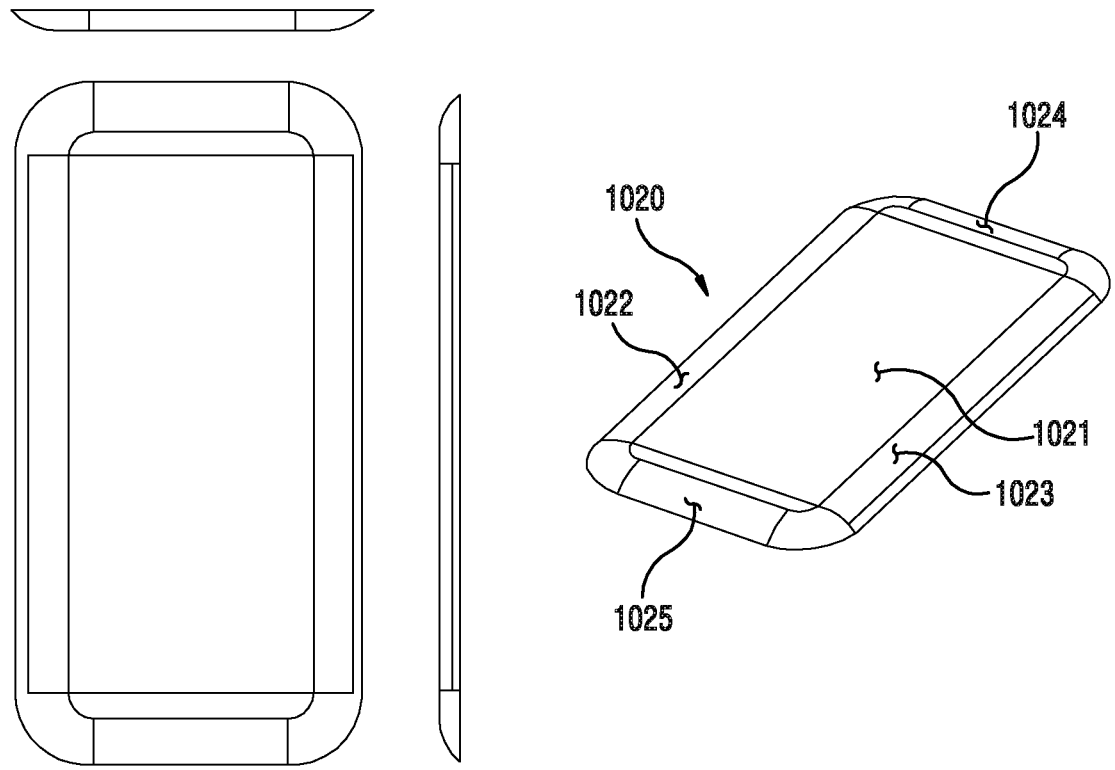

FIGS. 10A and 10B are views illustrating various shapes of front windows applied to an electronic device according to various embodiments of the present disclosure.

Referring to FIGS. 10A and 10B, each of front windows 1010 and 1020 is positioned on the front side of an electronic device so as to form the front surface. Each of the windows 1010 and 1020 may be formed of a transparent material so as to display a screen that is presented by a display module, and may provide an input/output window of various sensor modules.

Referring to FIG. 10A, the front window 1010 may include bent portions that are formed by bending an upper area 1012 and a lower area 1013 with reference to a display area 1011. In such a case, a display module corresponding to the front window 1010 may also be formed in the corresponding shape.

Referring to FIG. 10B, the front window 1020 may include bent portions formed by bending a left area 1022, a right area 1023, an upper area 1024, and a lower area 1025 with reference to the display area 1021. In addition, in such a case, a display module corresponding to the front window may be disposed in the corresponding shape.

According to various embodiments of the present disclosure, each of the above-described front windows 1010 and 1020 may be formed as a 3D type, in which the thickness from the display area to the bent areas is uniform, or may be formed in a 2.5D type, in which the front surface of each of the front windows 1010 and 1020 has a curvature, and the rear surface has a planar shape.

Figure 11A:
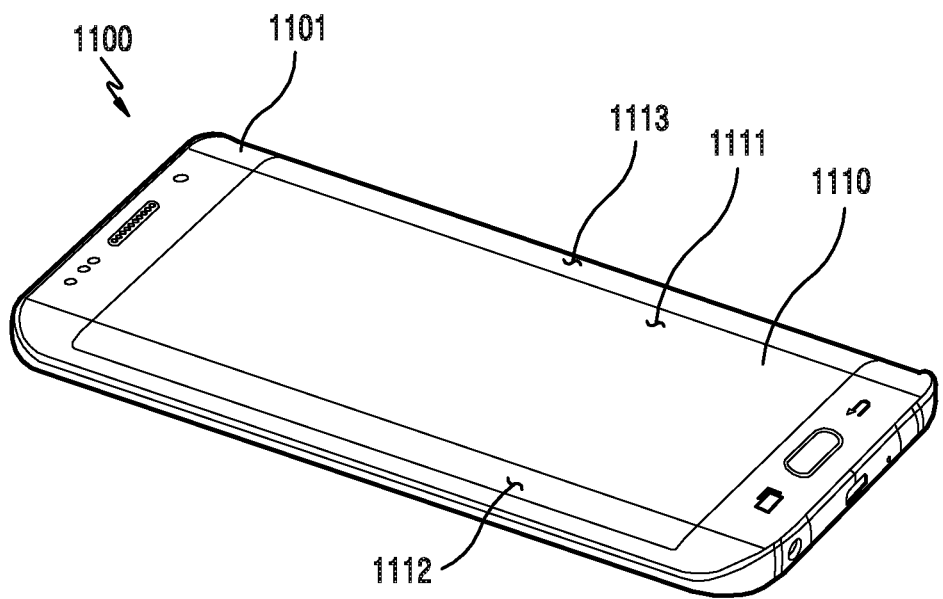
FIG. 11A is a front side perspective view of an electronic device according to various embodiments of the present disclosure.
Figure 11B:
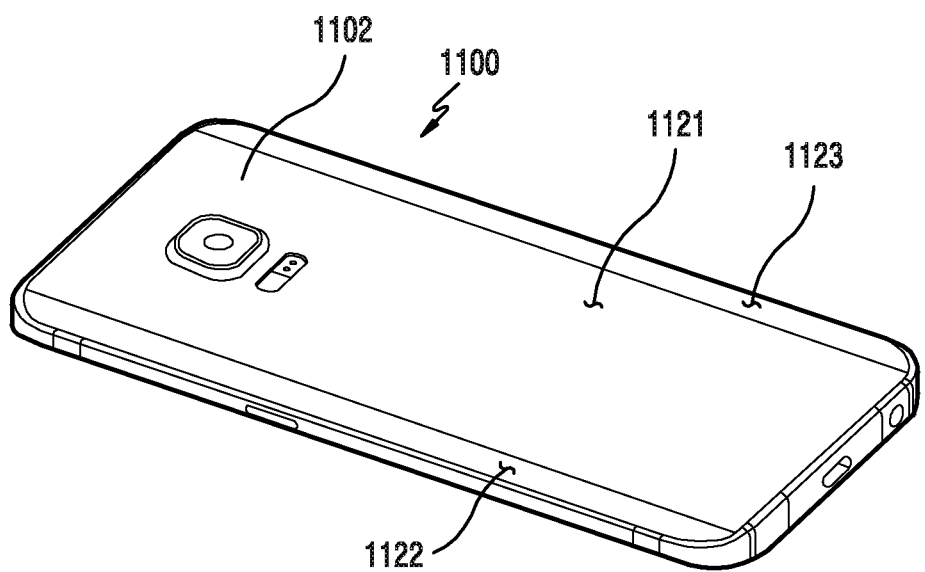
FIG. 11B is a rear side perspective view of an electronic device according to various embodiments of the present disclosure.
Figure 11C:
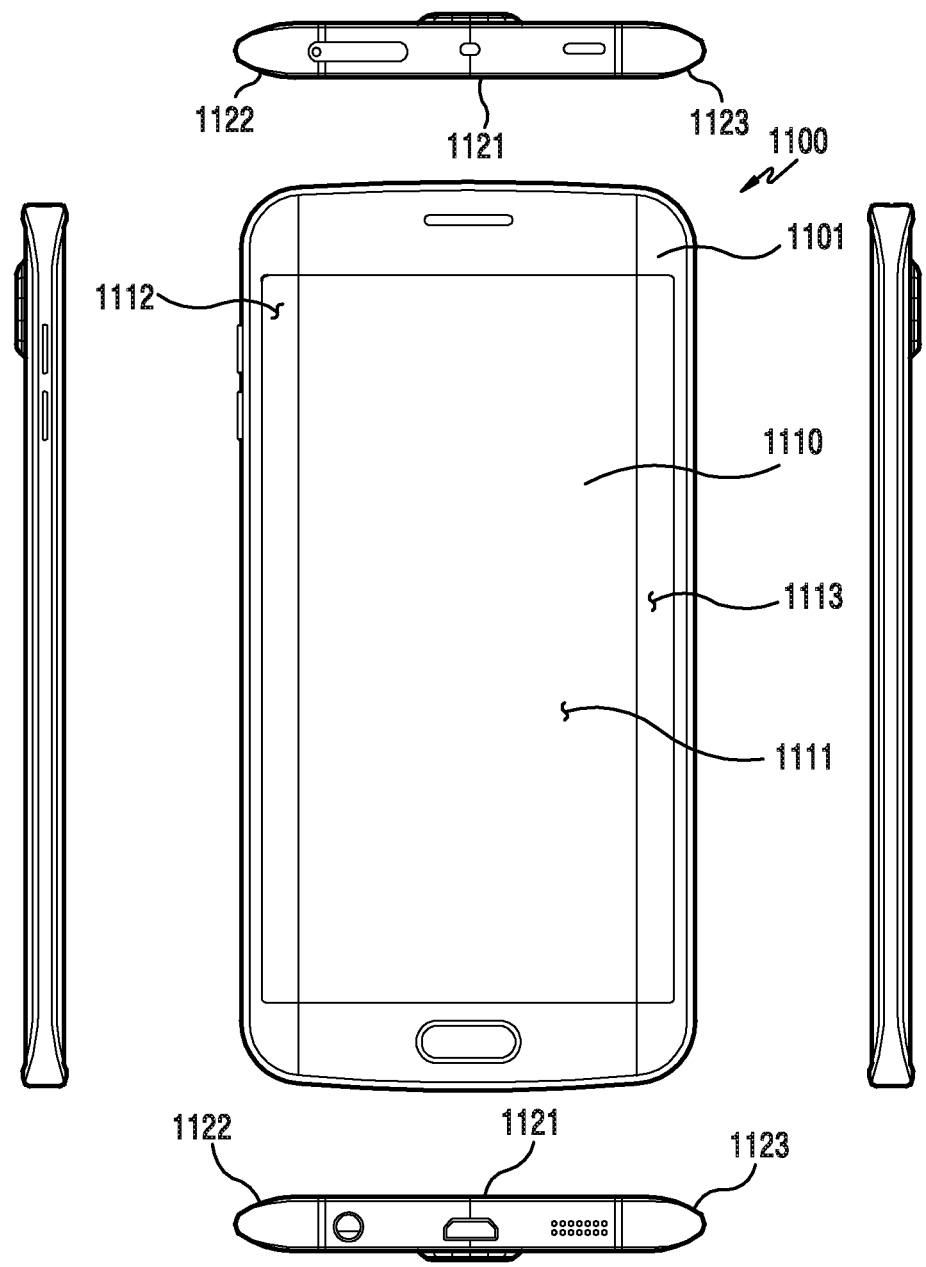
FIG. 11C illustrates views obtained by viewing an electronic device in various directions according to various embodiments of the present disclosure.

FIG. 11A is a front side perspective view of an electronic device according to various embodiments of the present disclosure. FIG. 11B is a rear side perspective view of an electronic device according to various embodiments of the present disclosure. FIG. 11C illustrates views obtained by viewing an electronic device in various directions according to various embodiments of the present disclosure.

The configuration illustrated in FIGS. 11A to 11C is generally similar to the configuration illustrated in FIGS. 2A to 2C, except for the configuration of the front window and the rear window. Accordingly, descriptions of overlapping technical contents will be omitted.

Referring to FIGS. 11A to 11C, according to various embodiments of the present disclosure, an electronic device 1100 may include a front surface 1101 that may be formed by a transparent window. According to an embodiment of the present disclosure, the front surface 1101 may include a display area 1110. According to an embodiment of the present disclosure, the front surface 1101 may include a planar portion 1111, and a left bent portion 1112 and a right bent portion 1113, which are formed by bending left and right areas with reference to the planar portion 1111, respectively.

According to various embodiments of the present disclosure, the electronic device 1100 may include a rear surface 1102, which may also be formed by a transparent window. According to an embodiment of the present disclosure, the rear surface 1102 may include a planar portion 1121, and a left bent portion 1122 and a right bent portion 1123, which are formed by bending left and right areas with reference to the planar portion 1121, respectively.

According to various embodiments of the present disclosure, the left and right bent portions 1112 and 1113 of the front surface 1101, and the left and right bent portions 1122 and 1123 of the rear surface 1102 may be formed such that the bent sizes thereof are equal to each other. Without being limited thereto, however, the left and right bent portions 1112 and 1113 of the front surface 1101 and the left and right bent portions 1122 and 1123 of the rear surface 1102 may be formed such that at least one of them has a different size. According to an embodiment of the present disclosure, the windows of the front surface 1101 and the rear surface 1102 may be formed in the above-described 3D type or 2.5D type.

According to various embodiments of the present disclosure, it is possible to provide a portable electronic device that includes a transparent front glass cover that includes a planar surface that forms a front surface of the electronic device, a planar rear glass cover that forms a rear surface of the electronic device, a metal bezel that surrounds a space formed by the front glass cover and the rear glass cover, and a flexible display device that is embedded in the space and exposed through the front glass cover.

The front glass cover includes a first curved surface that extends from a first side edge of the planar surface, and a second curved surface that extends from a second side edge of the planar surface and is formed opposite to the first curved surface. The flexible display device includes a touch screen that extends along the first curved surface, the planar surface, and the second curved surface.

The metal bezel includes a first side surface that encloses an edge of the first curved surface, a second side surface that encloses an edge of the second curved surface, a third side surface that interconnects one end of the first side surface and one end of the second side surface, and a fourth side surface that interconnects the other end of the first side surface and the other end of the second side surface.

The first side surface and the second side surface have a first height, and the third side surface and the fourth side surface have a second height that is larger than the first height.

According to various embodiments of the present disclosure, in a corner where the first side surface and the third side surface are interconnected and in a corner where the first side surface and the fourth side surface are interconnected, the height of the first side surface may gradually increase from the first height to the second height.

According to various embodiments of the present disclosure, in a corner where the second side surface and the third side surface are interconnected and in a corner where the second side surface and the fourth side surface are interconnected, the height of the second side surface may gradually increase from the first height to the second height.

According to various embodiments of the present disclosure, the portable electronic device may further include a communication receiver speaker that penetrates an opening that is formed through the front glass cover.

According to various embodiments of the present disclosure, the portable electronic device may further include a processor and a memory within the space. The memory may store instructions that, upon being executed, cause the processor to display a first screen on a first area of the touch screen, which is positioned on the planar surface, a second screen, which is differentiated from the first screen, on a second area of the touch screen, which is positioned on the first curved surface, and a third screen, which is differentiated from the first screen, on a third area of the touch screen, which is positioned on the second curved surface.

According to various embodiments of the present disclosure, the flexible display device may include a single flexible OLED display that extends along the first curved surface, the planar surface, and the second curved surface.

According to various embodiments of the present disclosure, the portable electronic device may further include a first non-metal portion and a second non-metal portion that are formed on the third side surface perpendicular to a longitudinal direction of the third side surface.

According to various embodiments of the present disclosure, the portable electronic device may further include at least one of an opening on the third side surface between the first non-metal portion and the second non-metal portion, a SIM tray that is removably inserted into the opening, and an infrared (IR) device that is exposed on the third side surface.

According to various embodiments of the present disclosure, the first non-metal portion may be positioned close to the first side surface and the second non-metal surface may be positioned close to the second side surface, and the IR device may be positioned in a middle portion of the third side surface between the first non-metal portion and the second non-metal portion.

According to various embodiments of the present disclosure, the portable electronic device may further include an opening that is formed on the third side surface between the first non-metal portion or the second non-metal portion and the IR device. The SIM tray may be removably inserted into the opening.

According to various embodiments of the present disclosure, the portable electronic device may further include a third non-metal portion and a fourth non-metal portion that are formed on the fourth side surface perpendicular to a longitudinal direction of the fourth side surface.

According to various embodiments of the present disclosure, the portable electronic device may further include at least one of an audio device insertion hole, a connector opening, and a speaker hole on the fourth side surface between the third non-metal portion and the fourth non-metal portion.

According to various embodiments of the present disclosure, the third non-metal portion may be positioned close to the first side surface and the fourth non-metal portion may be positioned close to the second side surface. The connector opening may be positioned in a middle portion of the third side surface between the third non-metal portion and the fourth non-metal portion.

According to various embodiments of the present disclosure, the audio device insertion hole may be positioned between the third non-metal portion and the connector opening, and the speaker hole is positioned between the fourth non-metal portion and the connector opening.

According to various embodiments of the present disclosure, the portable electronic device may further include at least one of an NFC antenna, a wireless charge coil, and a magnetic emulator antenna within the space close to the rear glass cover.

According to various embodiments of the present disclosure the portable electronic device may further include at least one opening and at least one sound control key on the first side surface or the second side surface, the sound control key being configured to be pushed through the opening.

According to various embodiments of the present disclosure, the portable electronic device may further include at least one opening and a power key on the second side surface or the first side surface, which is opposite to the first side surface or the second side surface that includes the sound control key, the power key being configured to be pushed through the opening.

According to various embodiments of the present disclosure, the portable electronic device may further include a first touch area on a part of the first curved surface and/or a second touch area on a part of the second curved surface. The electronic device may be configured to receive a volume control input through at least one of the first touch area and the second touch area.

According to various embodiments of the present disclosure, the volume control input may include a gesture input on a part of the first touch area or the second touch area.

According to various embodiments of the present disclosure, the portable electronic device may further include a first touch area on a part of the first curved surface and/or a second touch area on a part of the second curved surface. The electronic device may be configured to receive a power ON or OFF input through at least one of the first touch area and the second touch area.

According to various embodiments of the present disclosure, it is possible to provide a portable electronic device that includes a transparent front glass cover that includes a first planar surface that forms a front surface of the electronic device, a planar rear glass cover that includes a second planar surface that forms a rear surface of the electronic device, a metal bezel that surrounds a space formed by the front glass cover and the rear glass cover, and a flexible display device that is embedded in the space and exposed through the front glass cover.

The front glass cover includes a first curved surface that extends from a first side edge of the first planar surface, and a second curved surface that extends from a second side edge of the first planar surface and is formed opposite to the first curved surface.

The rear glass cover includes a third curved surface that extends from a first side edge of the second planar surface, and a fourth curved surface that extends from a second side edge of the second planar surface and is formed opposite to the third curved surface.

The flexible display device includes a touch screen that extends along the first curved surface, the first planar surface, and the second curved surface.

The metal bezel includes a first side surface that encloses edges of the first curved surface and the third curved surface, a second side surface that encloses edges of the second curved surface and the fourth curved surface, a third side surface that interconnects one end of the first side surface and one end of the second side surface, and a fourth side surface that interconnects the other end of the first side surface and the other end of the second side surface.

The first side surface and the second side surface have a first height and the third side surface and the fourth side surface have a second height that is larger than the first height.

Figure 12A:
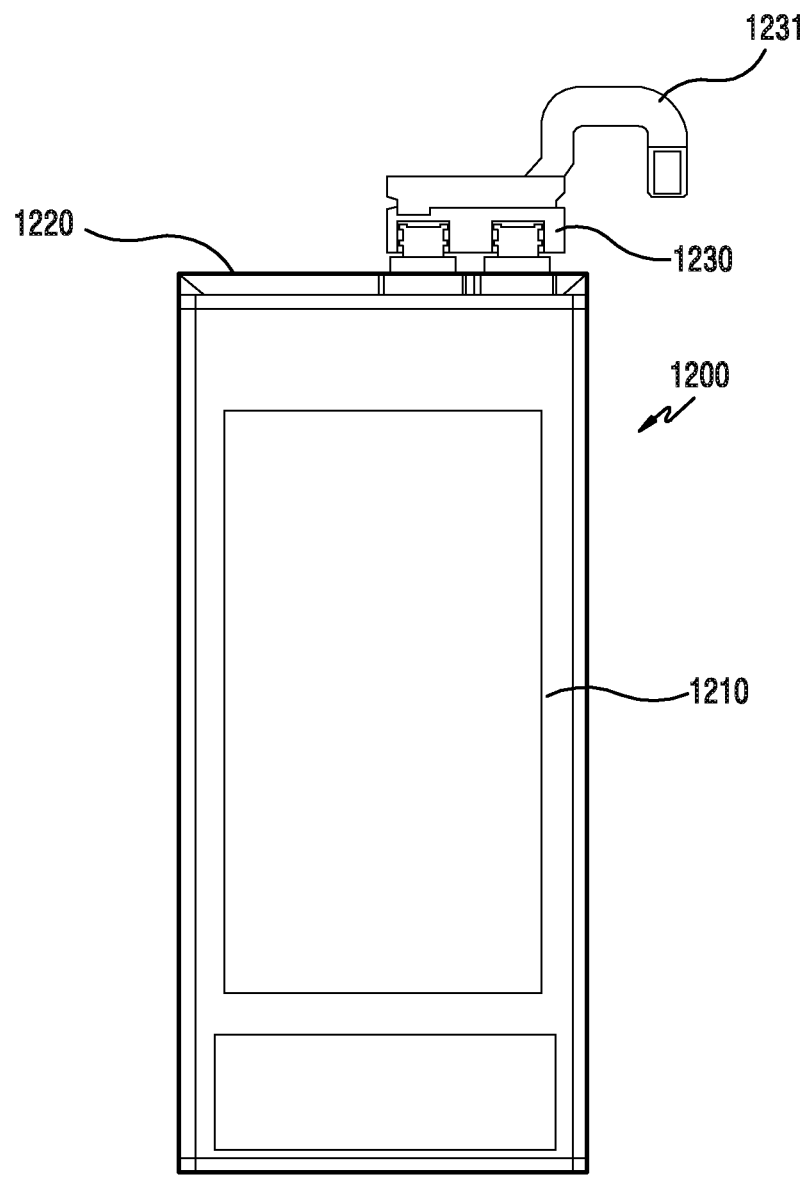
FIG. 12A is a configuration view illustrating a battery pack according to various embodiments of the present disclosure.

FIG. 12A is a configuration view illustrating a battery pack according to various embodiments of the present disclosure.

Referring to FIG. 12A, a battery pack 1200 includes a battery cell 1210, a power control module (PCM) unit 1230 disposed on a side area of the upper side of the battery cell 1210, and a connection terminal portion 1231 that is drawn out from the PCM unit 1230 and electrically connected to a PCB of an electronic device. According to an embodiment of the present disclosure, the PCM unit 1230 may be installed on a pouch terrace 1220 that is disposed on the upper portion of the battery cell 1210. According to an embodiment of the present disclosure, the battery pack 1200 may be configured as a battery pack that is integrally embedded in the electronic device.

According to various embodiments of the present disclosure, the PCM unit 1230 may perform functions of detecting, when the voltage of the battery pack increases due to a charge voltage and a charge current that are input from the outside, a battery voltage, and cutting off and releasing the charge current such that the battery is not charged to a level that is equal to or higher than an over-charge voltage set in a module. According to an embodiment of the present disclosure, the PCM unit 1230 may perform a function of detecting, when the voltage of the battery is gradually discharged due to the current consumed to the outside, the battery voltage, and cutting off and releasing the discharge current such that the battery is not discharged to a level that is equal to or lower than an over-discharge voltage set in the module. According to an embodiment of the present disclosure, the PCM unit 1230 may perform a function of cutting off and releasing a charge or discharge current such that the current is charged or discharged to a level that is equal to or higher than an over-current set in the module due to an abnormal phenomenon of an electronic device or a charge device. According to an embodiment of the present disclosure, when plus (+) and minus (−) terminals are short-circuited in the outside of the battery pack, a current of about 20 times the capacity of the battery pack flows instantly. The PCM unit 1230 may perform functions of preventing an accident and protecting the battery pack by cutting off the current.

While a battery pack is disposed in parallel with a PCB in an electronic device (for example, disposed in parallel with the exterior of the battery pack), a restriction may be imposed in arranging electronic components according to the mounting space of the battery pack by the PCM unit that is uniformly disposed on the upper portion of the battery pack. For example, due to the shape of the rectangular battery pack, the battery pack may occupy a large space in the entire length direction of the PCM unit. Accordingly, it is necessary to make the arrangement of the PCM unit of the battery pack variable so as to maximize a space efficiency according to the mounting of the battery pack, thereby contributing to the slimming of the electronic device.

Figure 12B:
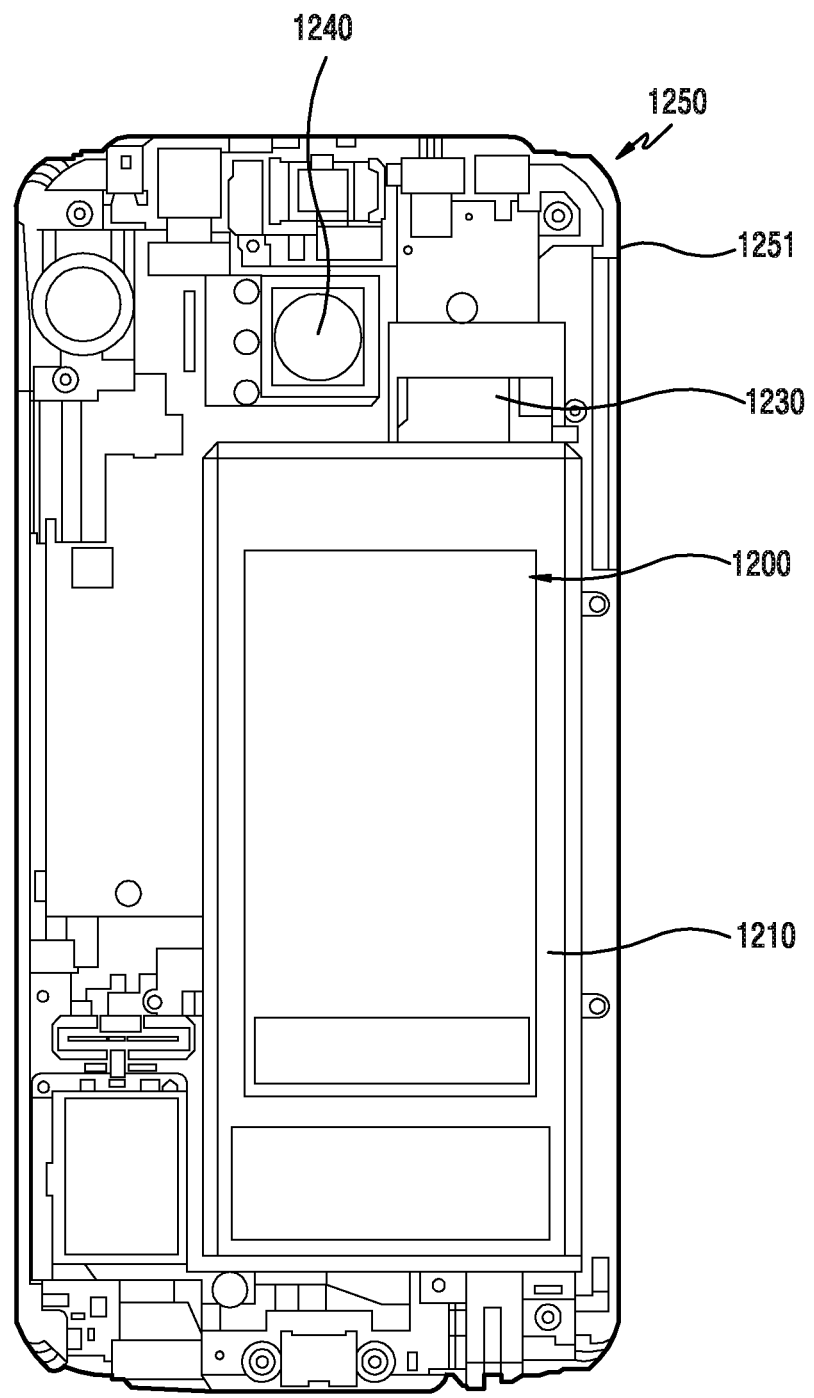
FIG. 12B is a configuration view illustrating a state in which a battery pack is applied to a housing of an electronic device according to various embodiments of the present disclosure.
Figure 12C:
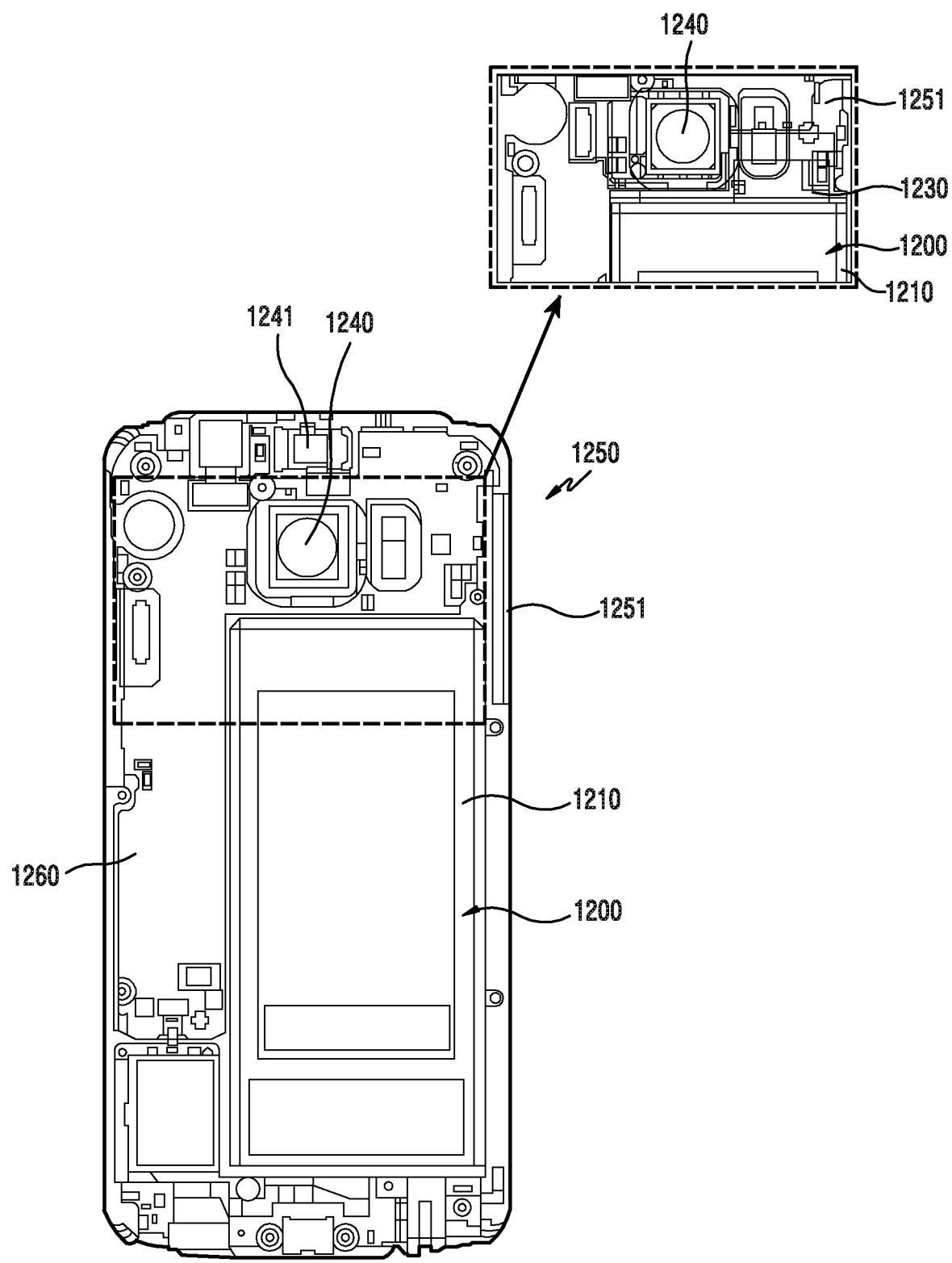
FIG. 12C is a configuration view illustrating a state in which a battery pack is applied to a housing and a PCB of an electronic device according to various embodiments of the present disclosure.

FIG. 12B is a configuration view illustrating a state in which battery pack is applied to a housing of an electronic device according to various embodiments of the present disclosure. FIG. 12C is a configuration view illustrating a state in which a battery pack is applied to a housing and a PCB of an electronic device according to various embodiments of the present disclosure.

Referring to FIGS. 12B and 12C, the battery pack 1200 may be mounted in the housing 1251 of the electronic device 1250. According to an embodiment of the present disclosure, the PCM unit 1230 of the battery pack 1200 is formed to be biased to one side in the entire length direction, and an electronic component 1240 may be disposed in the area where the PCM unit 1230 is not disposed. According to an embodiment of the present disclosure, the PCM unit 1230 may be disposed at a position where it is overlapped with the PCB 1260 of the electronic device 1250. According to an embodiment of the present disclosure, the PCM unit 1230 may be disposed at a position where it is overlapped with the PCB 1260 and to avoid the electronic component 1240 that is mounted on and protrude from the PCB 1260. According to an embodiment of the present disclosure, the electronic component 1240 may include a component that is mounded on and protrudes from the PCB 1260, such as a memory, a processor, various elements, a camera device, various sensor modules (e.g., a heart rate monitor (HRM) sensor module), a flash, and the like.

Figure 13:
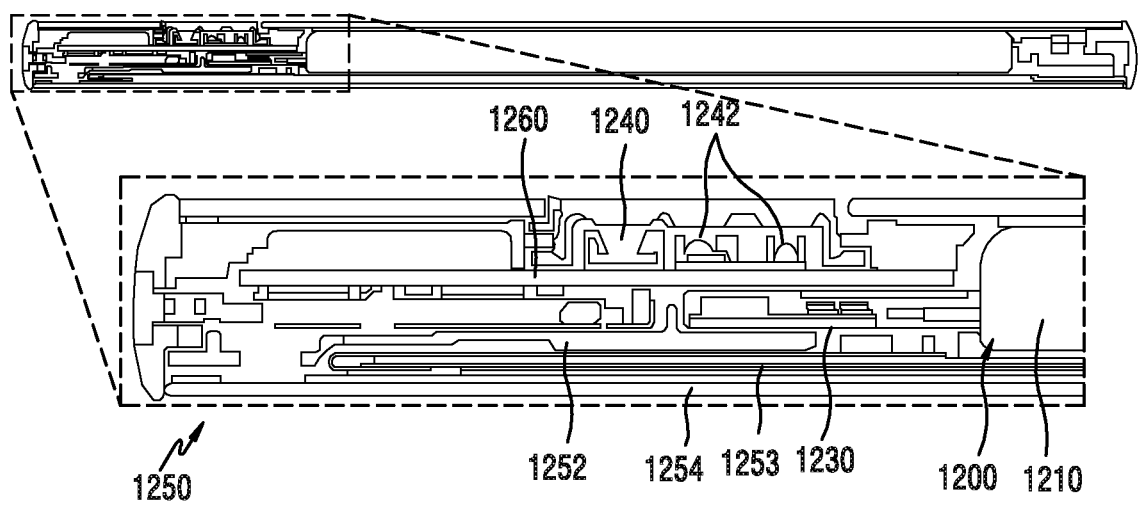
FIG. 13 is a cross-sectional view illustrating a principal portion of an electronic device in a state where a battery pack and a PCB are overlapped with each other according to various embodiments of the present disclosure.

FIG. 13 is a cross-sectional view illustrating a principal portion of an electronic device in a state where a battery pack and a PCB are overlapped with each other according to various embodiments of the present disclosure.

Referring to FIG. 13, the electronic device 1250 may include the battery pack 1200 mounted therein. According to an embodiment of the present disclosure, the battery cell 1210 of the battery pack 1200 may be mounted in parallel with the PCB 1260 of the electronic device 1250 to avoid the PCB 1260. According to an embodiment of the present disclosure, the battery pack 1200 may be configured such that the PCM unit 1230 is drawn out by a certain length, and may be disposed such that at least a part of the PCM unit 1230 is overlapped with the PCB 1260.

According to various embodiments of the present disclosure, the PCM unit 1230 may be disposed on the bottom of the PCB 1260, and various electronic components 1240 and 1242 may be disposed on the top of the PCB 1260. According to an embodiment of the present disclosure, the electronic component may be at least one of a memory, a processor, various elements, a camera device, various sensor modules, and a flash device. According to an embodiment of the present disclosure, by disposing the PCM unit 1230 to overlap with the PCB 1260, in the bottom area of the PCB 1260 that contributes to the thickness of the battery pack 1200, the window 1254 that includes the display 1253 and the bracket 1252 that supports the display 1253 may be at least partially accommodated.

Figure 14A:
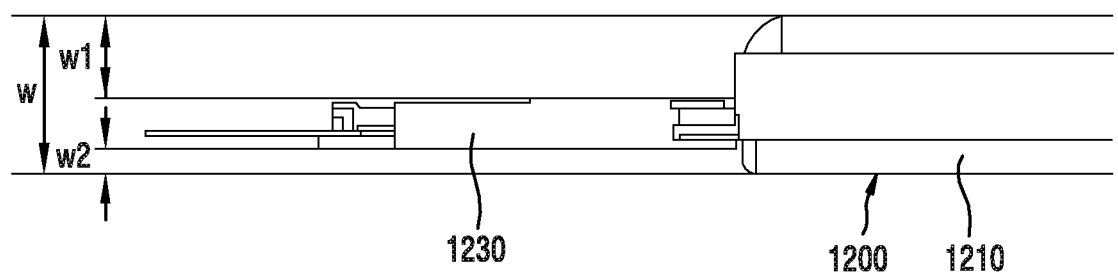
FIGS. 14A and 14B are views illustrating a principal portion of an electronic device, in which methods of mounting electronic components using a thickness of a battery pack are illustrated according to various embodiments of the present disclosure.
Figure 14B:
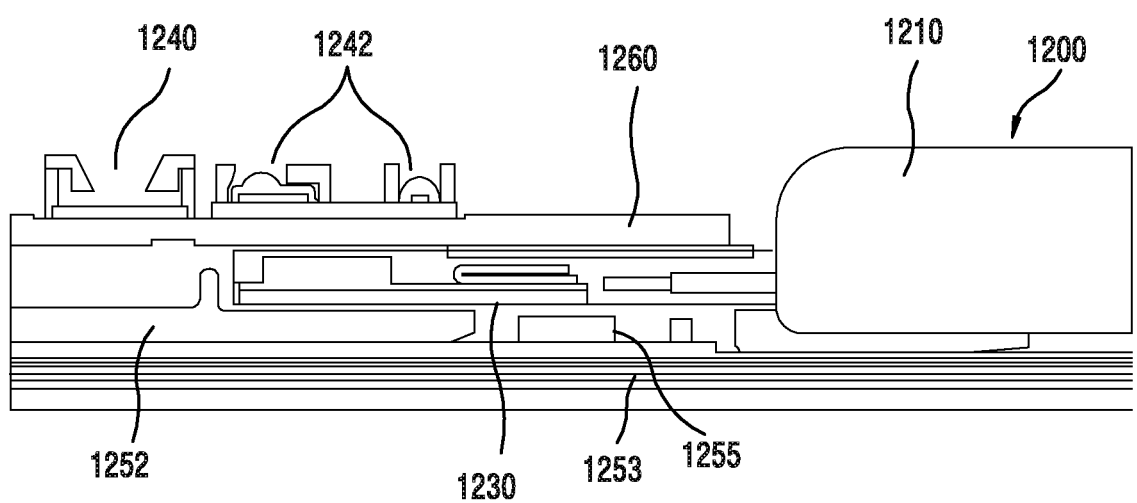

FIGS. 14A and 14B are views illustrating a principal portion of an electronic device, in which methods of mounting electronic components using a thickness of a battery pack are illustrated according to various embodiments of the present disclosure.

Referring to FIGS. 14A and 14B, in the entire thickness w of the battery pack 1200, the remaining thicknesses w1 and w2, except the thickness of the PCM unit 1230, may be used as mounting spaces for various electronic components 1240, 1242, and 1255, including the PCB 1260 of the electronic device.

According to various embodiments of the present disclosure, in the upper area of the PCM unit 1230, the PCB 1260 and electronic components 1240 and 1243, such as a memory, a processor, various elements, a camera device, various sensor module, and a flash device, which are mounted on the top of the PCB 1260, may be disposed.

According to an embodiment of the present disclosure, in the entire thickness w of the battery pack 1200, the upper thickness w1, except the thickness of the PCM unit 1230, may contribute to at least a part of a space, in which the PCB 1260 and electronic components 1240 and 1242, such as a memory, a processor, various elements, a camera device, various sensor module, and a flash device, which are mounted on the top of the PCB 1260, may be applied. According to an embodiment of the present disclosure, in the thickness w of the battery pack 1200, the lower thickness w2, except the thickness of the PCM unit 1230, may contribute to at least a part of a space, in which an electronic component for the display 1253 and the bracket 1252 for supporting the display 1253 are applied.

Figure 15:
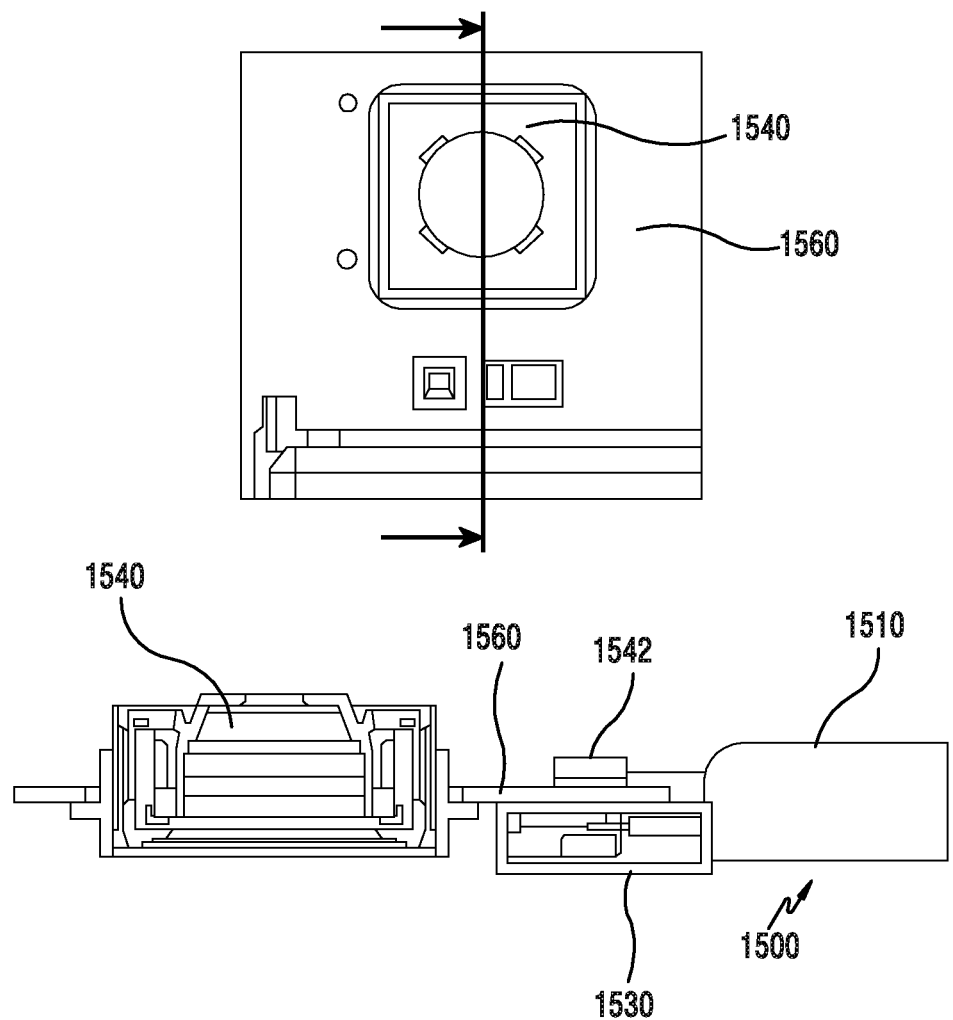
FIG. 15 is a view illustrating a disposed relationship between a PCM unit of a battery pack and electronic components according to various embodiments of the present disclosure.

FIG. 15 is a view illustrating a disposed relationship between a PCM unit of a battery pack and electronic components according to various embodiments of the present disclosure.

Referring to FIG. 15, when a sensor module and a flash device 1542 are arranged below a camera module 1540 as the electronic components, the battery cell 1510 of the battery pack 1500 may be disposed in parallel with the PCB 1560 and the camera device 1540 mounted on the PCB 1560. According to an embodiment of the present disclosure, the PCM unit 1530 of the battery pack 1500 may be disposed to overlap with the sensor module and the flash device 1542 which are mounted on the PCB 1560. According to an embodiment of the present disclosure, the sensor module and the flash device 1542 may be mounted on the top of the PCB 1560, and the PCM unit 1530 of the battery pack 1500 may be disposed on the bottom of the PCB 1560 to overlap with the sensor module and the flash device 1542. Accordingly, as compared to an existing mounting structure in which the battery pack 1500 is disposed in parallel with the PCB 1560, it is possible to secure a component mounting space or to increase the capacity of the battery cell 1510.

Figure 16:
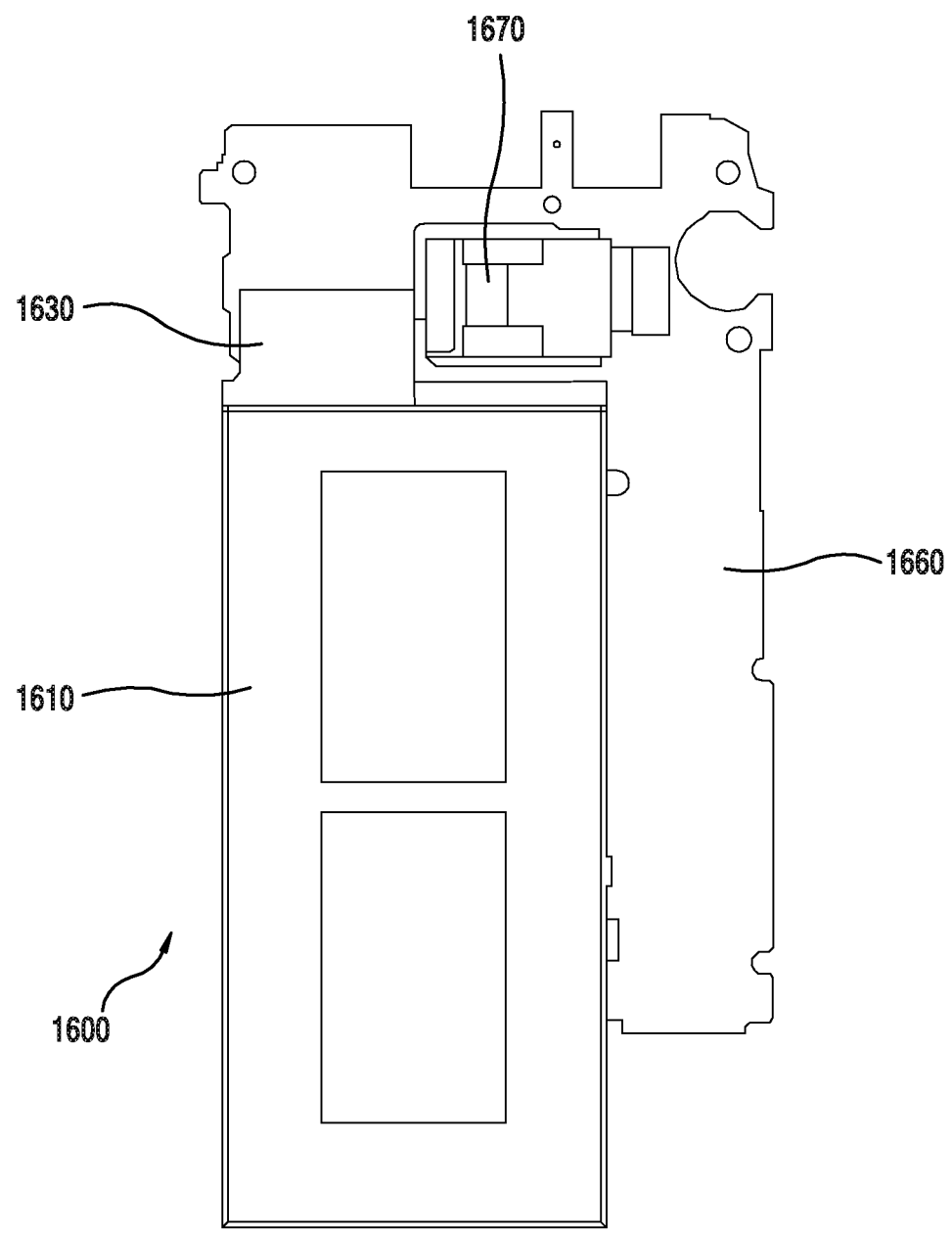
FIG. 16 is a configuration view illustrating a disposed relationship between a power control module (PCM) unit of a battery pack and an electronic component according to various embodiments of the present disclosure.

FIG. 16 is a configuration view illustrating a disposed relationship between a PCM unit of a battery pack and an electronic component according to various embodiments of the present disclosure.

Referring to FIG. 16, a battery cell 1610 of a battery pack 1600 may be mounted to avoid a PCB 1660. For example, the battery cell 1610 may be disposed at least on the same plane as the PCB 1660. However, a PCM unit 1630, which is disposed to be weighted to the upper side of the battery cell 1610, may be disposed to be at least partially overlapped with and to be electrically connected to the PCB 1600. In addition, on the PCB 1660, a socket device as an electronic component 1670 may be mounted around an area in which the PCM unit 1630 of the battery pack 1600 is disposed. According to an embodiment of the present disclosure, the socket device may accommodate a card-type external device (e.g., a SIM card, a UIM card, a card-type memory, and the like).

According to various embodiments of the present disclosure, the PCM unit 1630 of the battery pack 1600 is disposed to overlap with the top portion of the PCB 1660, and the socket device is disposed in parallel with the PCM unit 1630 at a side of the PCM unit 1630 so that the wiring space shortage of the PCB 1660, which is caused due to the PCM unit 1630 of the battery pack 1600, can be addressed.

Figure 17A:
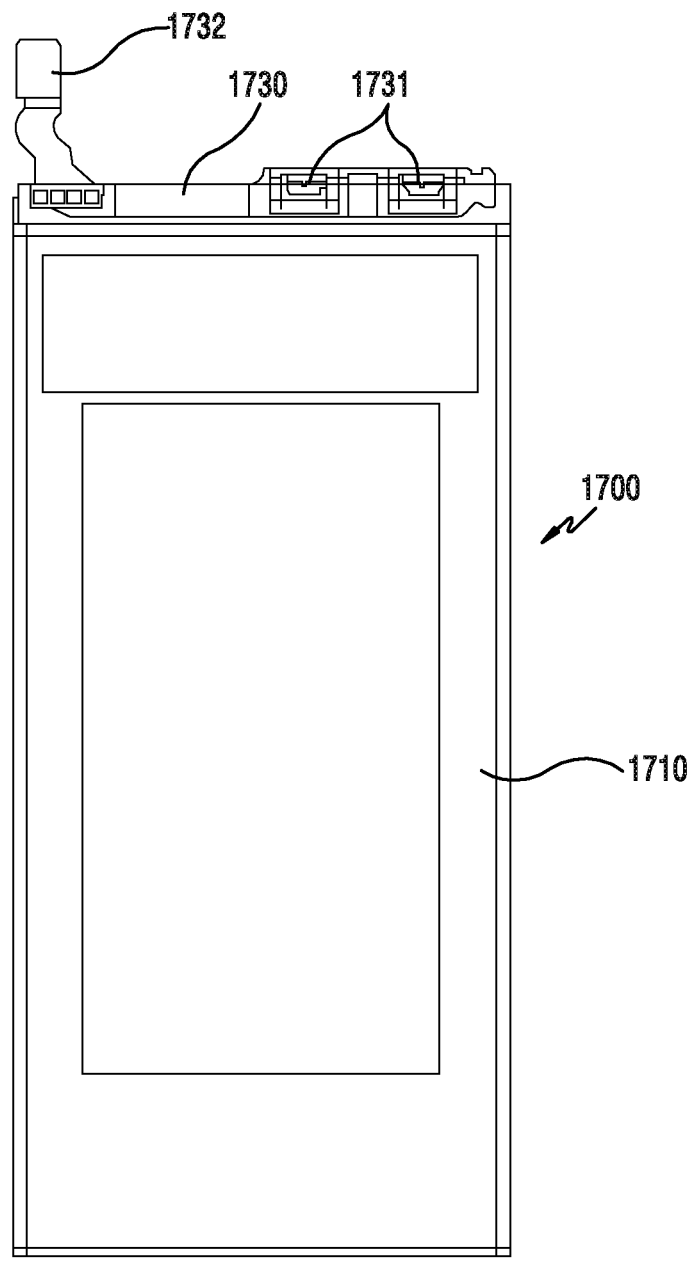
FIGS. 17A and 17B are configuration views illustrating a disposed relationship between a PCM unit of a battery pack and a PCB of an electronic device according to various embodiments of the present disclosure.
Figure 17B:
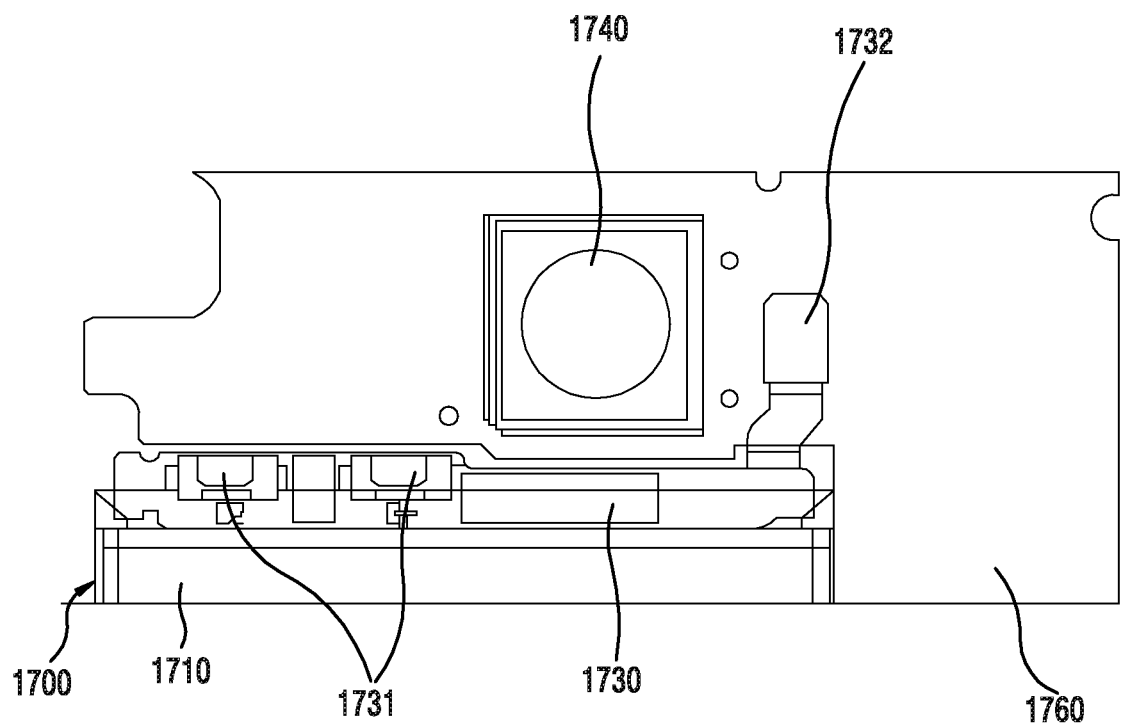

FIGS. 17A and 17B are configuration views illustrating a disposed relationship between a PCM unit of a battery pack and a PCB of an electronic device according to various embodiments of the present disclosure.

Referring to FIGS. 17A and 17B, a pouch terrace 1730 having a certain width and length may be formed on the top of a battery pack 1700. According to an embodiment of the present disclosure, a PCM unit 1731 may be disposed at one side of the pouch terrace 1730, and a connection terminal portion 1732 may be formed to be drawn out by a certain length so as to be electrically connected to a PCB 1750 at the other side of the pouch terrace 1730. According to an embodiment of the present disclosure, the connection terminal portion 1732 may be disposed to be individually drawn out along the pouch terrace 1730 at a side of the pouch terrace 1730, rather than being directly drawn out from the PCM unit 1731.

According to various embodiments of the present disclosure, the PCM unit 1731 may be formed to have a relatively small height and disposed in parallel with the PCB 1750, and the connection terminal portion 1732 may be electrically connected to a side of the PCB 1750 to avoid the camera device 1740. Accordingly, the battery pack 1700 is disposed in a state where the connection terminal portion 1732 and the PCM unit 1731 are separated from the battery cell 1710 so that the volume of the PCM unit 1731 can be reduced so as to increase the capacity of the battery pack 1700 and the area of the PCB 1750 can be increased so as to secure a wiring space.

According to various embodiments of the present disclosure, there is provided a portable electronic device that may include a front glass cover that forms a front surface of the electronic device, a rear cover that forms a rear surface of the electronic device, a side surface unit that surrounds a space that is formed by the front glass cover and the rear cover, a display module that is embedded in the space and includes a screen area exposed through the front glass cover, a PCB that is disposed between the display module and the rear cover, and includes an opening that is at least partially closed, a battery that is installed within the opening and interposed between the display module and the rear cover, and a PCM that is positioned between the PCB and the display module, and is disposed close to one side of the battery when viewed from a position above the PCB.

According to various embodiments of the present disclosure, the rear cover and the side surface unit may be formed integrally with each other.

According to various embodiments of the present disclosure, the rear cover and the side surface unit may include the same material. According to an embodiment of the present disclosure, the material may be a metal.

According to various embodiments of the present disclosure, the electronic device may further include a camera module that is disposed close to the one side of the battery and one side of the PCM when viewed from a position above the PCB. The camera module includes a portion interposed between the display module and the rear cover. The camera module may include a lens that is exposed through the rear cover.

According to various embodiments of the present disclosure, the electronic device may further include a camera flash and/or a biometric sensor which are disposed at the one side of the battery to at least partially overlap with the PCM when viewed from a position above the PCB, and are positioned between the PCB and the rear cover.

According to various embodiments of the present disclosure, the PCM and the camera module are positioned side by side at the one side of the battery when viewed from a position above the PCB, and at least a part of the camera flash and/or the biometric sensor and the PCM may be positioned at opposite sides of the PCB, respectively, when viewed from a cross-section.

According to various embodiments of the present disclosure, the electronic device may further include a camera module that is formed through the PCB and disposed close to the one side of the battery when viewed from a position above the PCB, and includes a lens exposed through the rear cover. The PCM may have an L shape that includes a first portion that is positioned between the camera module and the battery when viewed from a position above the PCB.

According to various embodiments of the present disclosure, the electronic device may include at least one physical key button that is disposed to be at least partially exposed to the outside. According to an embodiment of the present disclosure, the key button may be configured as a volume button that is disposed on one side of the electronic device and performs a volume up/down function. According to an embodiment of the present disclosure, the key button may also be disposed on the other side of the electronic device and may perform a power ON/OFF function, a wake-up/sleep function, and the like.

A method of assembling a key button according to the related art may include a method of assembling the key button from the outside of the electronic device, and a method of assembling the key button from the inside of the electronic device.

According to various embodiments of the present disclosure, the method of assembling the key button from the outside of the electronic device is a method in which an FPCB is attached to a main instrument (e.g., the housing of the electronic device) and the key button is fitted from the outside. In such a case, it is advantageous in that since the key button and the FPCB can be assembled to one instrument, the performances of the key button, such as the click feeling and the life span of the key button, can be performed prior to assembling the electronic device. However, it is disadvantageous in that scratches may occur on the exterior of the electronic device when the button of the key button is assembled from the outside of the electronic device. In addition, when the key button is assembled from the outside of the electronic device, the key button may be separated to the outside of the electronic device since the locked amount of the key button is small.

According to various embodiments of the present disclosure, the method of assembling the key button from the inside may include assembling the key button to the main instrument (e.g., the housing of the electronic device) first, assembling the FPCB to the other instrument (e.g., the bracket), and assembling two instruments with each other. In such a case, the key button and the FPCB are assembled to different instruments (e.g., the housing and the bracket). Accordingly, there is a disadvantage in that in order to test the performances of the key button, it is necessary to assemble one preassembly (e.g., the assembly of the housing and the bracket), and when a defect occurs, it is necessary to dissemble the preassembly again.

According to various embodiments of the present disclosure, it is possible to provide a key button assembly structure to address the above-described problems. According to an embodiment of the present disclosure, it is possible to provide a key button assembly structure that can be implemented such that a key performance test is enabled in a single product state while assembling the key from the inside of the electronic device.

Hereinafter, a configuration of a key button according to an embodiment of the present disclosure will be described below.

Figure 18A:
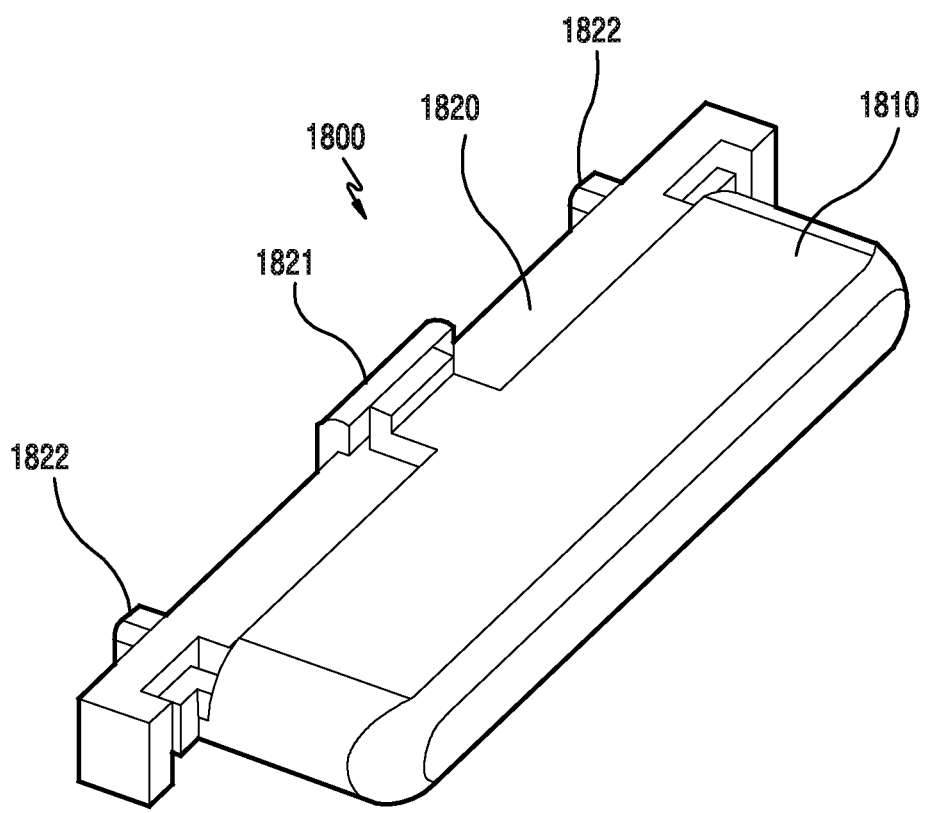
FIGS. 18A and 18B are configuration views of a key button according to various embodiments of the present disclosure.
Figure 18B:
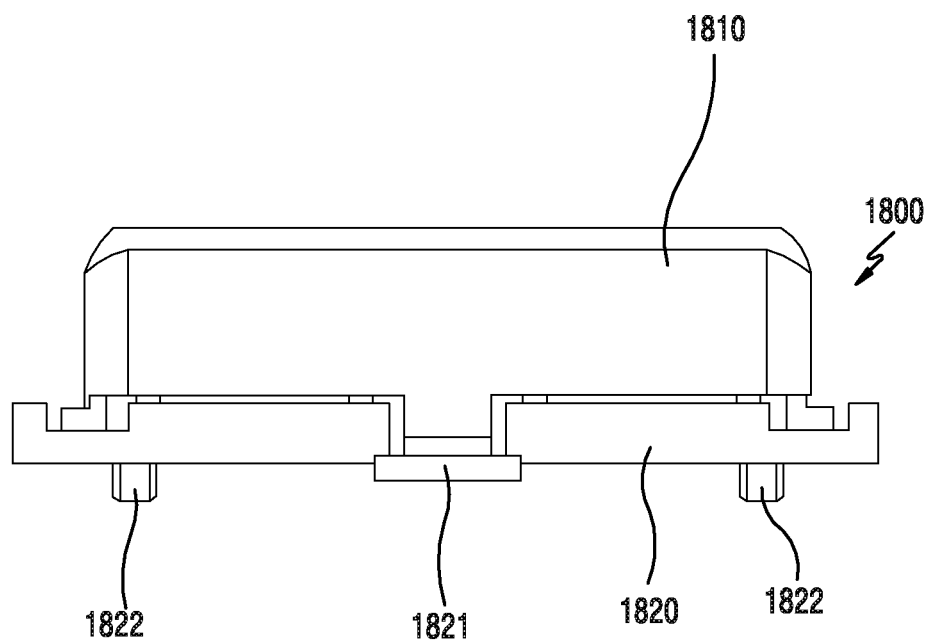

FIGS. 18A and 18B are configuration views of a key button according to various embodiments of the present disclosure.

Referring to FIGS. 18A and 18B, a key button 1800 may include a key top 1810, and a key base 1820 that is fixed to the key top 1810.

According to various embodiments of the present disclosure, the key top 1810 may be formed of at least one of a metal material and a synthetic resin material. According to an embodiment of the present disclosure, the key top 1810 is disposed to be partially exposed to the outside of the electronic device (e.g., a side surface) so that a corresponding function of the electronic device (e.g., a volume up/down function, a wake-up/sleep function, a power ON/OFF function, and the like) may be performed by the user's pushing operation.

According to various embodiments of the present disclosure, the key base 1820 may be fixed to the bottom of the key top 1810. According to an embodiment of the present disclosure, the key base 1820 may serve as a locking member that allows the key top 1810 to be partially exposed from the electronic device while preventing the key top 1810 from being completely separated. According to an embodiment of the present disclosure, the key base 1820 may include a press portion 1821 that is formed on the bottom surface of the key base 1820 to protrude. According to an embodiment of the present disclosure, the press portion 1821 may be disposed so as to press a dome key (e.g., a metal dome key) 1852 (see FIG. 19) that is disposed on an FPCB 1850 (see FIG. 19) of a FPCB assembly 1830 (see FIG. 19) to be described later. According to an embodiment of the present disclosure, the key base 1820 may include support pieces 1822 that are formed to protrude on the opposite sides of the press portion 1821, respectively. According to an embodiment of the present disclosure, the support pieces 1822 may serve to prevent the key top 1810 from being excessively inserted when the key top 1810 is pressed, and to support the press portion 1821 to smoothly press the dome key 1852. According to an embodiment of the present disclosure, the key base 1820 may be formed of an elastic material. According to an embodiment of the present disclosure, the key base 1820 may be formed of at least one of rubber, silicon, and urethane.

According to an embodiment of the present disclosure, the key top 1810 and the key base 1820 may be integrally formed as one member using a single material. Without being limited thereto, however, a member formed of an elastic resin material may be formed on the key top formed as a metallic member, through insert molding.

Figure 19:
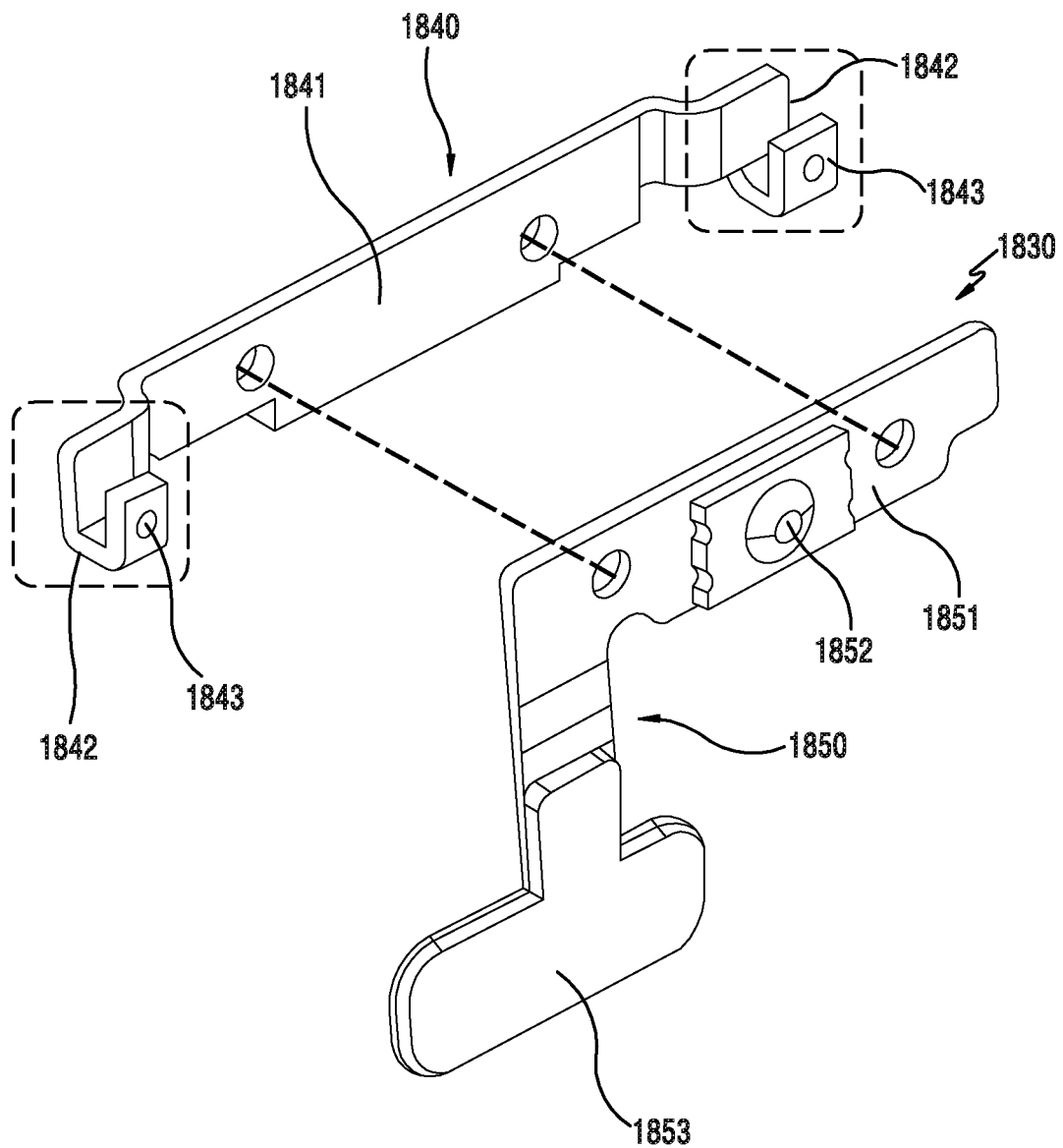
FIG. 19 is a perspective view illustrating a flexible PCB (FPCB) assembly in a disassembled state according to various embodiments of the present disclosure.

FIG. 19 is a perspective view illustrating an FPCB assembly in a disassembled state according to various embodiments of the present disclosure.

Referring to FIG. 19, the FPCB assembly 1830 may include a support plate 1840 and an FPCB 1850 supported by the support plate 1840.

According to various embodiments of the present disclosure, the FPCB 1850 may include a circuit body 1851 attached to the support plate 1840, and a connection terminal portion 1853 drawn out from the circuit body 1851 and connected to the PCB of the electronic device. According to an embodiment of the present disclosure, on the circuit body 1851, a dome key (e.g., a metal dome key) 1852 may be disposed. According to an embodiment of the present disclosure, the dome key 1852 may be disposed at a position corresponding to the press portion 1821 of the above-described key base 1810, and may perform an electric switching function by being pressed by the press portion 1821.

According to various embodiments of the present disclosure, the support plate 1840 may include a plate body 1841 that supports the circuit body 1851 of the FPCB 1850, and elastic pieces 1842 that are bent to a certain shape at the opposite ends of the plate body 1841. According to an embodiment of the present disclosure, the elastic pieces 1842 may have a "U" shape, and may have an inwardly or outwardly biased elasticity. According to an embodiment of the present disclosure, the elastic pieces 1842 may have the "U" shape and may have the elasticity to maintain the shape. Accordingly, when the elastic pieces are seated in elastic piece seating recess 2011 (see FIG. 20A) of a housing to be described later, the phenomenon, in which the support plate 1840 is separated from the housing, may be prevented in advance. According to an embodiment of the present disclosure, each elastic piece 1842 may include at least one fixing protrusion 1843 that protrudes from the outer surface thereof. The fixing protrusion 1843 may be fixed by being seated in an opening formed in the elastic piece seating recess 2011 so as to support the fixing of the support plate 1840. According to an embodiment of the present disclosure, the elastic pieces 1842 may be formed in various shapes, such as a "⊓" shape, a circular shape, an oval shape, and an "S" shape, besides the "U" shape. According to an embodiment of the present disclosure, the plate body 1841 of the support plate 1840 and the circuit body 1851 of the FPCB 1850 may be attached to each other through a method of bonding by using a double-sided tape, and the like.

FIGS. 20A to 20E are views illustrating a process of installing a key button and an FPCB assembly to a housing of an electronic device according to various embodiments of the present disclosure.

Figure 20A:
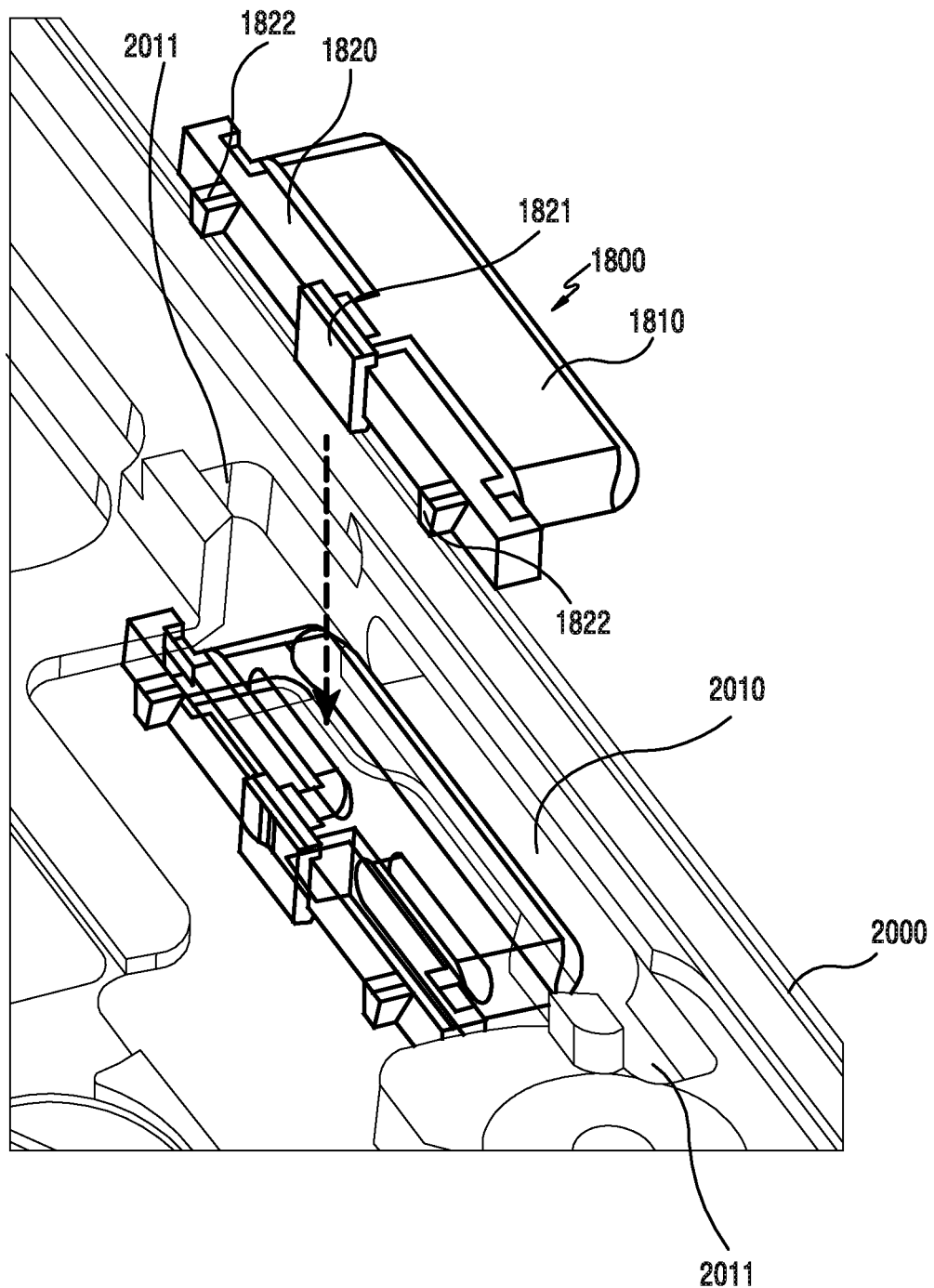
FIGS. 20A to 20E are views illustrating a process of installing a key button and an FPCB assembly to a housing of an electronic device according to various embodiments of the present disclosure.
Figure 20B:
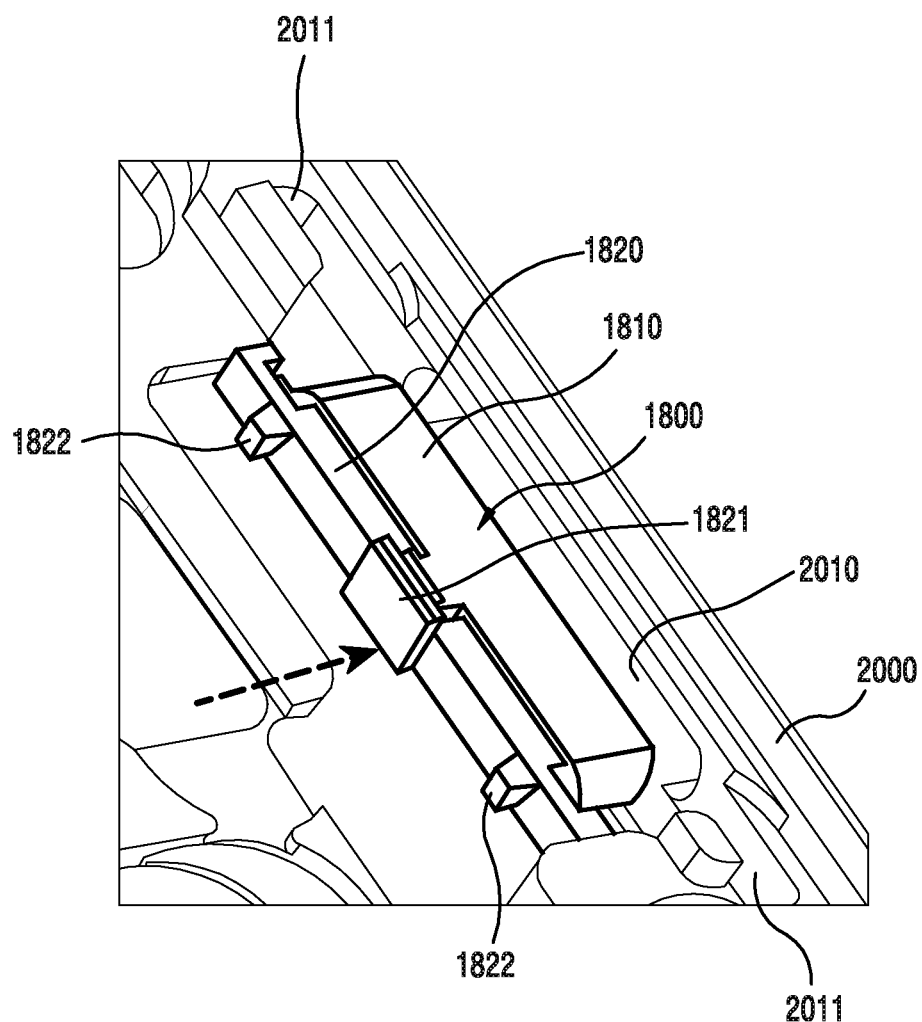

Referring to FIGS. 20A and 20B, a housing (e.g., the rear housing) 2000 of the electronic device may be formed with a key top passage hole 2010. According to an embodiment of the present disclosure, the key top passage hole 2010 may be formed in a size that allows the key top 1810 of the key button 1800 to pass therethrough. According to an embodiment of the present disclosure, the key top passage hole 2010 may be formed in a size that allows only the key top 1810 to pass therethrough and prevents the key base 1820 fixed to the key top 1810 from passing therethrough. Without being limited thereto, however, a part of the key top may protrude so as to form a separation prevention flange.

According to various embodiments of the present disclosure, the key button 1800 may be lowered from the upper side of the housing 2000 in a direction indicated by the arrow as illustrated in FIG. 20A, and may be moved forward toward the key top passage hole 2010 as illustrated in FIG. 20B. By such an operation, the key button 1800 may be prevented from being completely separated from the key top passage hole 2010 of the housing 2000 by the key base 1820, and at the same time, the key top 1810 may be disposed such that the key top 1810 is partially exposed to the outside of the housing 2000 through the key top passage hole 2010.

Figure 20C:
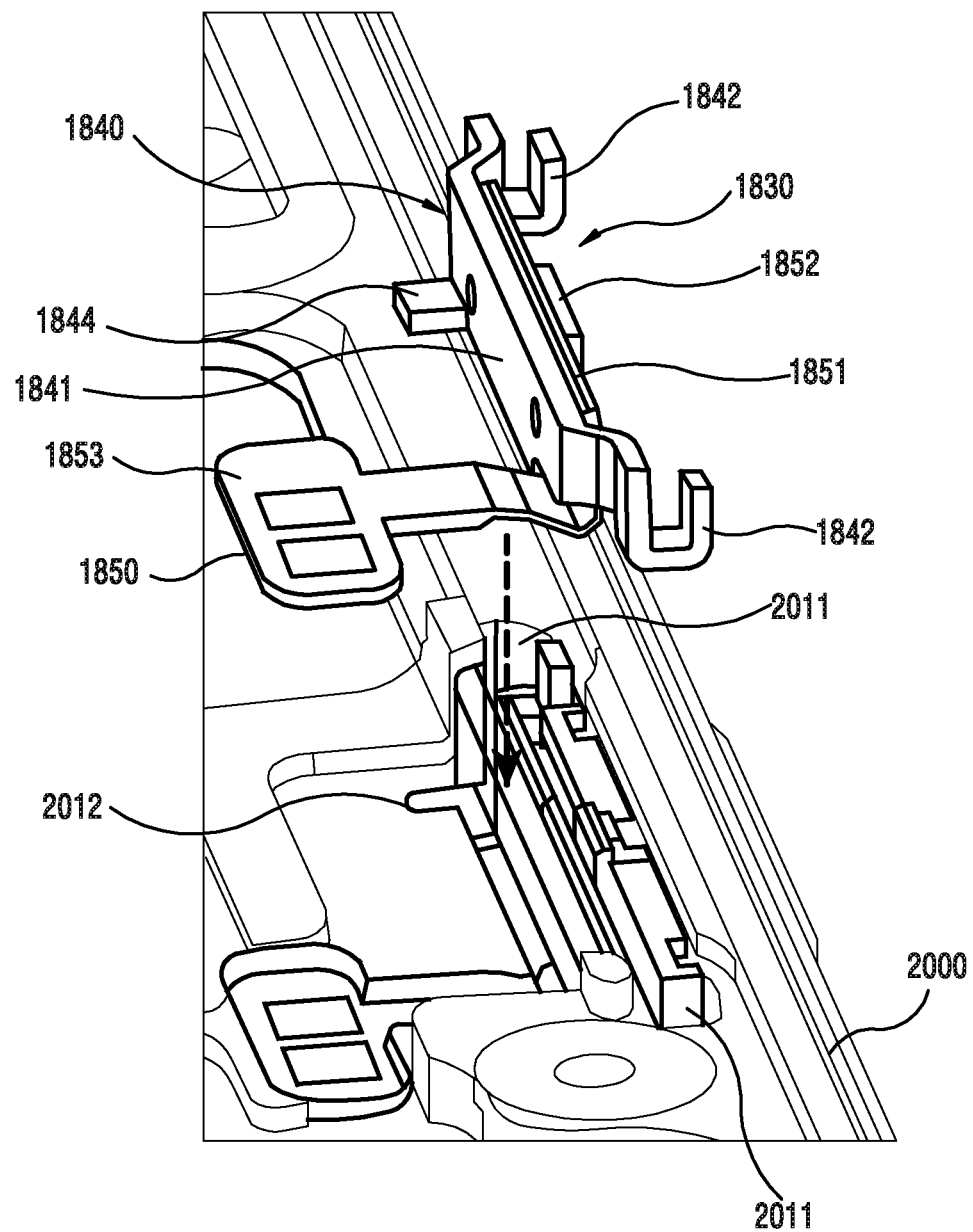

Referring to FIG. 20C, while the key top 1810 of the key button 1800 is still partially passing through the key top passage hole 2010 of the housing 2000, the FPCB assembly 1830 may be mounted from the rear side in the direction indicated by the arrow. In such a case, the elastic pieces 1842, which are formed on the opposite ends of the support plate 1840 of the FPCB assembly 1830, may be tightly seated in the elastic piece seating recess 2011 that is formed in the housing 2000. This is because the elastic pieces 1842 are seated in the elastic piece seating recess 2011 while maintaining the outwardly biased elastic force. According to an embodiment of the present disclosure, each elastic piece seating recess 2011 may be formed with an opening (not illustrated), and the fixing protrusions 1843, which are formed to protrude from the elastic pieces 1842, respectively, may be seated in the openings, respectively, so as to support the support plate 1840 to be fixed to the housing 2000. According to an embodiment of the present disclosure, the plate body 1841 of the support plate 1840 may include a fixing plate 1844 that is formed to extend orthogonally to the plate body 1841. According to an embodiment of the present disclosure, when the support plate 1840 is fixed to the housing 2000, the fixing piece 1844 is seated in a fixing piece seating recess 2012 that is formed on the inner surface of the housing 2000, so that the support plate 1840, which is mounted on the housing 2000, can be prevented from moving left and right in advance.

Figure 20D:
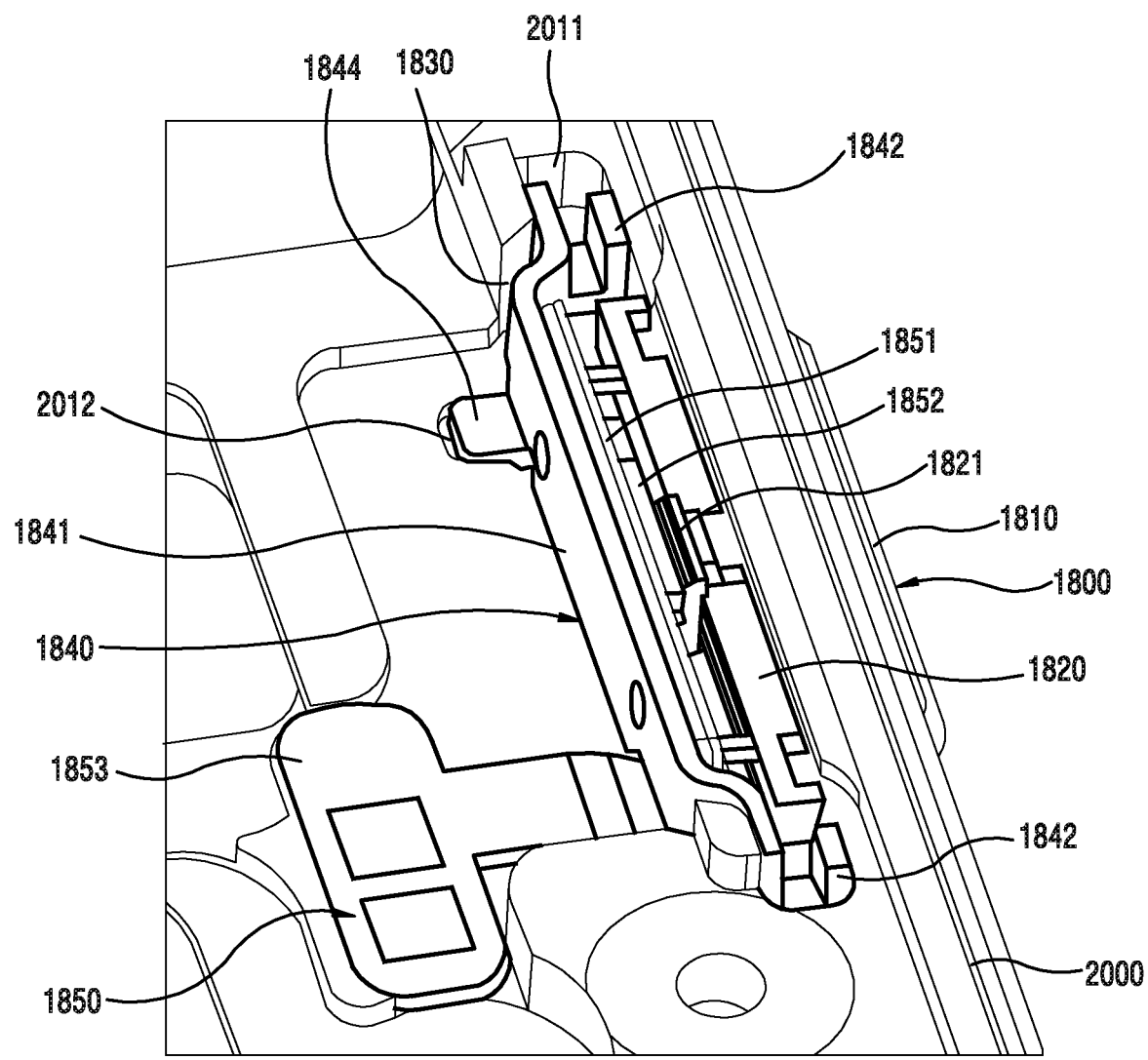
Figure 20E:
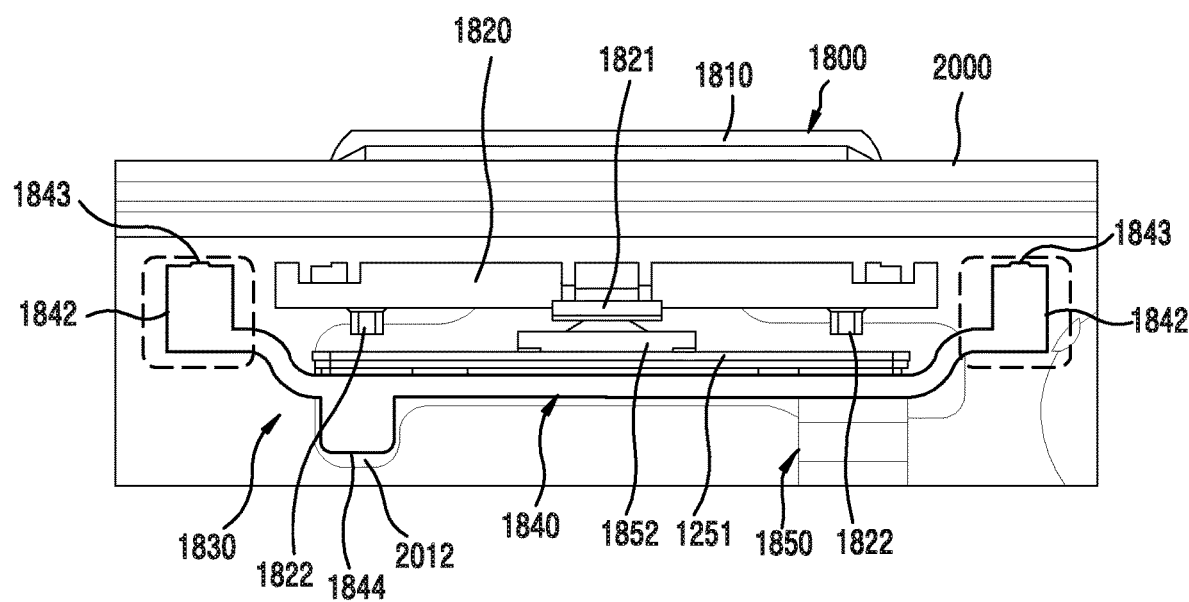
Figure 21A:
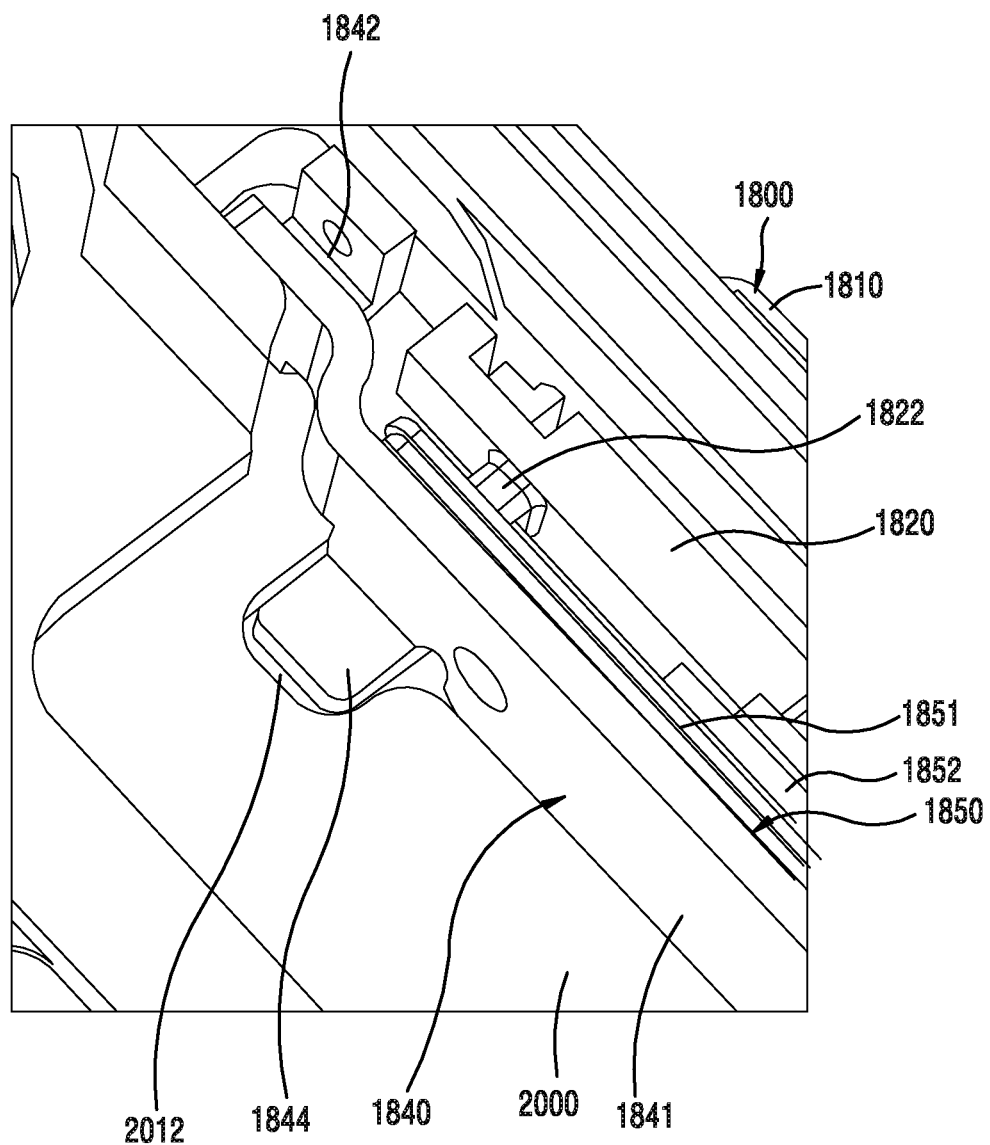
FIGS. 21A to 21D are configuration views illustrating a principal portion in a state where an FPCB assembly is installed in the housing of the electronic device according to various embodiments of the present disclosure.
Figure 21B:
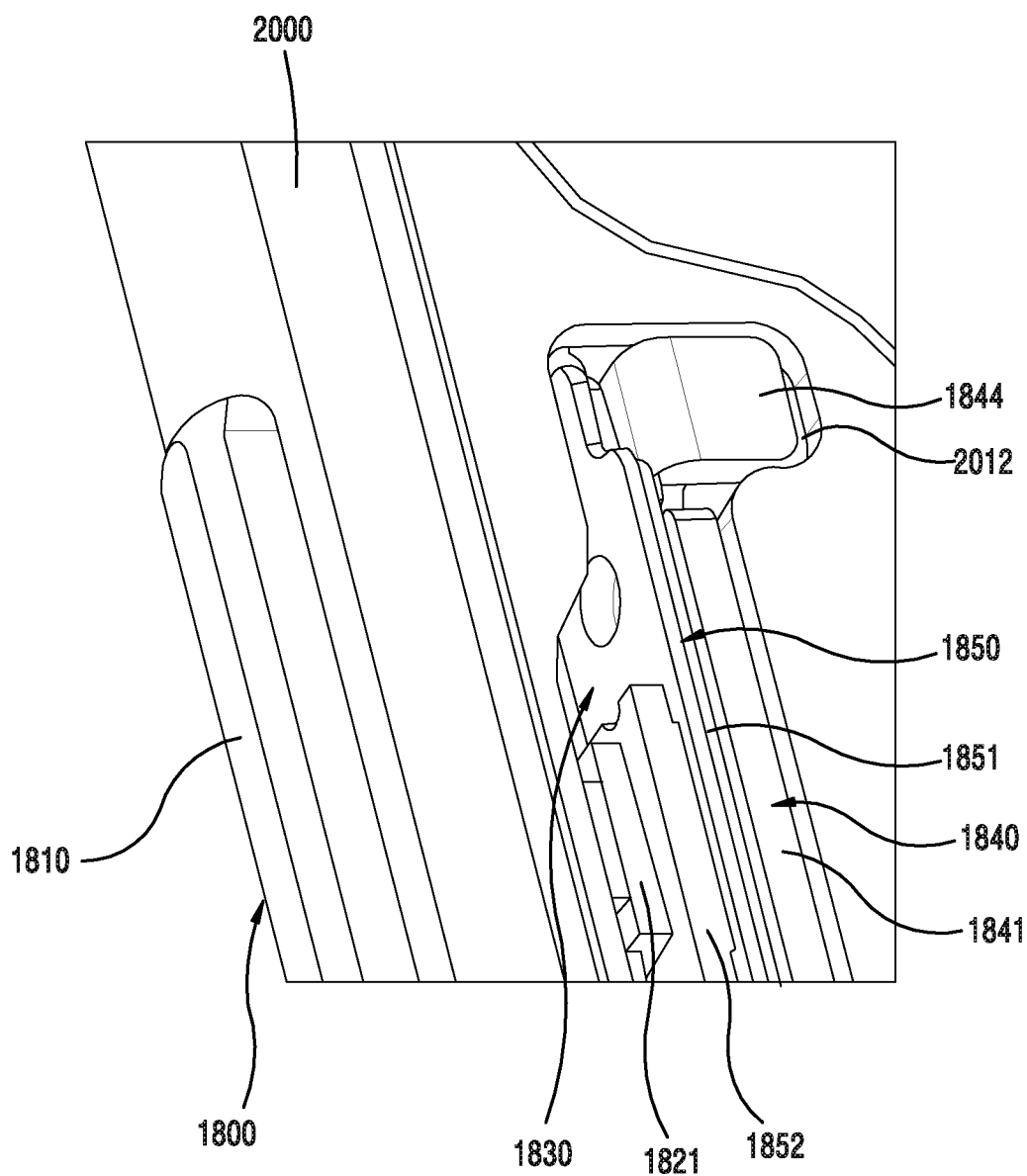
Figure 21C:
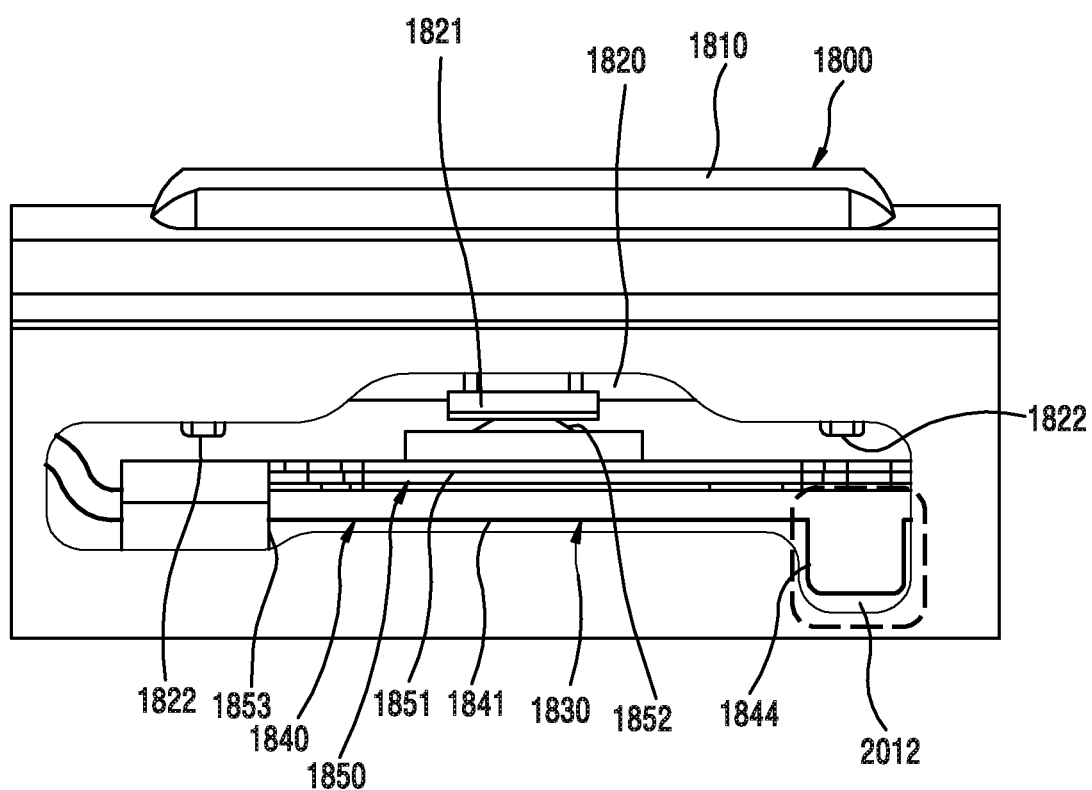
Figure 21D:
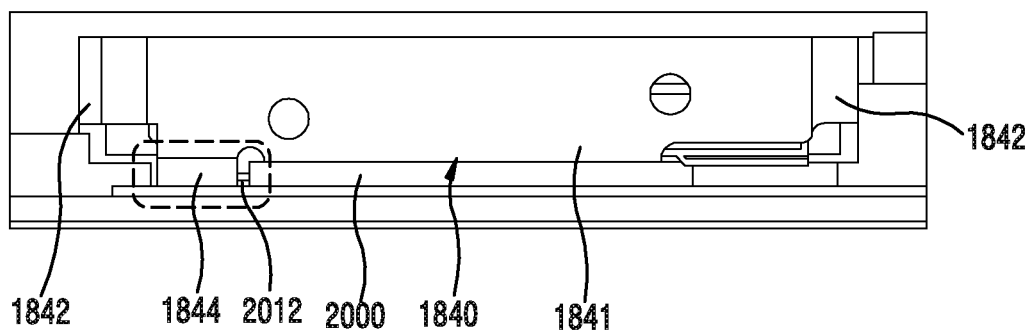

Referring to FIGS. 20D and 20E, the key button 1800 mounted on the housing 2000 may hold the key top 1810 in the state in which the key top 1810 is partially exposed to the outside of the housing 2000, and the key button 1800 may be supported by the support plate 1840 of the FPCB assembly 1830 behind the key button 1800. According to an embodiment of the present disclosure, the press portion 1821, which is formed on the key base 1820 of the key button 1800, may maintain the state in which the press portion 1821 is in contact with the dome key 1852 of the circuit body 1851 that is supported by the plate body 1841 of the FPCB assembly 1830. In such a case, because the elastic pieces 1842 that are formed on the opposite ends of the support plate 1840 are fixed to the elastic piece seating recess 2011 formed in the housing 2000, the support plate 1840 is not moved back even if the key button 1800 is pressed, and by pressing the press portion 1821 of the key base 1820, only the dome key 1852, which is disposed on the circuit body 1851 of the FPCB 1850, may be pressed to be capable of being switched.

According to various embodiments of the present disclosure, because the pressing operation of the key top 1810 is implemented only by the support plate 1840 of the FPCB assembly 1830 without any other instrument (e.g., the bracket) in the state where the key button 1800 is assembled inside the housing 2000, the performance test of the key button 1800 can be easily implemented.

FIGS. 21A to 21D are configuration views illustrating a principal portion in a state where an FPCB assembly is installed in a housing of an electronic device according to various embodiments of the present disclosure. For the same constituent elements as those described above, descriptions will be omitted.

Referring to FIGS. 21A to 21D, the support plate 1840 of the FPCB assembly 1830 may be firmly fixed at the opposite ends thereof by the elastic pieces 1842, but may be moved left and right in the fixed state. Accordingly, on the plate body 1841 of the support plate 1840, the fixing piece 1844 may be bent in the direction orthogonal to the plate body 1841, and when the support plate 1840 is fixed to the housing 2000, the fixing piece 1844 may also be seated in the fixing piece seating recess 2012 that is formed in the housing 2000.

According to an embodiment of the present disclosure, the fixing piece seating recess 2012 may be formed in the form of an opening that penetrates the bottom surface of the housing 2000, and when the fixing piece 1844 is applied to the fixing piece seating recess 2012, the fixing piece 1844 may be seated such that the surface of the fixing piece 1844 and the bottom surface of the housing 2000 are flush with each other. According to an embodiment of the present disclosure, the fixing piece 1844 is formed in a rectangular shape. Without being limited thereto, however, the fixing piece 1844 may be formed in various angled shapes so as to prevent the support plate 1840 from being moved left and right. According to an embodiment of the present disclosure, one fixing piece 1844 is formed on the plate body 1841 of the support plate 1840. However, in the case where the plate body 1841 and a space of the housing 2000, which corresponds to the plate body 1841, are available, a plurality of fixing pieces 1844 may be formed.

Figure 22:
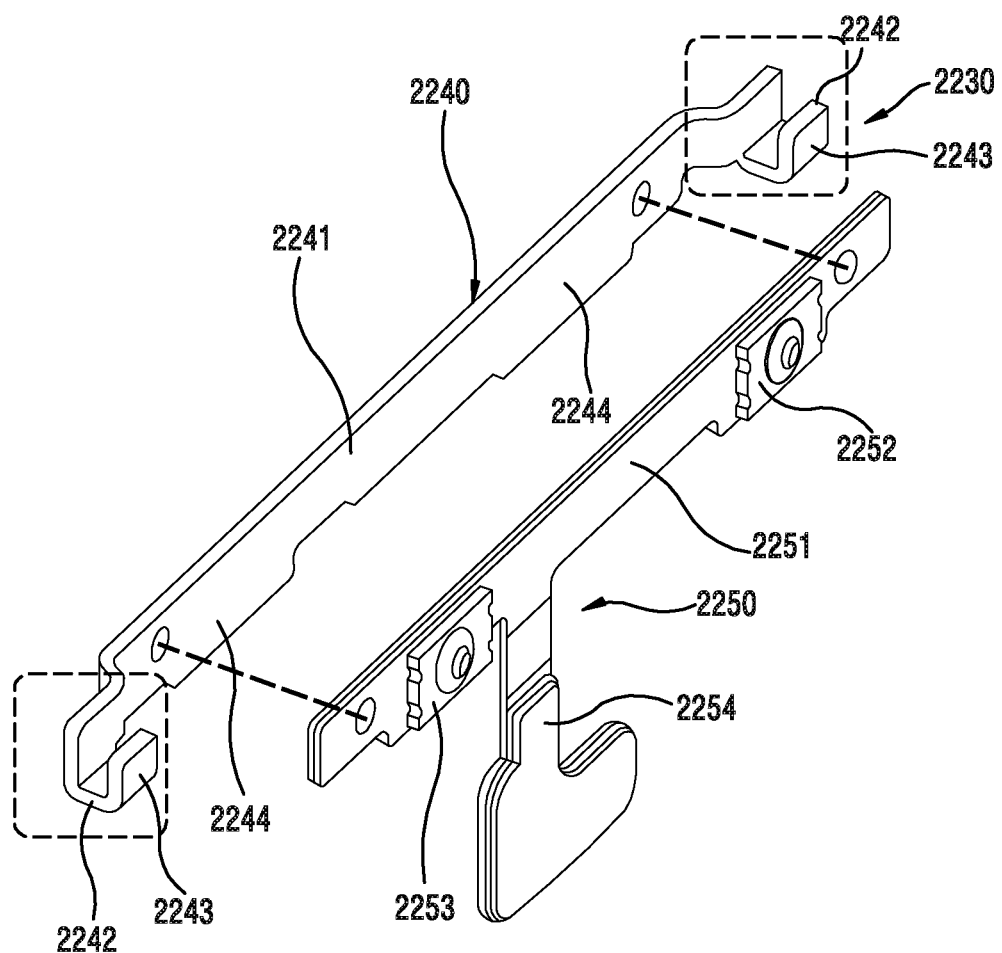
FIG. 22 is an exploded perspective view of an FPCB assembly according to various embodiments of the present disclosure.

FIG. 22 is a perspective view of an FPCB assembly in a disassembled state according to various embodiments of the present disclosure.

Referring to FIG. 22, the above-mentioned FPCB assembly 1830 has been illustrated and described above with reference to one key button 1800, an FPCB 1850 having one dome key 1852 applied to the key button 1800, and a support plate 1840 that supports the FPCB 1850. FIG. 22 illustrates one FPCB assembly 2230 having two dome keys 2252 and 2253 that simultaneously support two key buttons 1800 that are separately applied, and hereinafter, the FPCB assembly 2230 will be described. Accordingly, the configuration of each of the two separately applied key buttons 1800 is the same as that of the key button 1800 illustrated in FIGS. 18A and 18B. Thus, the detailed descriptions for the configuration of the key buttons 1800 will be omitted.

Referring to FIG. 22, the FPCB assembly 2230 may include a support plate 2240 and an FPCB 2250 supported by the support plate 2240.

According to various embodiments of the present disclosure, the FPCB 2250 may include a circuit body 2251 attached to the support plate 2240, and a connection terminal portion 2254 drawn out from the circuit body 2251 and connected to the PCB of the electronic device. According to an embodiment of the present disclosure, one pair of dome keys (e.g., metal dome keys) 2252 and 2253 may be disposed on the circuit body 2251 at a certain interval. According to an embodiment of the present disclosure, the one pair of dome keys 2252 and 2253 may be disposed at the positions corresponding to the press portions 1821, which are formed on the key bases 1820 of the individual key buttons 1800, respectively, and may be physically operated by pressing the press portions 1821 so as to perform an electric switching function.

According to various embodiments of the present disclosure, the support plate 2240 may include a plate body 2241 that supports the circuit body 2251 of the FPCB 2250, and elastic pieces 2242 that are bent in a certain shape on the opposite ends of the plate body 2241, respectively. According to an embodiment of the present disclosure, the elastic pieces 2242 may have a "U" shape and may have elasticity so that the leg portions of the "U" are biased to the outside in relation to each other. Accordingly, when the elastic pieces 2242 are seated in an elastic piece seating recess 2314 (see FIG. 23A) in a housing 2300 to be described later (see FIG. 23A), it is possible to prevent the support plate 2240 from being separated from the housing 2300 in advance. According to an embodiment of the present disclosure, each elastic piece 2242 may include at least one fixing protrusion 2243 that protrudes from the outer surface thereof, and the fixing protrusion 2243 may be fixedly seated in an opening formed in the elastic piece seating recess 2314 so as to assist the fixing of the support plate 2240. According to an embodiment of the present disclosure, the elastic pieces 2242 may be formed in various shapes that may exert elasticity, such as a "L" shape, a circular shape, an oval shape, and an "S" shape besides the "U" shape, by bending. According to an embodiment of the present disclosure, the plate body 2241 of the support plate 2240 and the circuit body 2251 of the FPCB 2250 may be attached to each other through a method of bonding a double-sided tape, and the like.

FIGS. 23A to 23E are views illustrating a process of installing key buttons and an FPCB assembly to a housing of the electronic device according to various embodiments of the present disclosure.

Figure 23A:
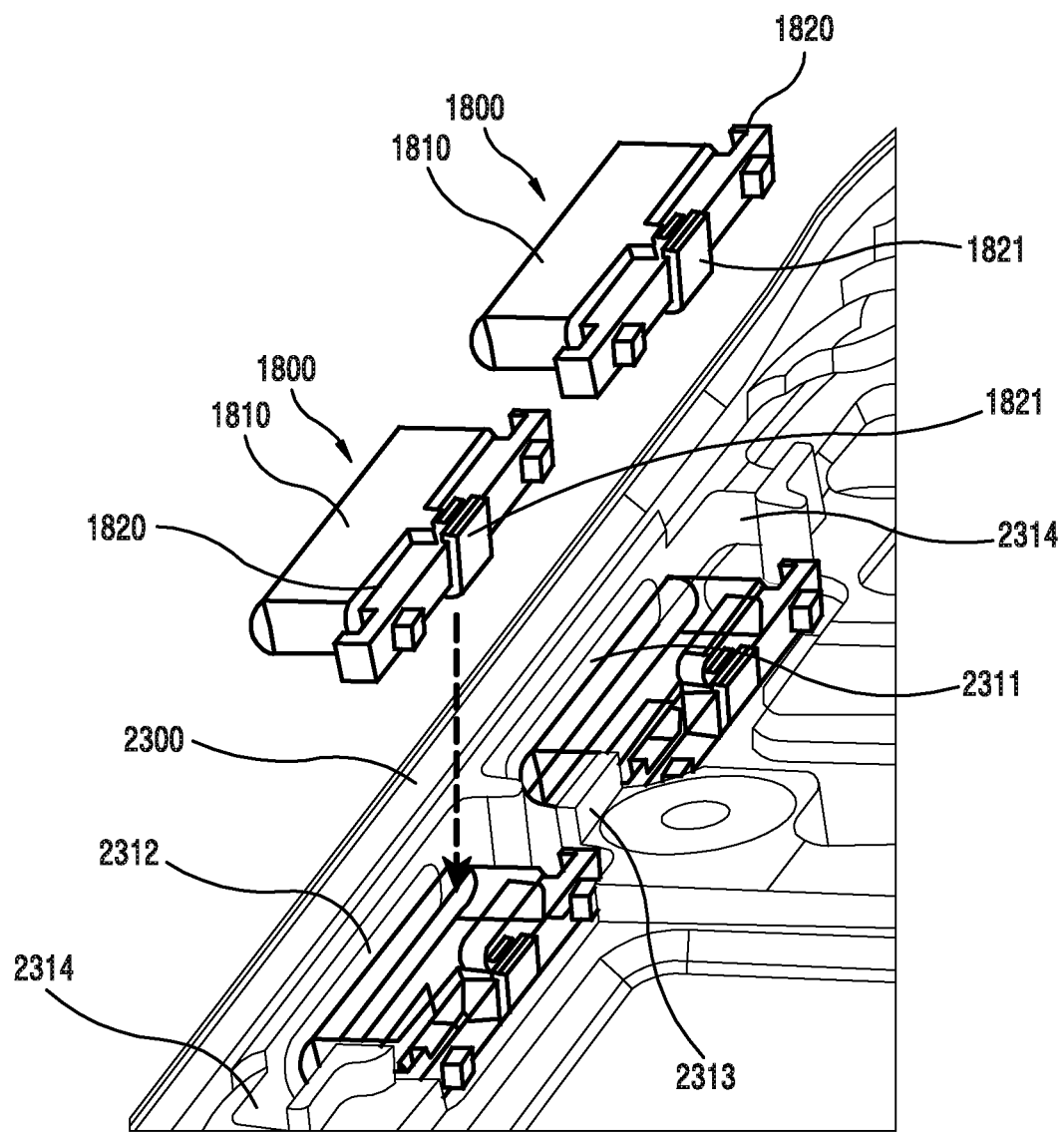
FIGS. 23A to 23E are views illustrating a process of installing key buttons and an FPCB assembly to a housing of an electronic device according to various embodiments of the present disclosure.
Figure 23B:
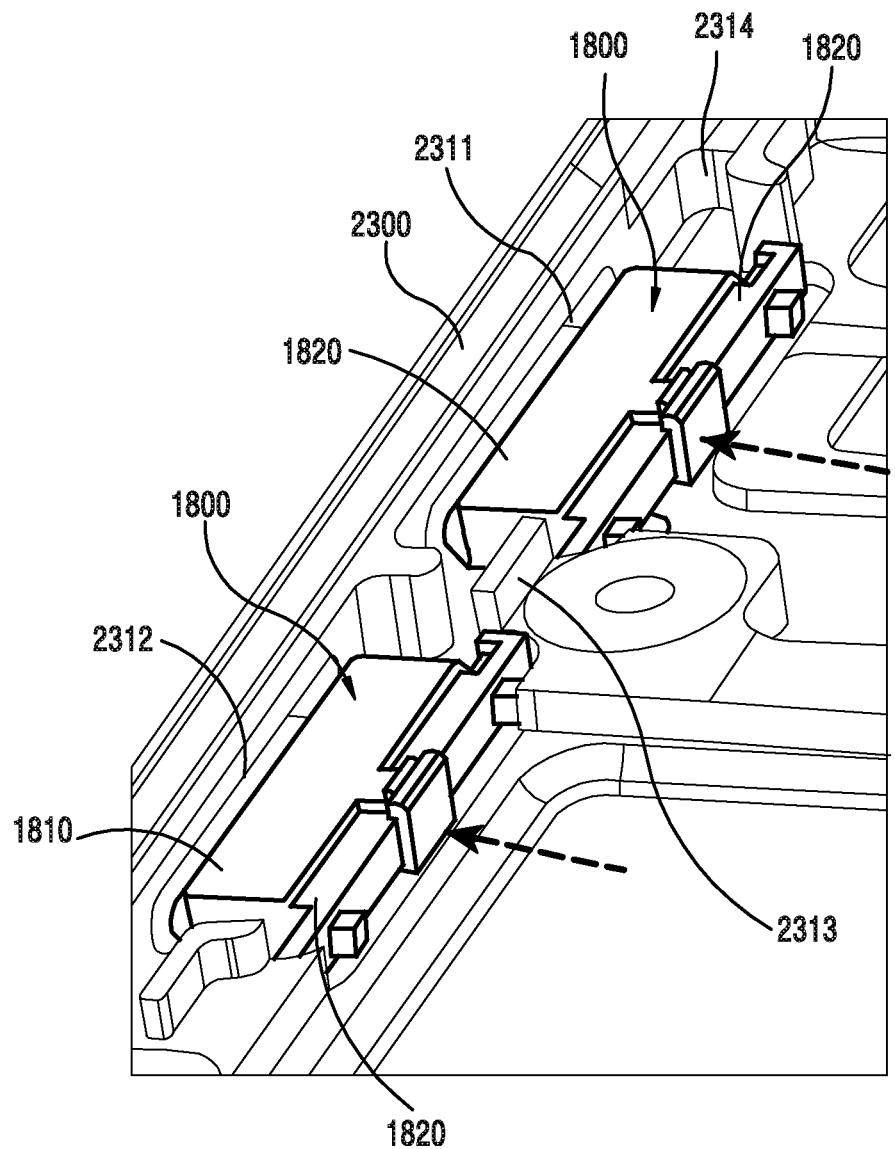

Referring to FIGS. 23A and 23B, in a housing (e.g., a rear housing) 2300 of the electronic device, one pair of key top passage holes 2311 and 2312 may be formed at a certain interval. According to an embodiment of the present disclosure, the one pair of key top passage holes 2311 and 2312 may be formed to have a size that allows the key tops 1810 of the key buttons 1800 to pass through the key top passage holes 2311 and 2312, respectively. According to an embodiment of the present disclosure, the key top passage holes 2311 and 2312 may be formed to have a size that allows only the key tops 1810 to pass through the key top passage holes 2311 and 2312, respectively, and to prevent the key bases 1820 fixed to the key tops 1810 from passing the key top passage holes 2311 and 2312. Without being limited thereto, however, a part of each key top is formed to protrude so as to form a separation prevention flange.

According to various embodiments of the present disclosure, the key buttons 1800 may be lowered from the upper side of the housing 2300 in the direction indicated by an arrow as illustrated in FIG. 23A, and may be moved forward toward the key top passage holes 2311 and 2312, respectively, as illustrated in FIG. 20B. Through such an operation, the key buttons 1800 may be prevented from being completely separated from the key top passage holes 2311, 2312 of the housing 2300 by the key bases 1820, respectively, and at the same time, may be disposed such that the key tops 1810 are partially expose to the outside of the housing 2300 through the key top passage holes 2311 and 2312, respectively.

Figure 23C:
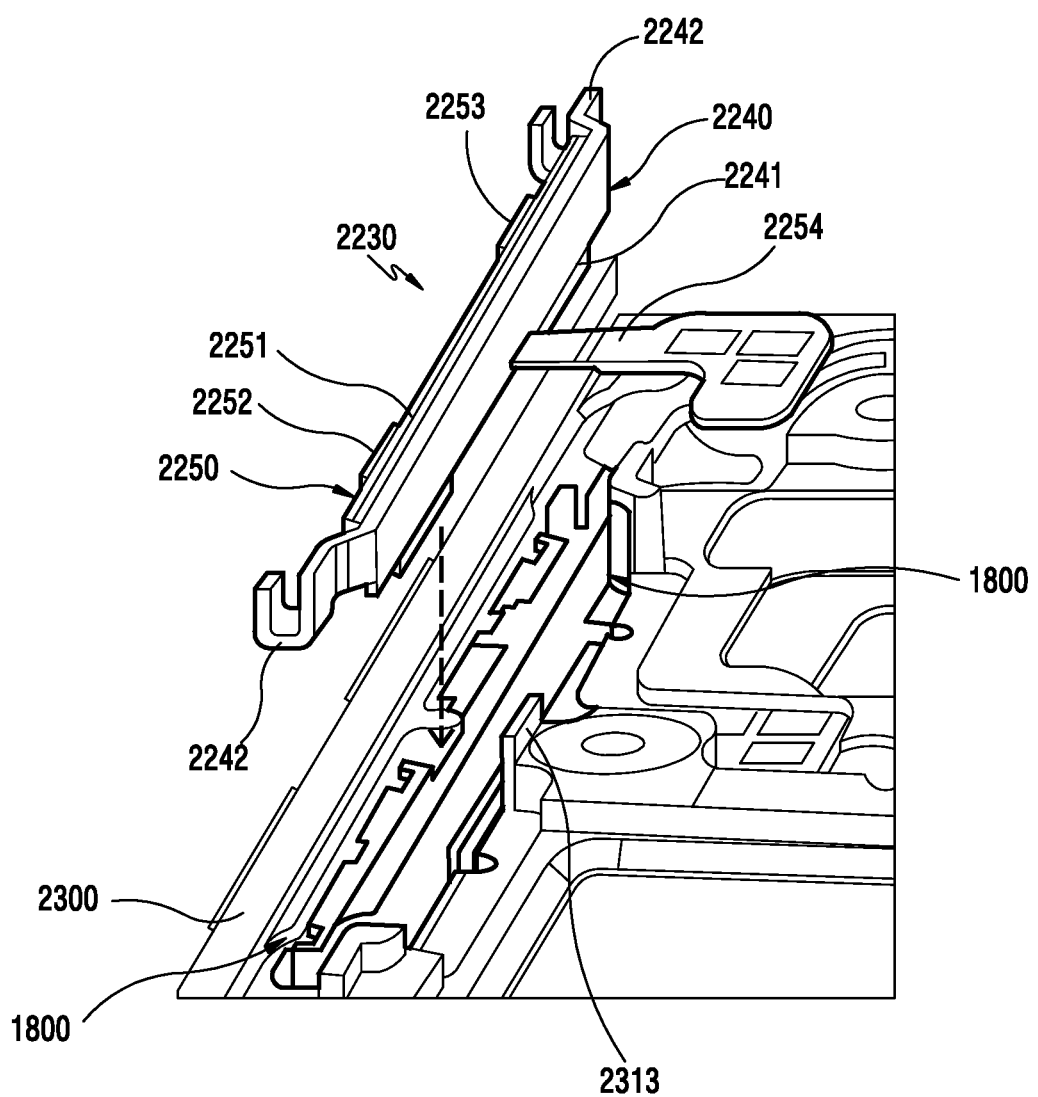

Referring to FIG. 23C, in the state where the key tops 1810 of the one pair of key buttons 1800 partially pass through the key top passage holes 2311 and 2312 of the housing 2300, respectively, the FPCB assembly 2230 may be mounted in the direction indicated by an arrow on the rear side of the key tops 1810. In such a case, the elastic pieces 2242 formed on the opposite ends of the support plate 2240 of the FPCB assembly 2230 may be tightly seated in the elastic piece seating recess 2314 formed in the housing 2300. This is because the elastic pieces 2242 are seated in the elastic piece seating recess 2314 while maintaining an outwardly biased elasticity. According to an embodiment of the present disclosure, the elastic piece seating recess 2314 may be formed with openings (not illustrated) and the fixing protrusions 2243, which are formed to protrude from the elastic pieces 2242, respectively, may be seated in the openings, respectively, so as to assist the support plate 2240 to be fixed to the housing 2300. According to an embodiment of the present disclosure, a plate support piece 2313 may be formed to protrude inside the housing 2300 so that the plate support piece 2313 can support the rear side of the plate body 2241 of the support plate 2240 as being mounted. According to an embodiment of the present disclosure, the plate support piece 2313 may prevent the support plate 2240 itself from being elastically moved backward in advance when the relatively long support plate 2240 is pressed by the key buttons 1800. According to an embodiment of the present disclosure, the plate support piece 2313 is preferably disposed between the one pair of key top passage holes 2311 and 2312, and a plurality of plate support pieces may be formed if a forming space is available.

Figure 23D:
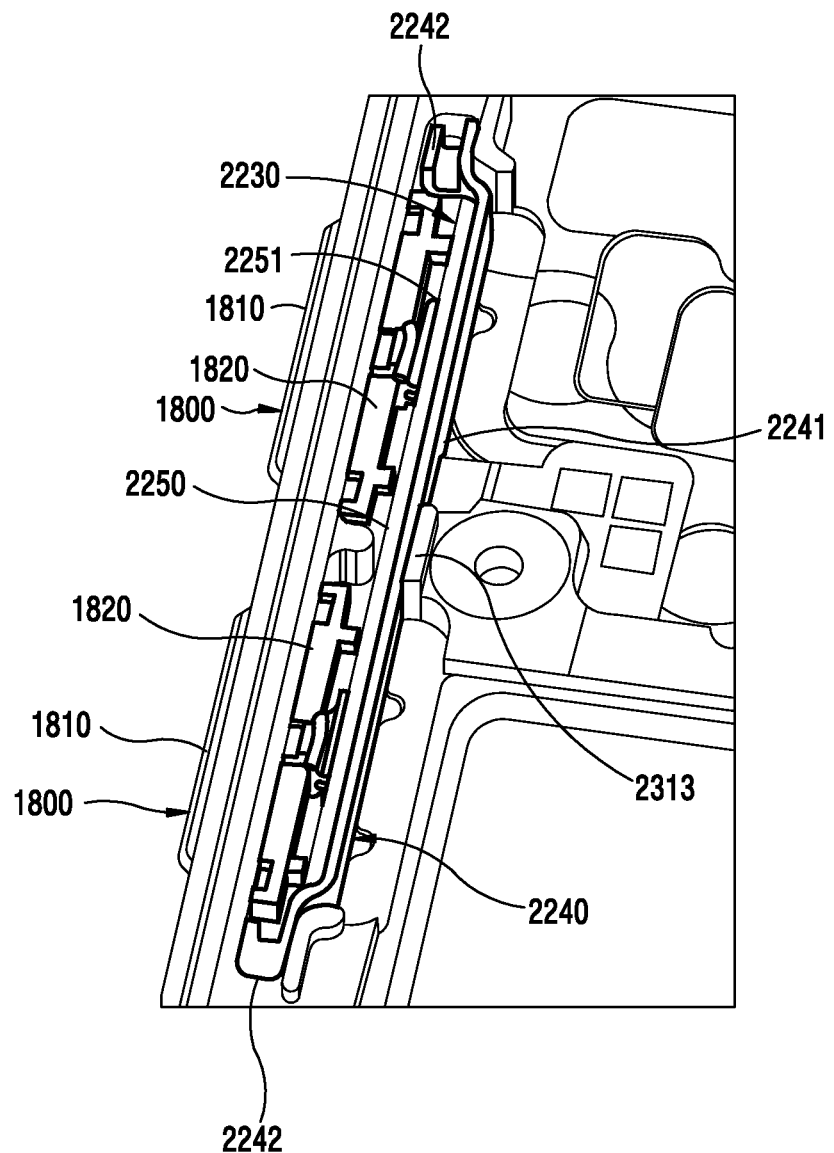
Figure 23E:
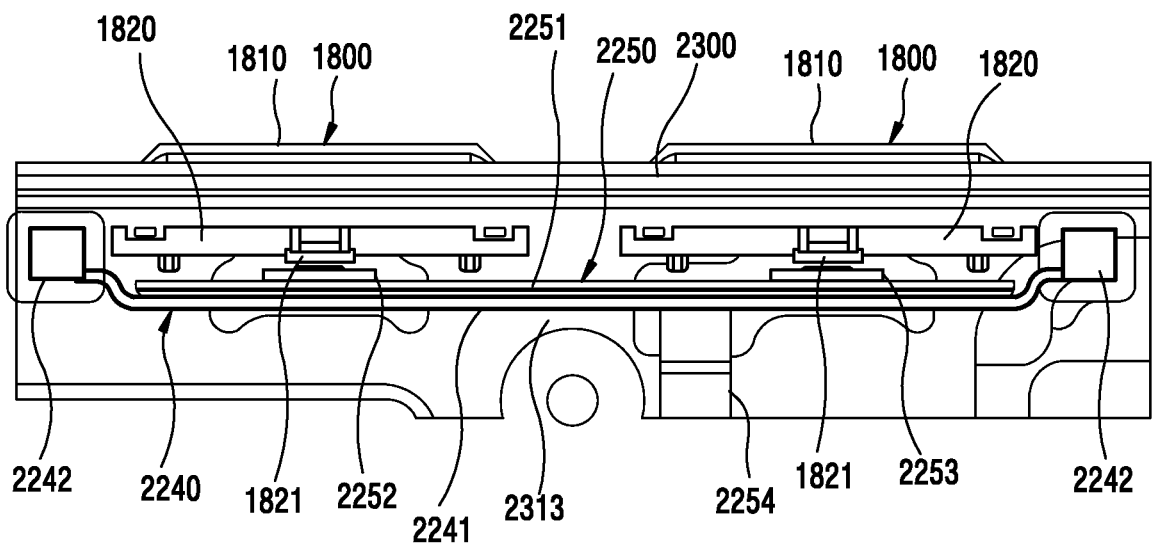
Figure 24A:
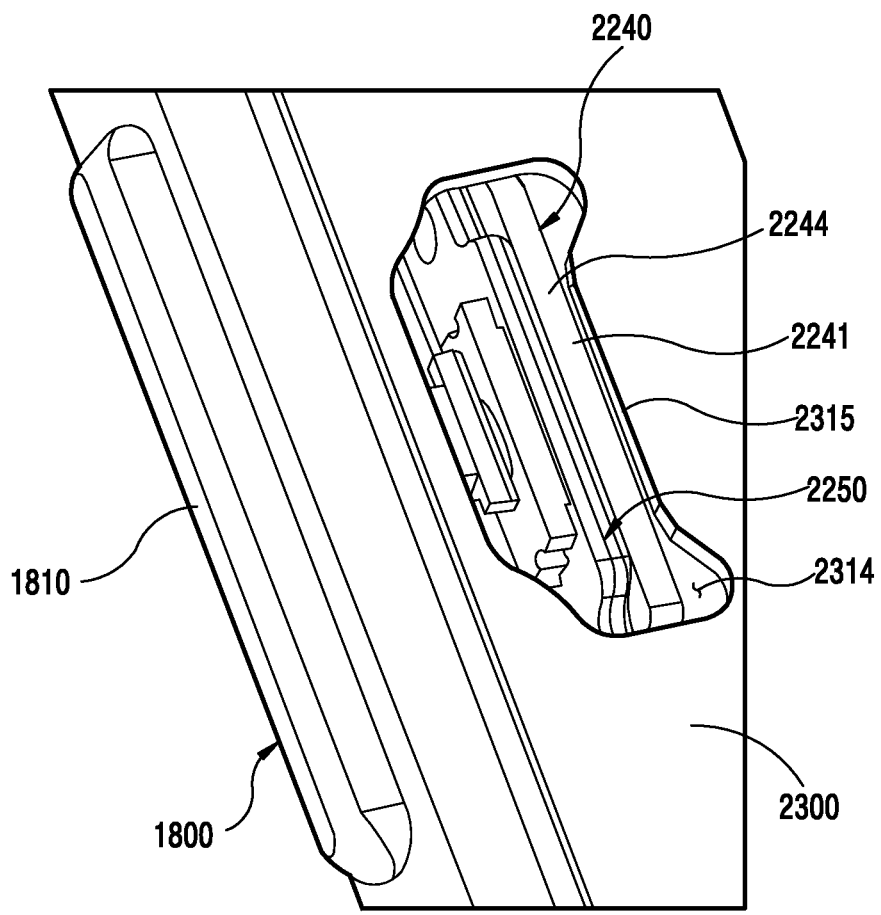
FIGS. 24A to 24D are configuration views illustrating a principal portion in a state where an FPCB assembly is installed to a housing of an electronic device according to various embodiments of the present disclosure.
Figure 24B:
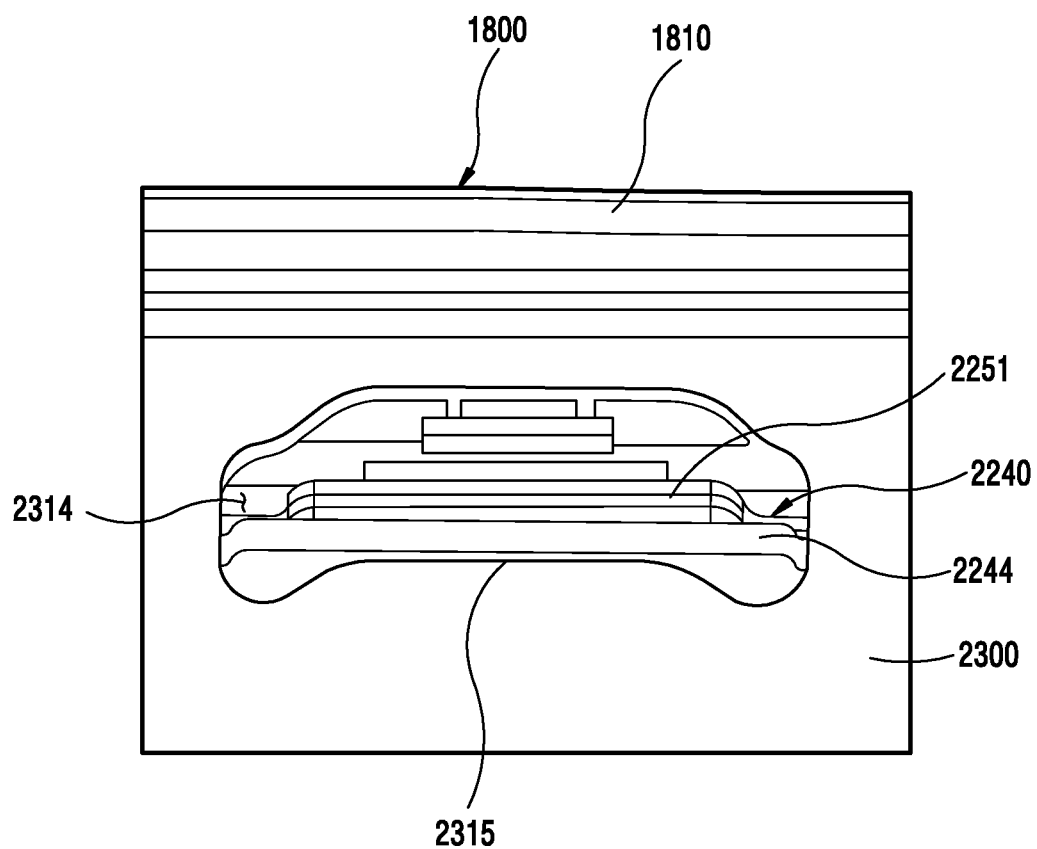
Figure 24C:
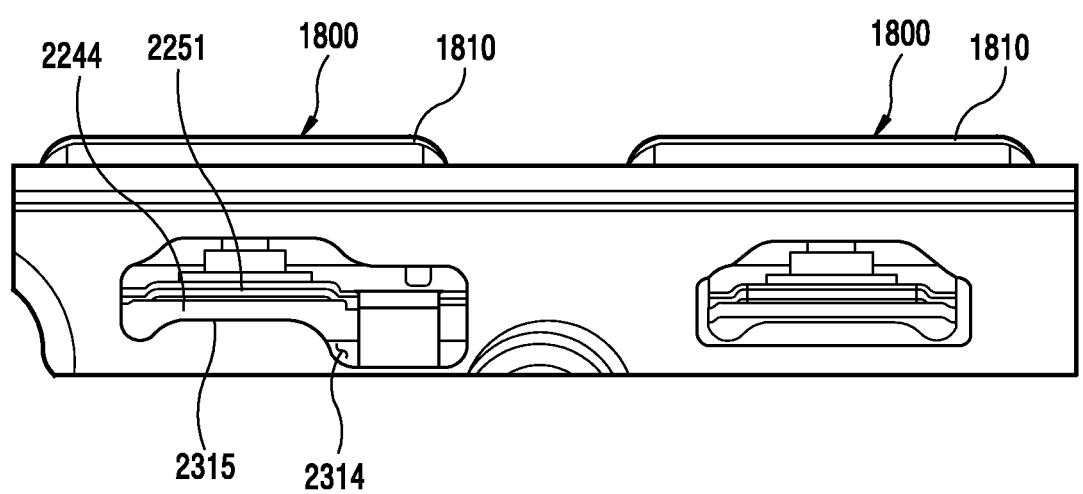
Figure 24D:
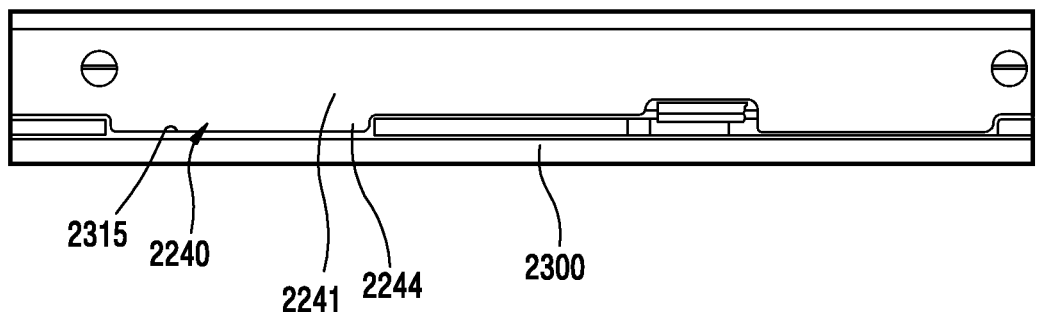

Referring to FIGS. 23D and 23E, the one pair of key buttons 1800 mounted in the housing 2300 may be maintained in the state where each of the key tops 1810 of the key buttons 1800 is partially exposed to the outside of the housing 2300, and the key buttons 1800 may be supported by the support plate 2240 of the FPCB assembly 2230 from the rear side thereof. According to an embodiment of the present disclosure, the press portions 1821, which are respectively formed on the key bases 1820 of the key buttons 1800, may be maintained in the state of being respectively in contact with the dome keys 2252 and 2253 of the circuit body 2251 that is supported by the plate body 2240 of the FPCB assembly 2230. In such a case, because the elastic pieces 2242 formed on the opposite ends of the support plate 2240 are fixed to the elastic piece seating recess 2314 formed in the housing 2300, the support plate 2240 is not moved backward even if the key buttons 1800 are pressed, and only the dome keys 2252 and 2253 disposed on the circuit body 2251 of the FPCB 2250 can be physically switched by pressing the press portions 1821 of the key bases 1820.

According to various embodiments of the present disclosure, because the pressing operation of the key tops 1810 can be implemented only by the support of the support plate 2240 of the FPCB assembly 2230 without any other separate instrument (e.g., the bracket) in the state where the key buttons 1800 are assembled in the inside of the housing 2300, the performance test of the key buttons 1800 can be easily implemented.

FIGS. 24A to 24D are configuration views illustrating a principal portion in a state where an FPCB assembly is installed to a housing of an electronic device according to various embodiments of the present disclosure. Descriptions for the same constituent elements as those described above will be omitted.

Referring to FIGS. 24A to 24D, the support plate 2240 of the FPCB assembly 2230 may be rigidly fixed by the elastic pieces 2242 that are formed on the opposite ends thereof. However, because two key buttons 1800 are accommodated, the support plate 2240 can be moved backward by pressing the key buttons 1800. Accordingly, protrusion operations 2244 may be formed to extend at a certain interval on the plate body 2241 of the support plate 2240, and the protrusion operations 2244 may be inserted into protrusion operation insertion recess 2314 formed in the bottom of the housing 2300, respectively. In such a case, the protrusion operations 2244 of the support plate 2240 may be supported by contact operations 2315, respectively, which are formed by the periphery of the protrusion operation insertion recess of the protrusion operation insertion recess 2314, which is formed in a manner of being perforated. According to an embodiment of the present disclosure, the protrusion operations 2244 of the support plate 2240 may be disposed such that they are supported at least not to protrude from the protrusion operation insertion recess 2314 of the housing 2300 after being inserted into the protrusion operation insertion recess 2244 of the housing 2300.

Figure 25A:
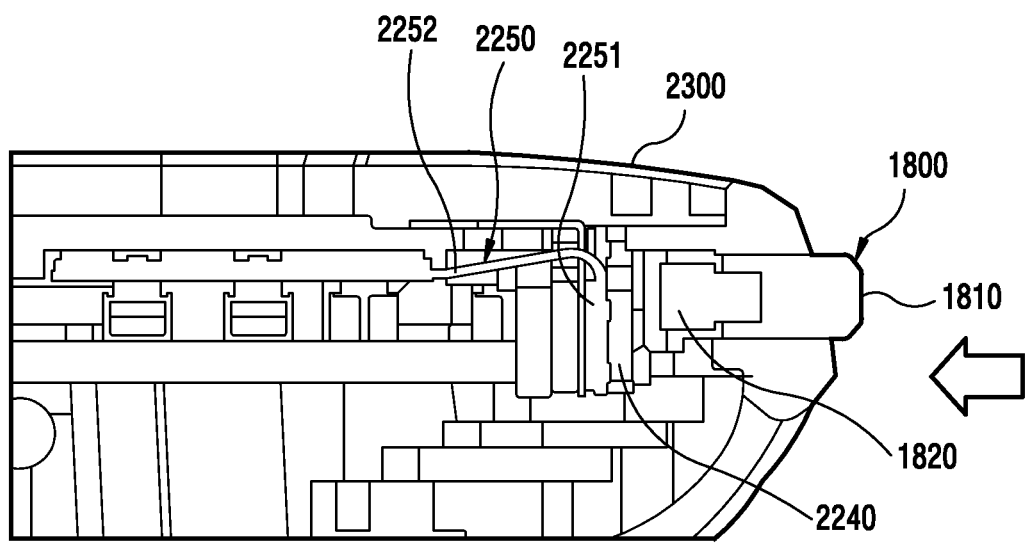
FIGS. 25A and 25C are configuration views illustrating a principal portion in a state where key buttons and an FPCB assembly are installed according to various embodiments of the present disclosure.
Figure 25B:
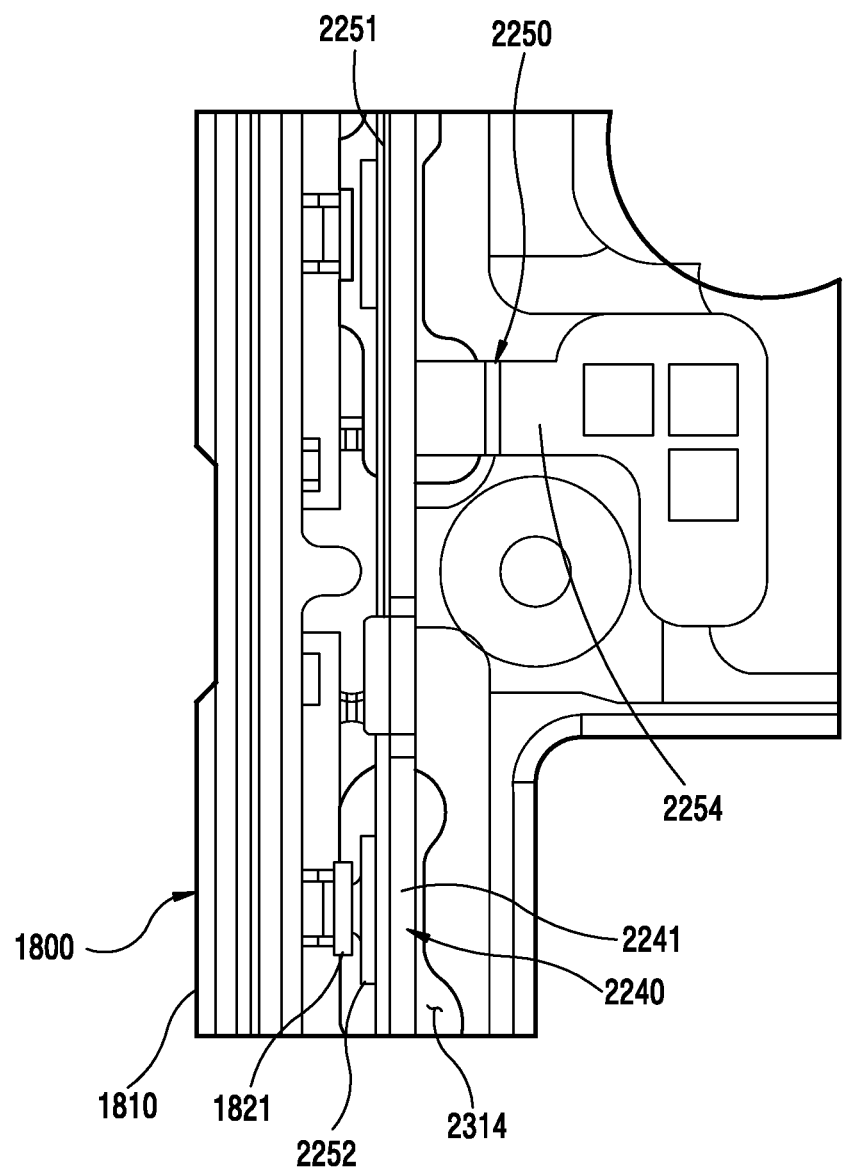
Figure 25C:
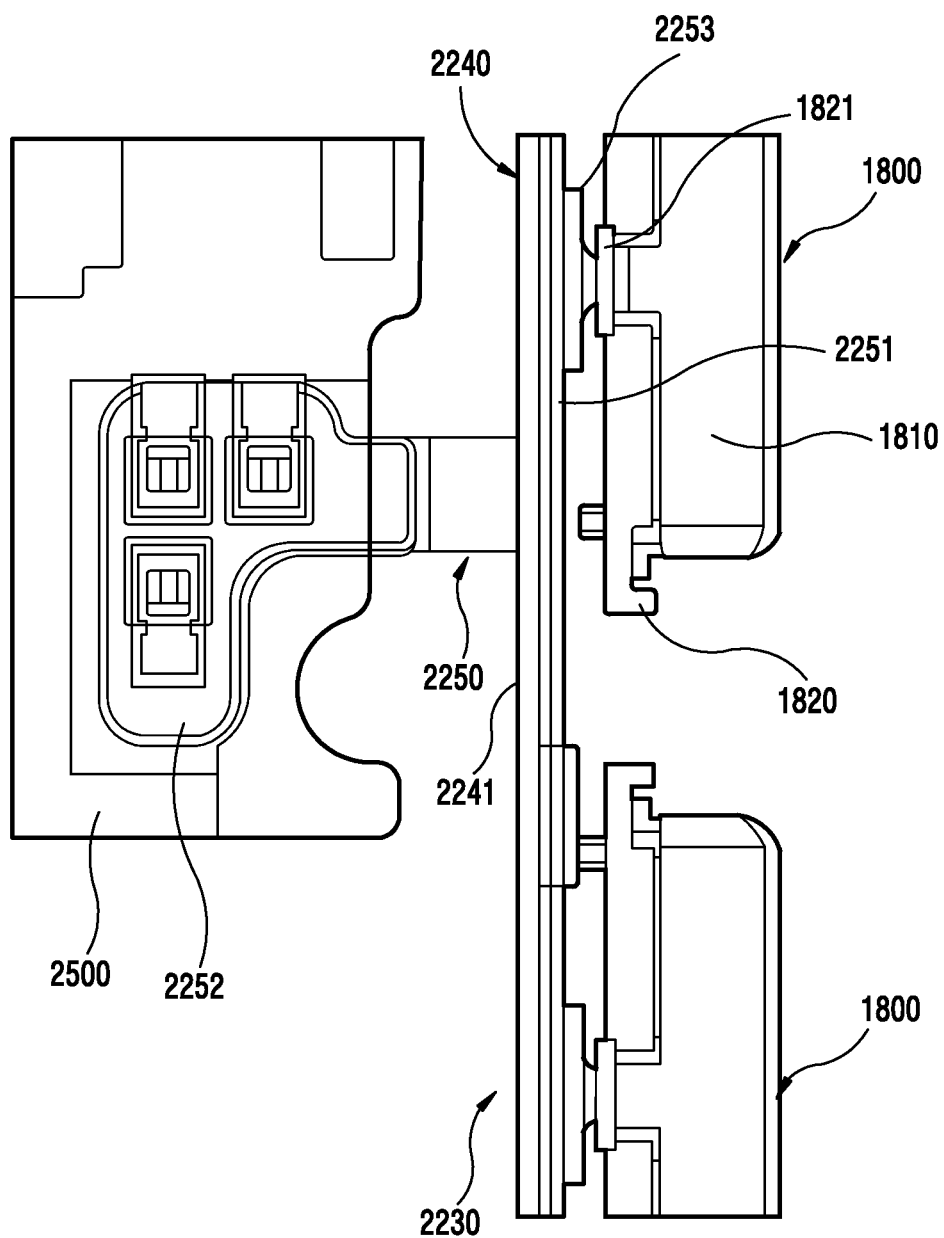

FIGS. 25A and 25C are configuration views illustrating a principal portion in a state where key buttons and an FPCB assembly are installed according to various embodiments of the present disclosure.

Referring to FIGS. 25A to 25C, the key buttons 1800 may be installed to the housing 2300 of the electronic device to partially protrude. According to an embodiment of the present disclosure, in the state where the key tops 1810 of the key buttons 1800 are exposed to the outside of the housing 2300, the support plate 2240 of the FPCB assembly 2230 can be disposed to support the key buttons 1800 at the rear side of the key buttons 1800. In such a state, the press portions 1821 formed on the key bases 1820 of the key buttons 1800 maintain the state in which they are respectively in contact with the dome keys 2522 disposed on the FPCB 2250 of the FPCB assembly 2230, and the connection terminal portion 2254 of the FPCB 2250 may bypass to the rear side of the support plate 2240 so as to maintain the state in which the connection terminal portion 2254 of the FPCB 2250 is electrically connected to the PCB 2500 of the electronic device.

According to various embodiments of the present disclosure, because the key buttons 1800 and the FPCB assembly 2230 are disposed together in the housing 2300, which is one single product, so that the key buttons 1800 can be assembled to the housing without assembling a separate structure (e.g., a bracket, and the like), there is an advantageous effect in the performance test of the key buttons 1800.

Figure 26A:
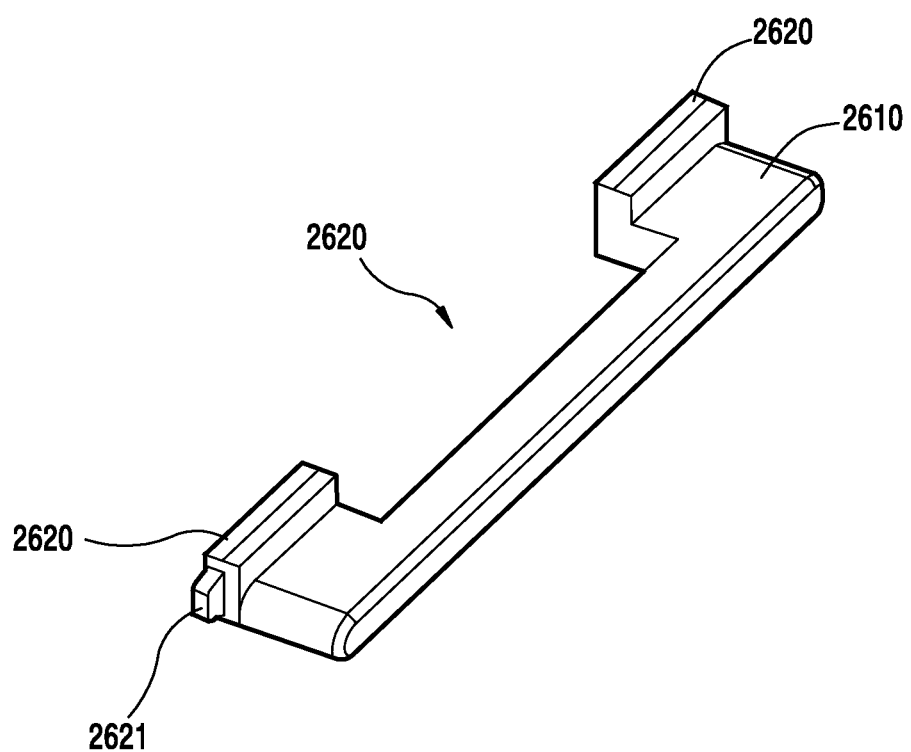
FIGS. 26A and 26B are configuration views of a key button according to various embodiments of the present disclosure.
Figure 26B:
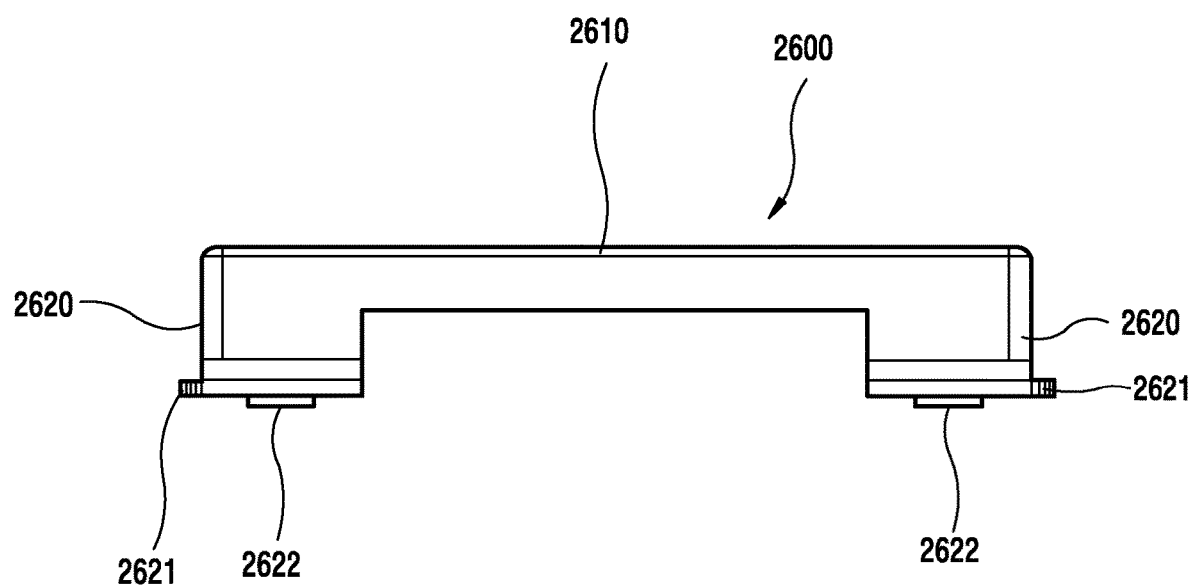

FIGS. 26A and 26B are configuration views of a key button according to various embodiments of the present disclosure.

Referring to FIGS. 26A and 26B, a key button 2600 may include a key top 2610 having a certain length, and key bases 2620 that are disposed on the opposite ends of the key top 2610, respectively. According to an embodiment of the present disclosure, each of the key bases 2620 may be disposed to correspond to the FPCB assembly 2230 that includes the FPCB 2250, on which one pair of dome keys 2252 and 2253 as in the configuration of FIG. 22, and a press portion 2622 formed on each of the key bases 2620 may have a configuration that presses a corresponding one of the dome keys 2252 and 2253 of the FPCB assembly 2230. According to an embodiment of the present disclosure, a key flange 2621 may be formed to extend outwardly from each key base 2620. According to an embodiment of the present disclosure, the key flange 2621 may serve to restrain the key base 2620 to be locked when the key top 2610 passes through a key top passage hole 2701 (see FIG. 27A) formed in the housing 2700 (see FIG. 27A).

FIGS. 27A to 27D are views illustrating a process of installing a key button and an FPCB assembly to a housing of an electronic device according to various embodiments of the present disclosure.

Figure 27A:
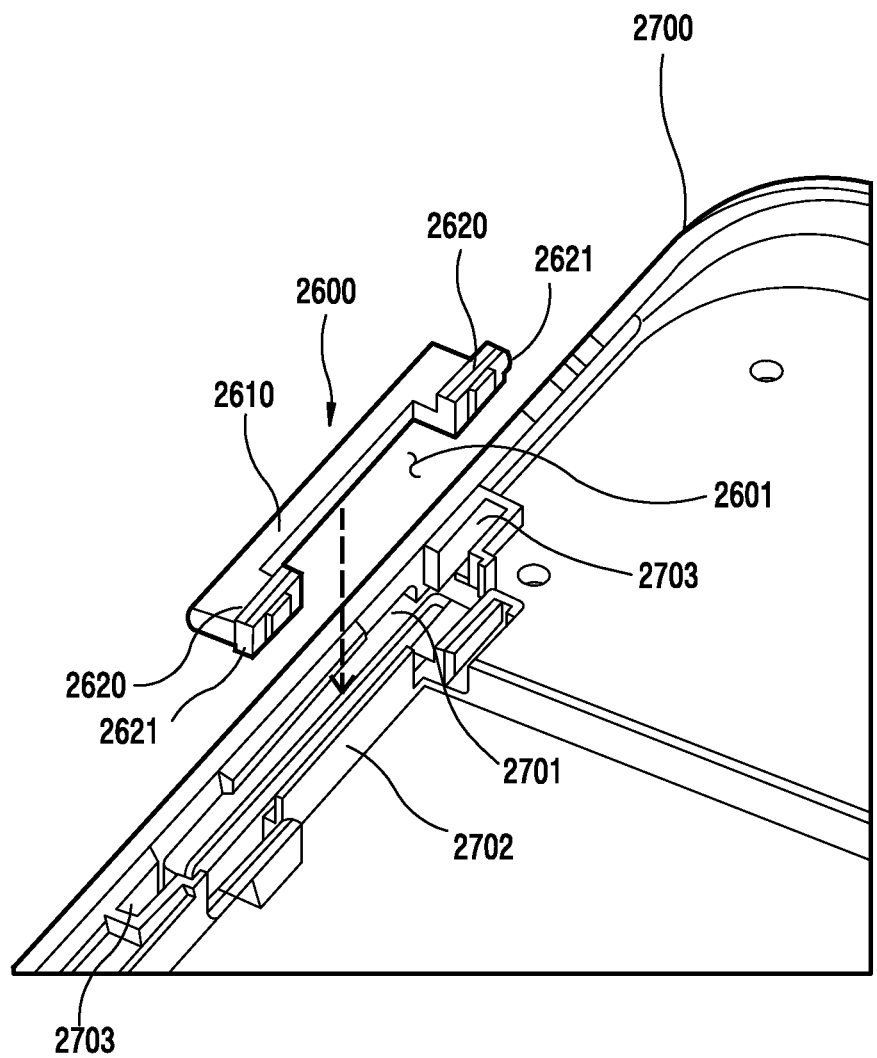
FIGS. 27A to 27D are views illustrating a process of installing a key button and an FPCB assembly to a housing of an electronic device according to various embodiments of the present disclosure.
Figure 27B:
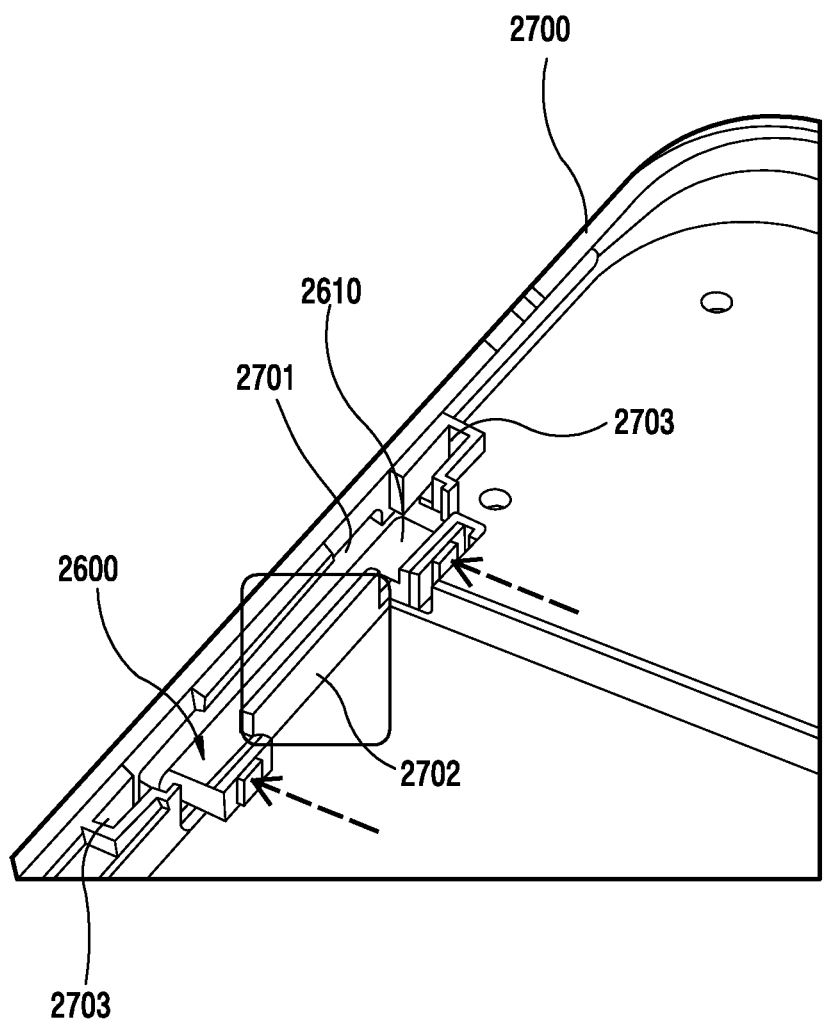

Referring to FIGS. 27A and 27B, the housing (e.g., a rear housing) 2700 of an electronic device may be formed with a key top passage hole 2701. According to an embodiment of the present disclosure, the key top passage hole 2701 may be formed to have a size that allows the key top 2610 of the key button 2600 to pass therethrough. According to an embodiment of the present disclosure, the key top passage hole 2701 may be formed to have a size that allows only the key top 2610 to pass therethrough and prevent the key flanges 2621 formed on the key base 2620 from passing therethrough.

According to various embodiments of the present disclosure, the key button 2600 may be lowered from the upper side of the housing 2700 in the direction indicated by the arrow, as illustrated in FIG. 27A, and the key button 2600 may be moved forward toward the key top passage hole 2701, as illustrated in FIG. 27B. By this operation, the key button 2600 may be prevented from being completely separated from the key top passage hole 2701 of the housing 2700 by the key flanges 2621, and at the same time, the key button 2600 may be disposed such that the key top 2610 is partially exposed to the outside of the housing 2700 through the key top passage hole 2701. According to an embodiment of the present disclosure, the key button 2600 may have a " ⊏ "-shaped opened portion 2601 formed at the center thereof, and a key button accommodation piece 2702 may be formed in the housing 2700 to protrude upwardly. Accordingly, when the key button 2600 passes through the key top passage hole 2701 of the housing 2700, the key button accommodation piece 2703 is accommodated in the opened portion 2601 so that the key button 2600 can be easily assembled.

Figure 27C:
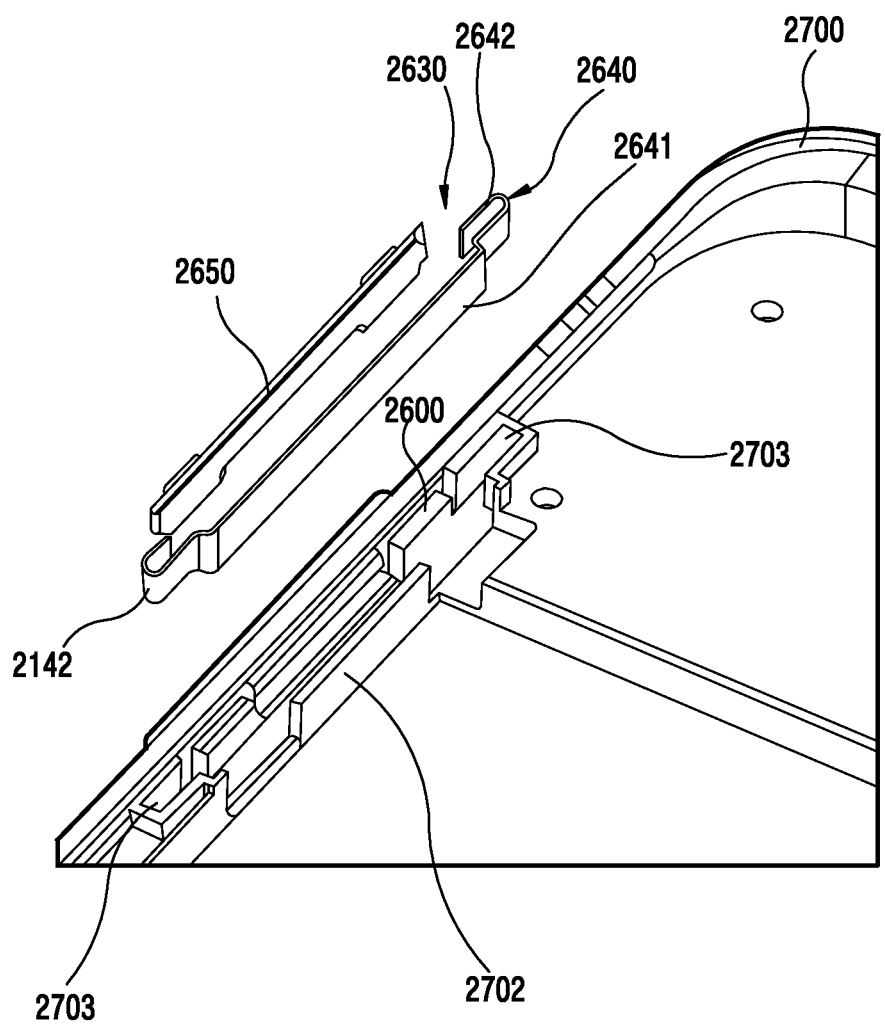
Figure 27D:
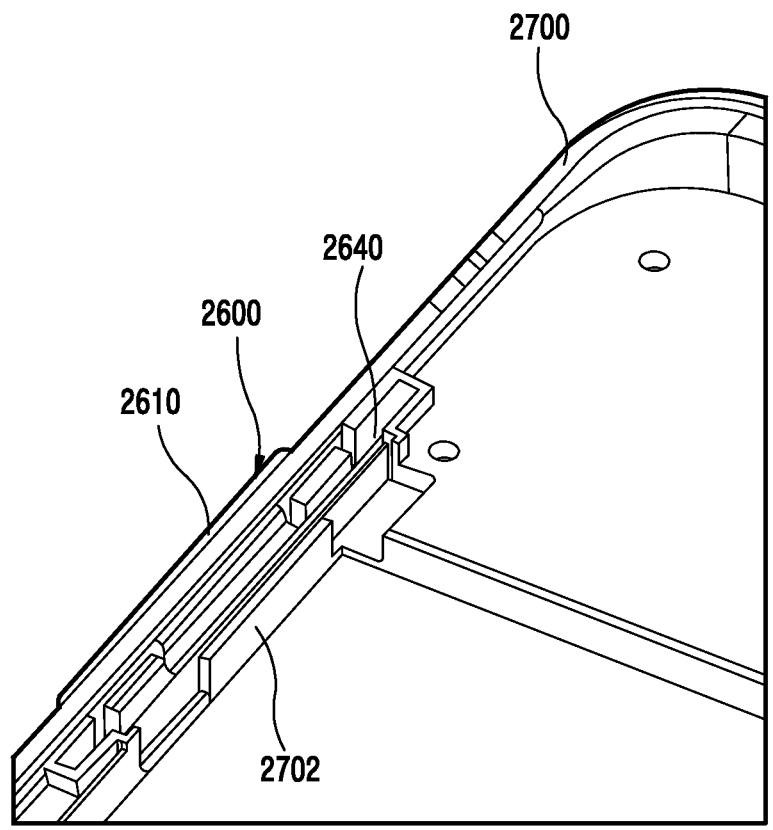

Referring to FIGS. 27C and 27D, the FPCB assembly 2630 can be mounted in the direction indicated by the arrow at the rear side while maintaining the state in which the key top 2610 of the key button 2600 has partially passed through the key top passage hole 2701 of the housing 2700. In such a case, the elastic pieces 2642, formed on the opposite ends of the plate body 2641 of the support plate 2640 of the FPCB assembly 2630, may be tightly seated in the elastic piece seating recess 2703 that is formed in the housing 2700. This is because, the elastic pieces 2642 are seated in the elastic piece seating recesses 2703 while maintaining an outwardly biased elasticity.

According to various embodiments of the present disclosure, because the pressing operation of the key top 2610 is implemented only by the support of the support plate 2640 of the FPCB assembly 2630 without any other separate instrument (e.g., a bracket) in the state where the key button 2600 is assembled in the inside of the housing 2700, the performance test of the key button 2600 can be easily implemented.

According to various embodiments of the present disclosure, it is possible to provide a portable electronic device that includes a front glass cover that forms a front surface of the electronic device, a rear cover that forms a rear surface of the electronic device, a bezel that surrounds a space formed by the front cover and the rear cover, and incudes a first portion that includes an opening, a display device that is embedded in the space, and includes a screen area that is exposed through the front cover, and a plate that includes a planar surface that is parallel with the front cover within the space, and includes a first protrusion and a second protrusion that are disposed close to the opening and are spaced apart from each other.

The first protrusion and the second protrusion are disposed to provide a passage that leads to the opening.

The electronic device further includes a key that has a size and a shape that enable the key to pass through the passage and the opening, and is inserted into the passage and the opening to be movable in a first direction, a first member (elongated member) that is attached to or integrally formed with a surface of the key opposite to the surface of the key, which is exposed to the outside of the electronic device, so as to prevent the key from being pulled out to the outside, and a second member including, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the second protrusion.

The first member is inserted into a gap between the key and the central portion.

According to various embodiments of the present disclosure, the first protrusion and the second protrusion may not be in contact with the first portion.

According to various embodiments of the present disclosure, at least one of the first end portion and the second end portion may have a U-shape.

According to various embodiments of the present disclosure, the electronic device may further include an electric component that is inserted into a gap between the first member and the central portion and detects the movement of the key, and at least one wire that extends from the component.

According to various embodiments of the present disclosure, the plate may be integrally formed with the bezel.

According to various embodiments of the present disclosure, the rear cover and the side surface portion may be integrally formed with each other.

According to various embodiments of the present disclosure, the rear cover and the side surface portion may include the same material.

According to various embodiments of the present disclosure, the material may be a metal.

According to various embodiments of the present disclosure, it is possible to provide a portable electronic device that includes a front glass cover that forms a front surface of the electronic device, a rear cover that forms a rear surface of the electronic device, a bezel that surrounds a space formed by the front cover and the rear cover, and incudes a first portion that includes a first opening and a second opening, a display device that is embedded in the space, and includes a screen area that is exposed through the front cover, and a plate that includes a planar surface that is parallel with the front cover within the space, and includes a first protrusion, a second protrusion, and a third protrusion, which are disposed close to the opening and are spaced apart from each other. The second protrusion is interposed between the first protrusion and the third protrusion.

The first protrusion and the second protrusion are disposed to provide a first passage that leads to the first opening without being in contact with the first portion.

The second protrusion and the third protrusion are disposed to provide a second passage that leads to the second opening without being in contact with the first portion.

The electronic device further includes a first key that has a size and a shape that enable the first key to pass through the first passage and the first opening, and is inserted into the first passage and the first opening to be movable in a first direction, a second key that has a size and a shape which enable the second key to pass through the second passage and the second opening, and is inserted into the second passage and the second opening to be movable in the first direction, a first key member (elongated member) that is attached to or integrally formed with a surface of the first key opposite to the surface of the first key, which is exposed to the outside of the electronic device, so as to prevent the first key from being pulled out to the outside, a second key member (elongated member) that is attached to or integrally formed with a surface of the second key opposite to the surface of the second key, which is exposed to the outside of the electronic device, so as to prevent the second key from being pulled out to the outside, and a second member that includes, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the third protrusion.

The first key member is inserted into a gap between the first key and the central portion, and the second key member is inserted into a gap between the second key and the central portion.

According to various embodiments of the present disclosure, it is possible to provide a method of manufacturing an electronic device that includes A) an operation of providing a bezel that surrounds an inner mounting space of the electronic device and a plate that is connected with the bezel, in which the bezel includes a first portion that includes an opening formed through a portion of the bezel, the plate that includes a planar surface that is parallel with the front cover within the space, and includes a first protrusion and a second protrusion that are disposed close to the opening and are spaced apart from each other, the first protrusion and the second protrusion being configured to form a passage that leads to the opening without being in contact with the first portion, B) an operation of inserting a key through the passage and the opening such that at least a part of the key is exposed to the outside of the electronic device, C) an operation of preventing the key from being pulled out to the outside by using a first member (elongated member) that is attached to or integrally formed with a surface of the key opposite to the surface of the key, which is exposed to the outside of the electronic device, and includes one end portion that extends in a first direction parallel to the longitudinal direction of the first portion, and the other end portion that extends in the first direction and is formed at the opposite side to the one end portion so as to prevent the key from being pulled out to the outside, and D) an operation of inserting a second member including, within the space, a central portion that extends in the first direction, a first end portion that extends in the first direction and is disposed between the first portion and the first protrusion, and a second end portion that extends in the first direction and is disposed between the first portion and the second protrusion.

According to various embodiments of the present disclosure, the method may further include an operation of providing a rear cover that forms the rear surface of the electronic device.

According to various embodiments of the present disclosure, the method may further include an operation of providing a front glass cover that forms the front surface of the electronic device.

According to various embodiments of the present disclosure, the electronic device may include a home key button on the front surface. According to an embodiment of the present disclosure, the home key button facilitates an efficient operation of the electronic device using fingerprint recognition by mounting a fingerprint recognition sensor on the outer surface of the home key button, in addition to a wake-up function and a return-to-home screen function of the electronic device.

In general, when the fingerprint recognition sensor is provided in the home key button, the fingerprint recognition sensor may be mounted on an FPCB that passes through the home key button, and the FPCB may have a configuration that is electrically connected with a PCB of the electronic device along the lower side of the home key button. In such a case, because the FPCB is off-centered to one side of the home key button to bypass to the lower side of the home key button, there was an issue in that when a portion of the home key button, through which the FPCB passes, is pressed, the click feeling becomes weighty, and when a portion of the home key button, through which the FPCB does not pass, is pressed, the click feeling becomes lighter.

An embodiment of the present disclosure may provide a home key button for addressing the above-described issues. According to an embodiment of the present disclosure, the various embodiments of the present disclosure may always provide a constant click feeling even when any portion of the home key button is pressed.

FIGS. 28A to 28D are configuration views illustrating a configuration of a home key button of an electronic device according to various embodiments of the present disclosure.

Figure 28A:
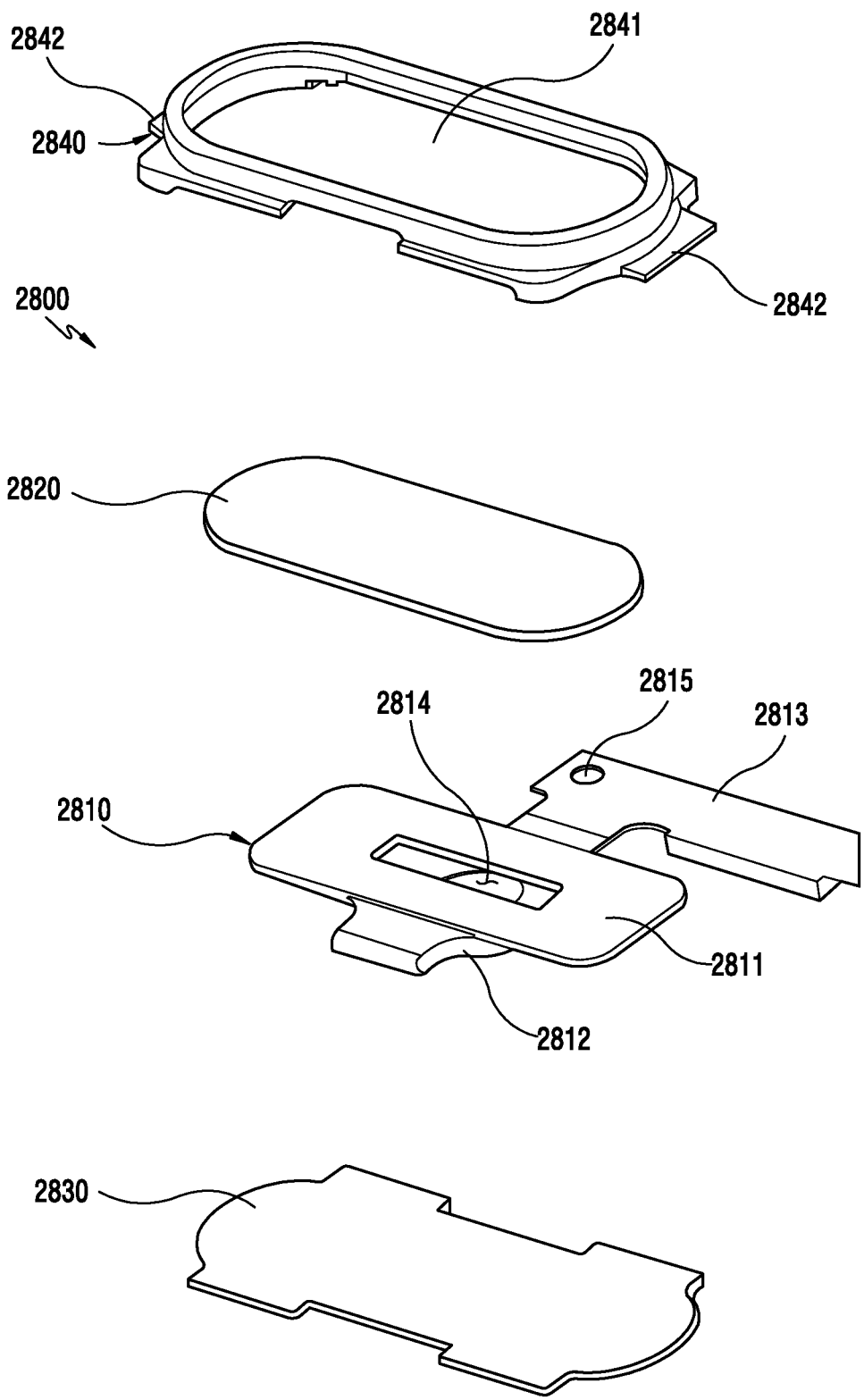
FIGS. 28A to 28D are configuration views illustrating a configuration of a home key button of an electronic device according to various embodiments of the present disclosure.

Referring to FIG. 28A, a home key button 2800 may include an FPCB 2810, a fingerprint recognition sensor 2820 that is disposed above and connected with the FPCB 2810, and a support plate 2830 including an actuator 2831 (see FIG. 29A) that is disposed below the FPCB 2810 so as to press a dome key positioned below the actuator 2831 when the home key button 2800 is pressed. According to an embodiment of the present disclosure, the home key button 2800 may further include a decoration member 2840 that is engaged with the support plate 2830, on which the FPCB 2810 is disposed.

According to various embodiments of the present disclosure, the decoration member 2840 may include a sensor exposing port 2841 at the center thereof, and may be engaged with the support plate 2830 such that the fingerprint recognition sensor 2820 is exposed. According to an embodiment of the present disclosure, the decoration member 2840 may be formed of a metal material. According to an embodiment of the present disclosure, the decoration member 2840 may be formed by plating chrome on a synthetic resin material. According to an embodiment of the present disclosure, when the decoration member 2840 is mounted on the front surface of the electronic device, at least a part of the periphery of the front surface is exposed to the outside so that the decoration member 2840 can not only give prominence to the home key button 2800 on the electronic device, but can also contribute to the configuration of the beautiful exterior of the electronic device. According to an embodiment of the present disclosure, the decoration member 2840 may serve to prevent the home key button 2800 from being completely separated to the outside by being caught to the inner surface of the housing of the electronic device.

According to various embodiments of the present disclosure, the FPCB 2810 may include a sensor mounting unit 2811 that accommodates the fingerprint recognition sensor 2820 and is electrically connected to the fingerprint recognition sensor 2820, a diffraction unit 2812 that is formed to extend from the sensor mounting unit 2811, and is attached to the bottom surface of the support plate 2830 bypassing a molded portion, the diffraction unit 2812 including a through hole 2814, and a connecting portion 2813 that is formed to extend from the diffraction unit 2812 and may be electrically connected to the PCB avoiding the display of the electronic device. According to an embodiment of the present disclosure, the connecting portion 2813 may further include a position fixing hole 2815, into which a protrusion formed in the housing of the electronic device may be inserted so as to fix the position of the home key button 2800 when the home key button 2800 is applied to the electronic device. According to an embodiment of the present disclosure, an end portion of the connecting portion 2813 may further include a connecting terminal that is connected with the PCB.

According to various embodiments of the present disclosure, the support plate 2830 may be formed by a metal member. According to an embodiment of the present dis- closure, the support plate 2830 may be formed of a material, such as STS or aluminum. According to an embodiment of the present disclosure, the support plate 2830 may include the actuator 2831 on the bottom surface thereof, which protrudes downwardly. According to an embodiment of the present disclosure, the actuator 2831 may serve as the press portion for physically pressing the dome key disposed below the actuator 2831 when the home key button 2800 is mounted in the electronic device.

According to various embodiments of the present disclosure, it has been described that the fingerprint recognition sensor 2820 is disposed on the home key button 2800, but the present disclosure is not limited thereto. For example, various sensor modules (e.g., an HRM sensor) may be provided in place of the fingerprint recognition sensor 2820 or in addition to the fingerprint recognition sensor 2820. According to an embodiment of the present disclosure, various light emitting members, such as an LED indicator, may be applied in place of the fingerprint recognition sensor.

Figure 28B:
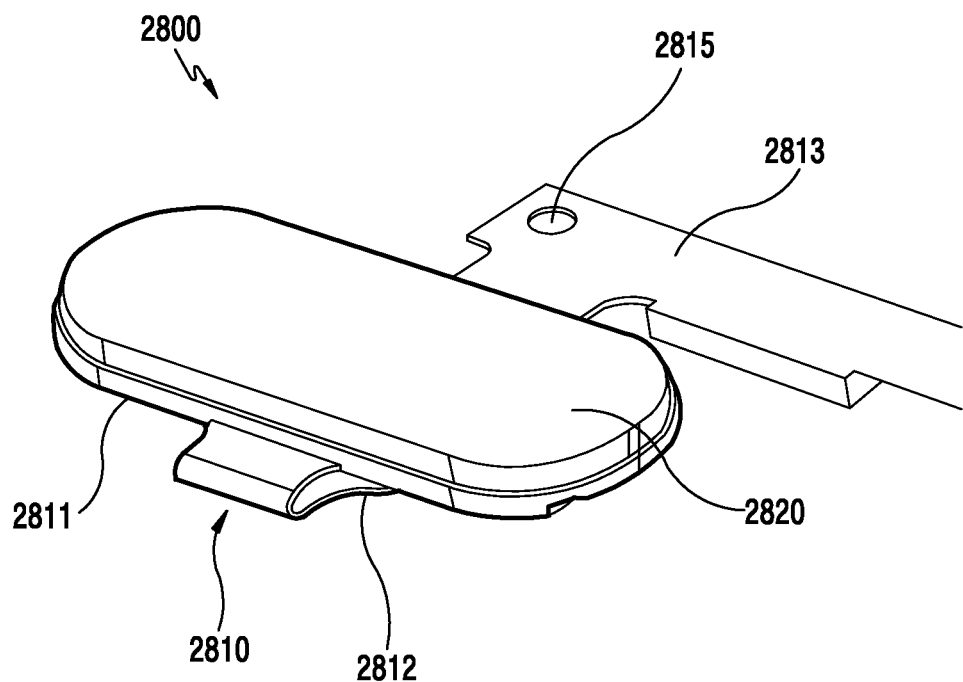
Figure 28C:
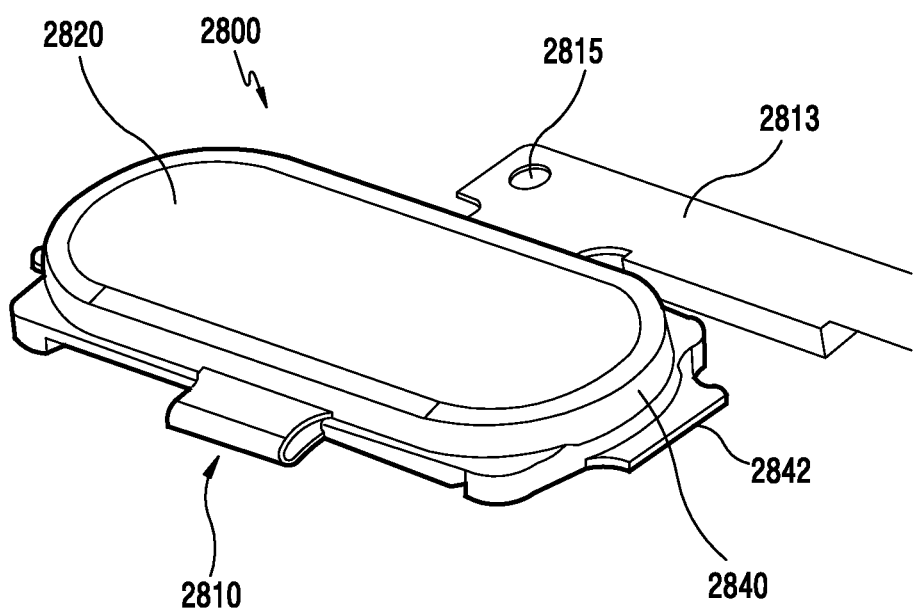

Referring to FIGS. 28B and 28C, the FPCB 2810 and the fingerprint recognition sensor 2820 may be fixed to each other by being molded using a synthetic resin, and electri- cally connected with each other. According to an embodi- ment of the present disclosure, only the FPCB 2810 may be formed by being insert-molded by a member of a synthetic resin material, and the fingerprint recognition sensor 2820 may be disposed on the top thereof by being attached thereto. According to an embodiment of the present disclo- sure, a decoration member 2840 may be further stacked on the fingerprint recognition sensor 2820. In such a case, the decoration member 2840 may be fixed to a molding includ- ing the FPCB 2810 by a method of bonding by using a double-sided tape, and the like. According to an embodiment of the present disclosure, the top surface of the fingerprint recognition sensor, which is exposed through the decoration member 2840, may be formed through a UV molding process.

Figure 28D:
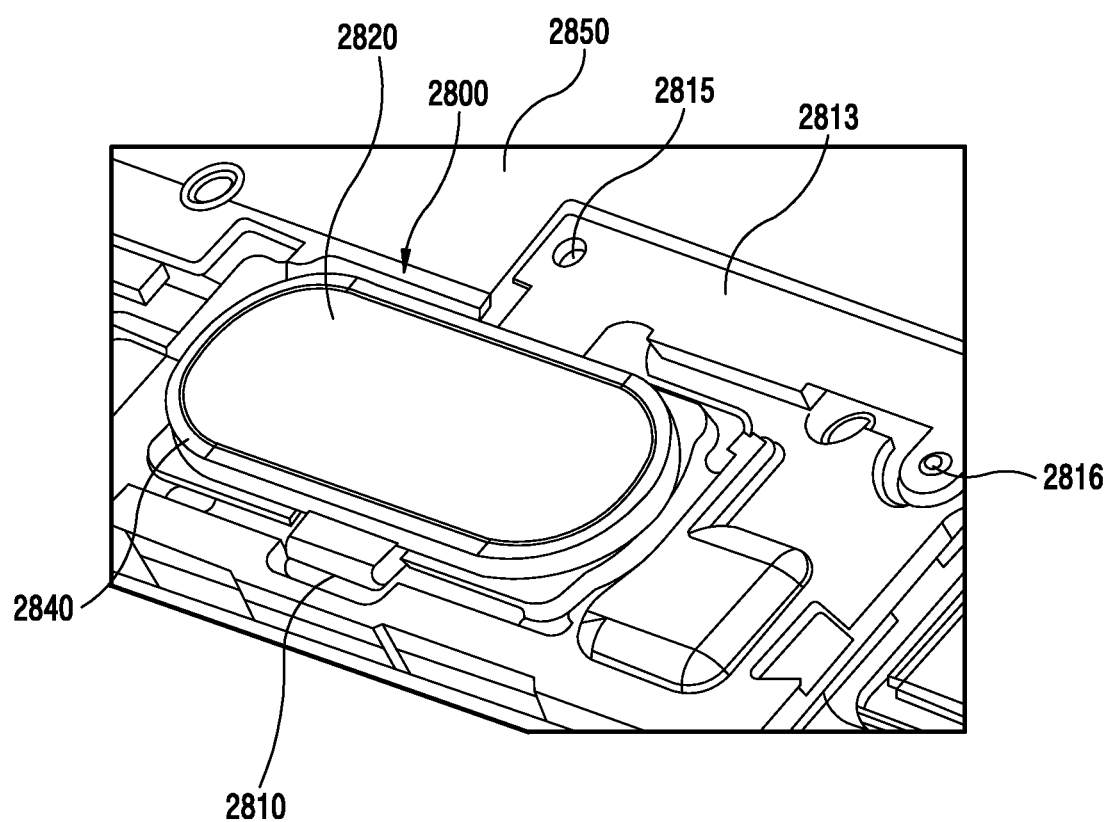

Referring to FIG. 28D, the home key button 2800 may be disposed in the housing 2850 of the electronic device. According to an embodiment of the present disclosure, the home key button 2800 may be disposed such that the fingerprint recognition sensor 2820 is exposed to the upper side thereof through the opening 2841 of the decoration member 2840, and below the home key button 2800, the diffraction unit 2812 of the FPCB 2810 is disposed such that the diffraction unit 2812 is bent to the lower side of the home key button downward. This is to address the issues that when the FPCB 2810 is formed in a linear form, the FPCB 2810 may overlap with the display, and when the FPCB 2810 is linearly fixed, the length of the portion of the FPCB 2810, which is fixed to the housing, is reduced, thereby deterio- rating the click feeling. According to an embodiment of the present disclosure, in the connecting portion 2813 of the FPCB 2810, one pair of position fixing holes 2815 and 2816 may be formed so that the protrusions formed in the housing 2850 can be inserted into the holes 2815 and 2816 so as to fix the position of the connecting portion 2813.

Figure 29A:
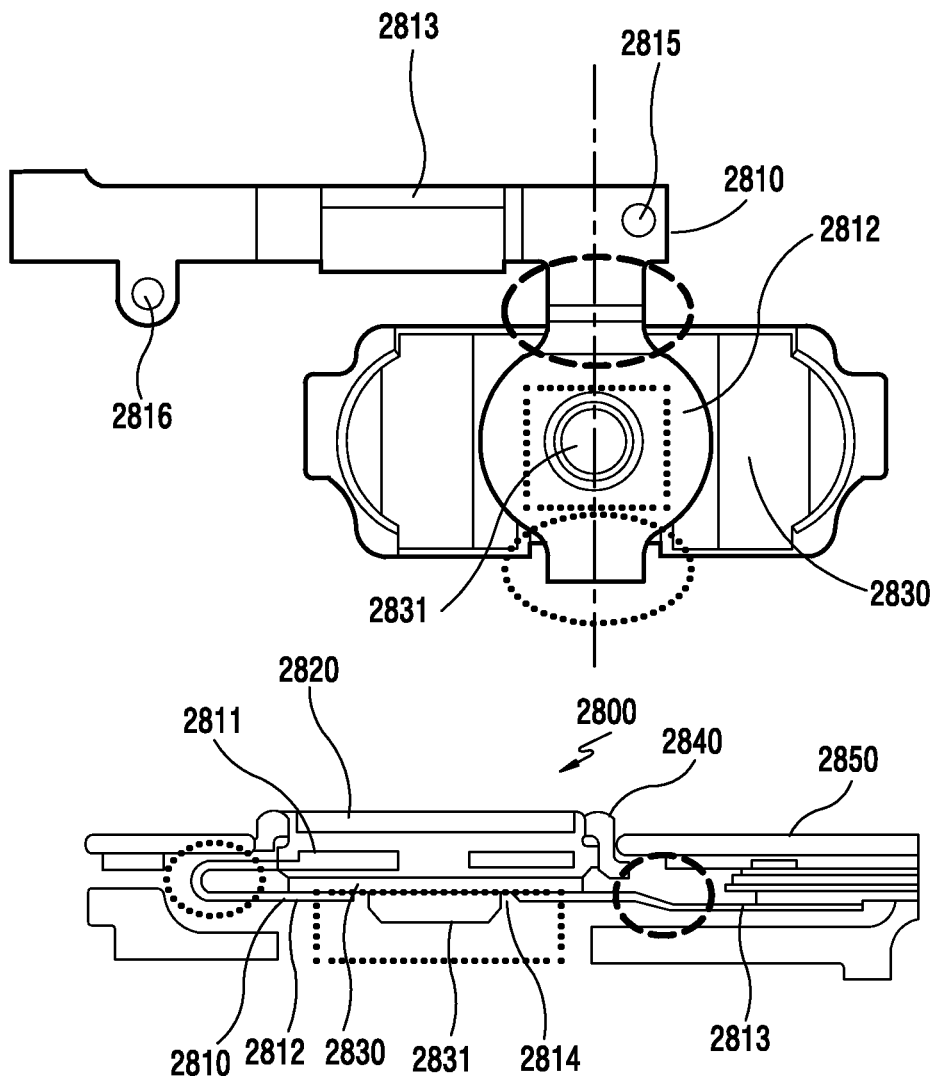
FIGS. 29A and 29B are configuration views illustrating an installation and operation relationships of a home key button of an electronic device according to various embodiments of the present disclosure.
Figure 29B:
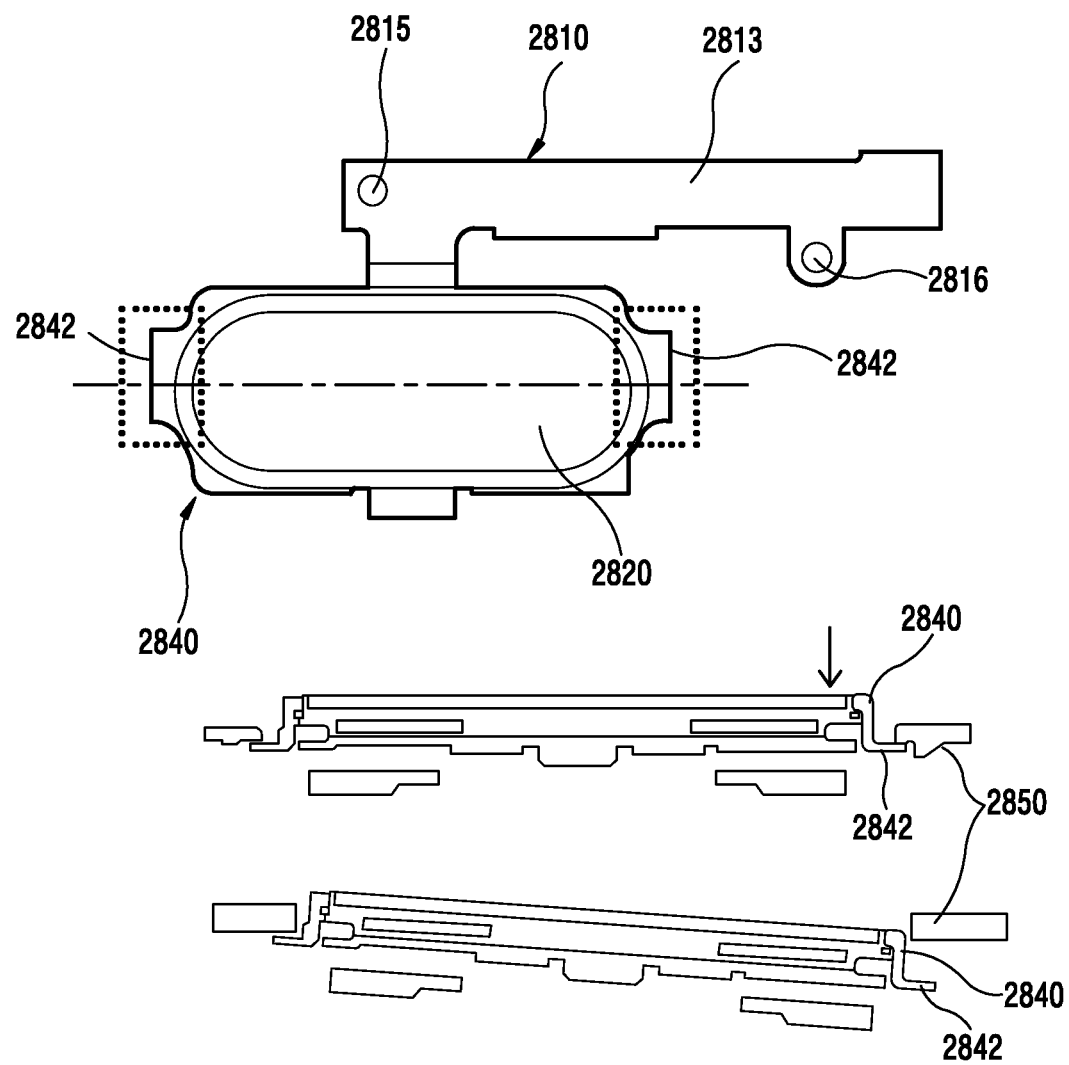

FIGS. 29A and 29B are configuration views illustrating an installation and operation relationships of a home key button of an electronic device according to various embodiments of the present disclosure.

Referring to FIGS. 29A and 29B, the home key button 2800 may be installed to be restrained in such a manner that locking pieces 2842 of the decoration member 2840 are engaged with the housing 2850 of the electronic device. According to an embodiment of the present disclosure, the home key button 2800 may be disposed such that the fingerprint recognition sensor 2820 is exposed to the upper side of the decoration member 2840, and the sensor mounting unit 2811 of the FPCB 2810, which is insert-molded to the molding portion, may be disposed below the home key button 2800. According to an embodiment of the present disclosure, the support plate 2830 may be disposed below the molding portion. According to an embodiment of the present disclosure, the diffraction unit 2812 of the FPCB 2810, which is drawn out from the molding portion, may be disposed across the center of the bottom surface of the support plate 2830. In such a case, the diffraction unit 2812 of the FPCB 2810 may be tightly attached to the bottom surface of the support plate 2830 in a manner where the actuator 2831 of the support plate 2830 passes through the through-hole 2814. According to an embodiment of the present disclosure, the diffraction unit 2812 of the FPCB 2810 may be attached to the bottom surface of the support plate 2830 by a method of bonding by using a double-sided tape, and the like.

According to various embodiments of the present disclosure, the home key button 2800 may be restrained without breaking away to the outside of the electronic device as the locking pieces 2842, which is formed to extend from the opposite ends of the decoration member 2840, are engaged with the housing 2850. In such a case, the deviation of upper and lower click feelings of the home key button 2800 can be reduced when the length of the locking pieces 2842 in the width direction of the home key button 2800 is lengthened.

Figure 30:
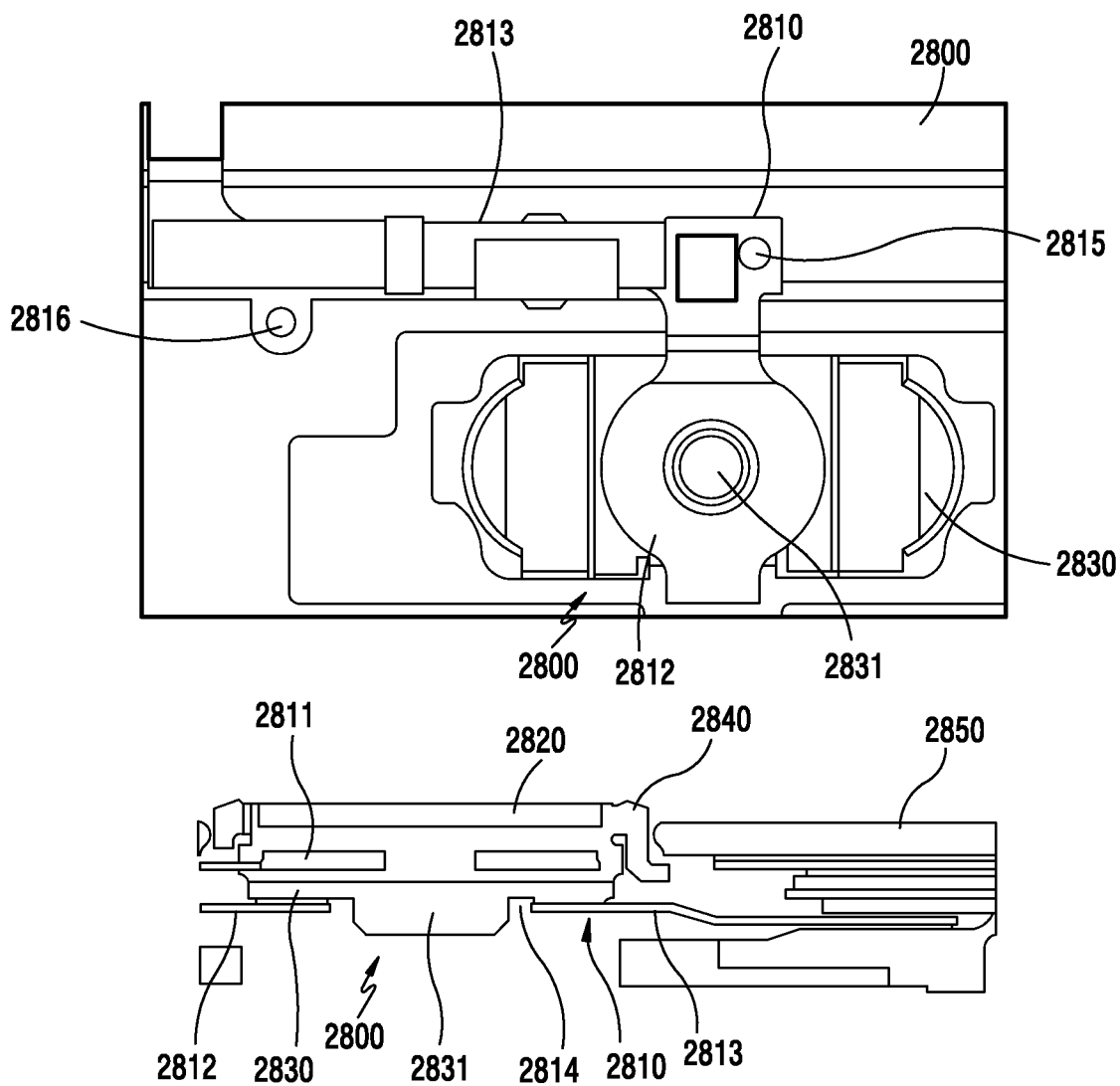
FIG. 30 is a view illustrating a fixing relationship of an FPCB that is provided on a home key button according to various embodiments of the present disclosure.

FIG. 30 is a view illustrating a fixing relationship of an FPCB that is provided on a home key button according to various embodiments of the present disclosure.

Referring to FIG. 30, the home key button 2800 may be disposed in the housing 2850 of the electronic device. According to an embodiment of the present disclosure, the FPCB 2810 may include a diffraction unit 2812 that bypasses the center of the support plate 2830 under the fingerprint recognition sensor 2820, and a connecting portion 2813 that extends from the diffraction unit 2812 toward the display and is bent again. According to an embodiment of the present disclosure, the connecting portion 2813 may be disposed to be spaced apart from each other by a certain interval so as to prevent a white point phenomenon of the LCD. According to an embodiment of the present disclosure, the bent area in the connecting portion 2813, which includes a first position fixing hole 2815, excludes a adhesion process (excluding the use of a double-sided tape) so as to prevent the deterioration of the click feeling of the home key button 2800 in advance. According to an embodiment of the present disclosure, a second position fixing hole 2816 may be disposed along the bent portion of the connecting portion 2813 at a certain distance from the first position fixing hole 2815. According to an embodiment of the present disclosure, in an area of the connecting portion 2813 between the first position fixing hole 2815 and the second position fixing hole 2816, a hardware component for the home key button 2800 may be mounted.

Figure 31A:
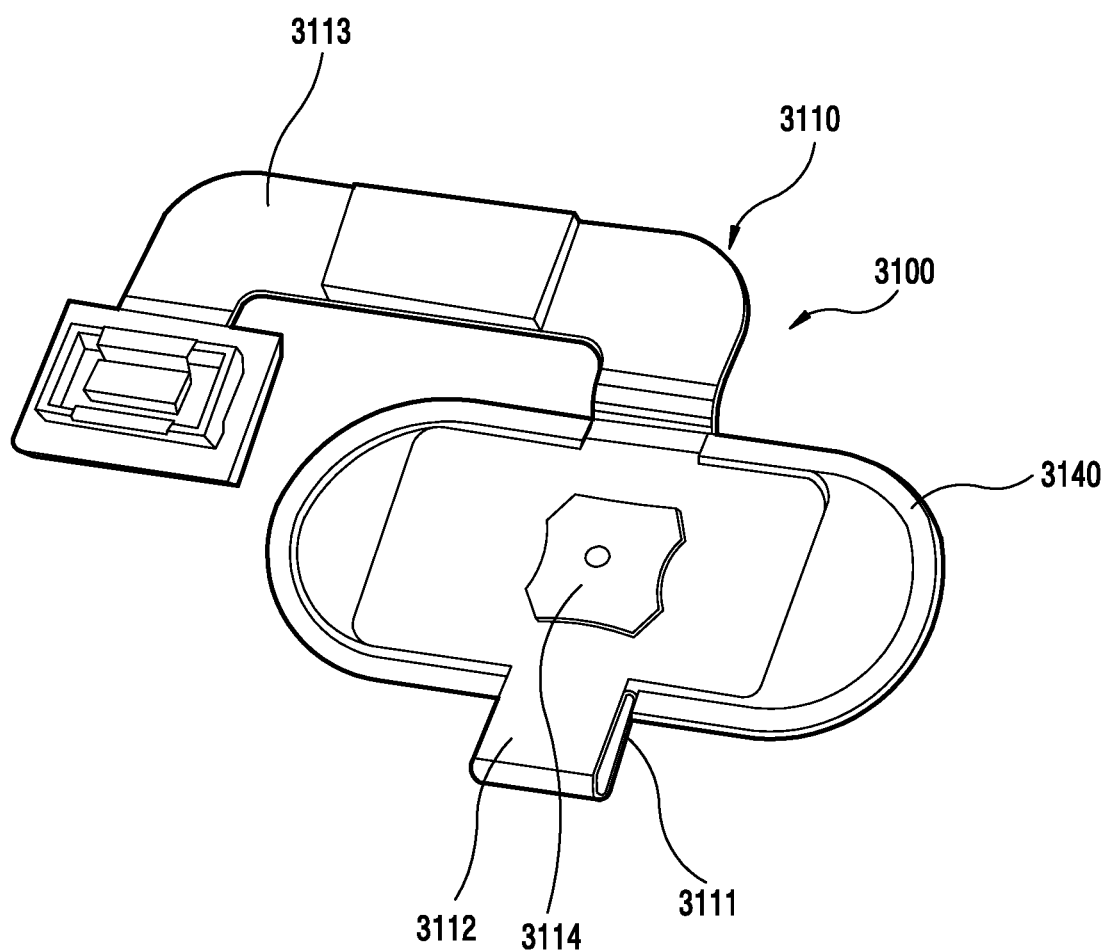
FIGS. 31A and 31B are configuration views of a home key button of an electronic device according to various embodiments of the present disclosure.
Figure 31B:
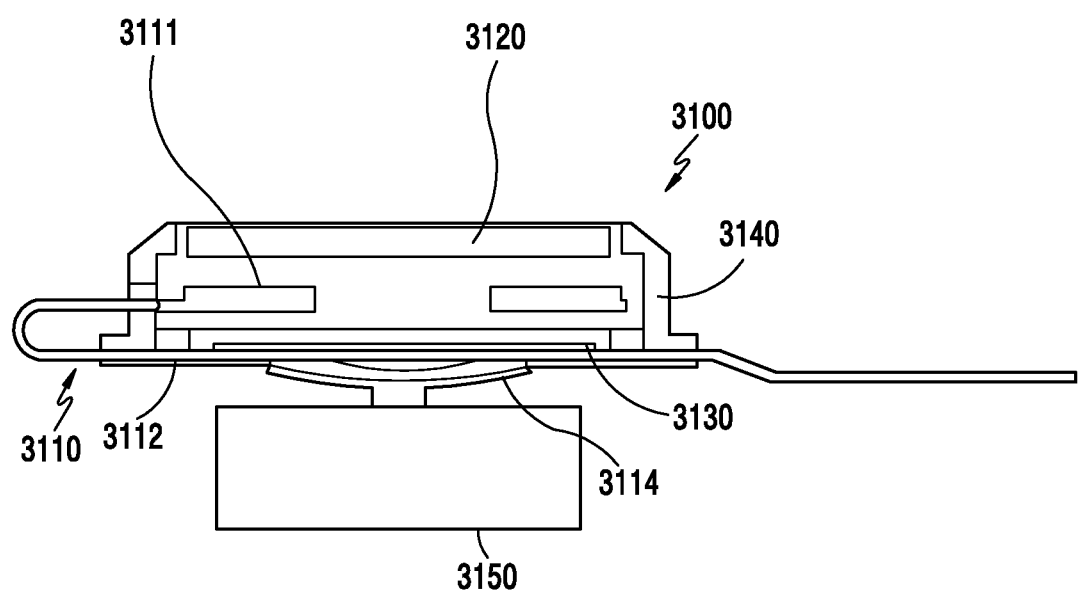

FIGS. 31A and 31B are configuration views of a home key button of an electronic device according to various embodiments of the present disclosure.

Referring to FIGS. 31A and 31B, in a home key button 3100, a fingerprint recognition sensor 3120 is disposed at the upper portion of a decoration member 3140 to be exposed, and an FPCB 3110 may be staked at the lower side thereof. According to embodiment of the present disclosure, the FPCB 3110 may include a sensor mounting unit 3111 that is molded to the decoration member 3140 and mounted together with the decoration member 3140, and a diffraction unit 3112 that is drawn out from the sensor mounting unit 3111 and extends to the bottom of the home key button 3100, thereby bypassing the home key button 3100. According to an embodiment of the present disclosure, the diffraction unit 3112 may be disposed at the center of the bottom surface of the support plate 3130 which is mounted on the bottom of the home key button 3100. According to an embodiment of the present disclosure, the FPCB 3110 may further include a connecting portion that is drawn out from the diffraction unit 3112 and is bent a plurality of times so as to avoid a display.

According to various embodiments of the present disclosure, a switching dome 3114 may be disposed at the center of the diffraction unit 3112 of the FPCB 3110. According to an embodiment of the present disclosure, the switching dome 3114 may be a metal dome. Accordingly, when the home key button 3100 is pressed after having been installed to the electronic device, the switching dome 3114 may be supported by a corresponding instrument (e.g., a bracket) 3150 of the electronic device so as to perform a switching operation.

Figure 32A:
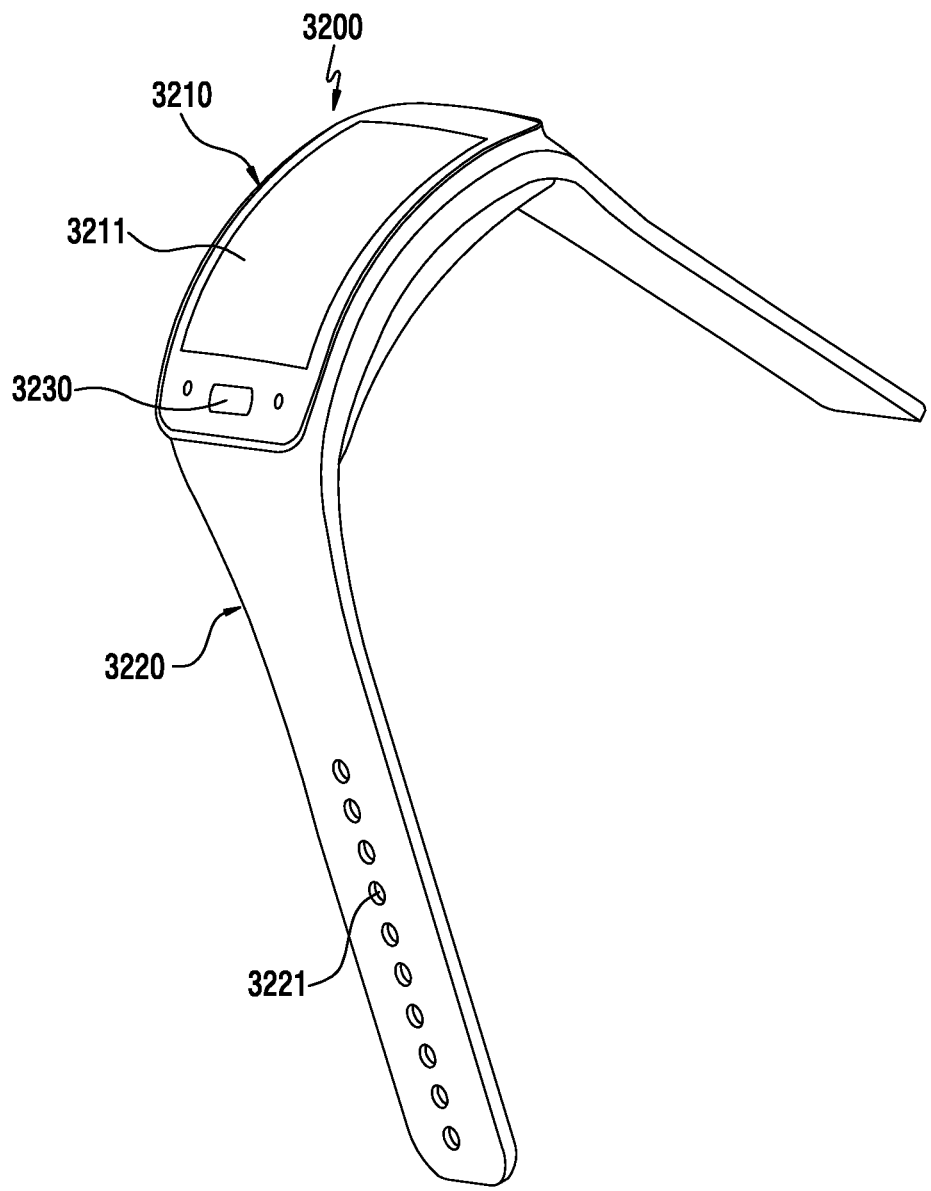
FIGS. 32A to 32C are configuration views illustrating a home key button installed to a wearable electronic device according to various embodiments of the present disclosure.
Figure 32B:
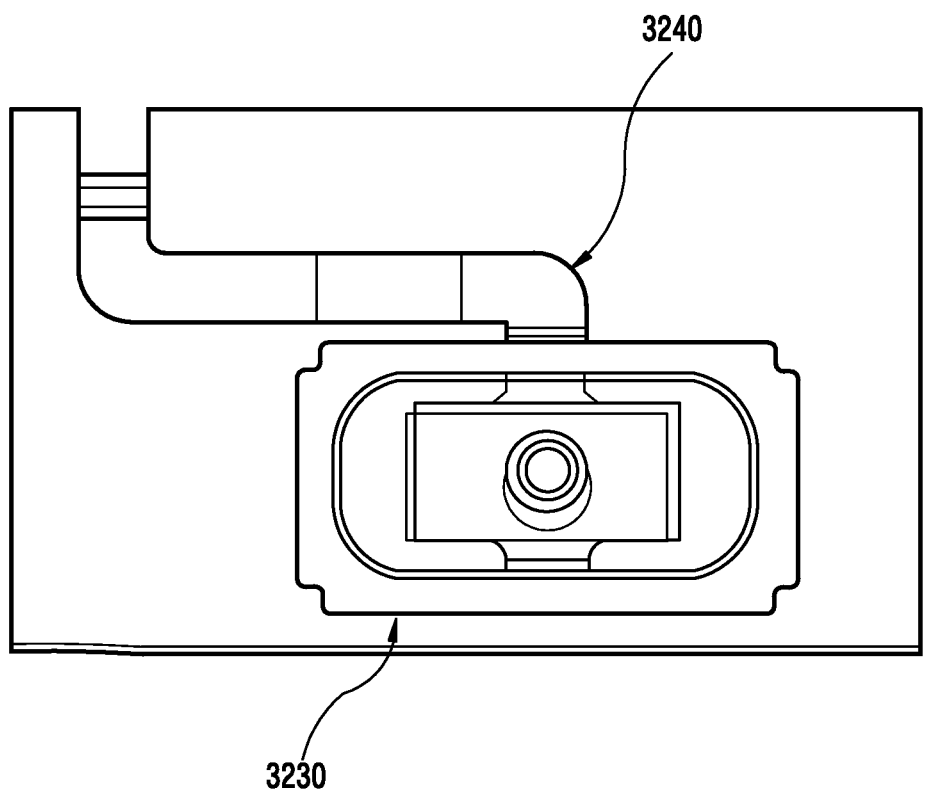
Figure 32C:
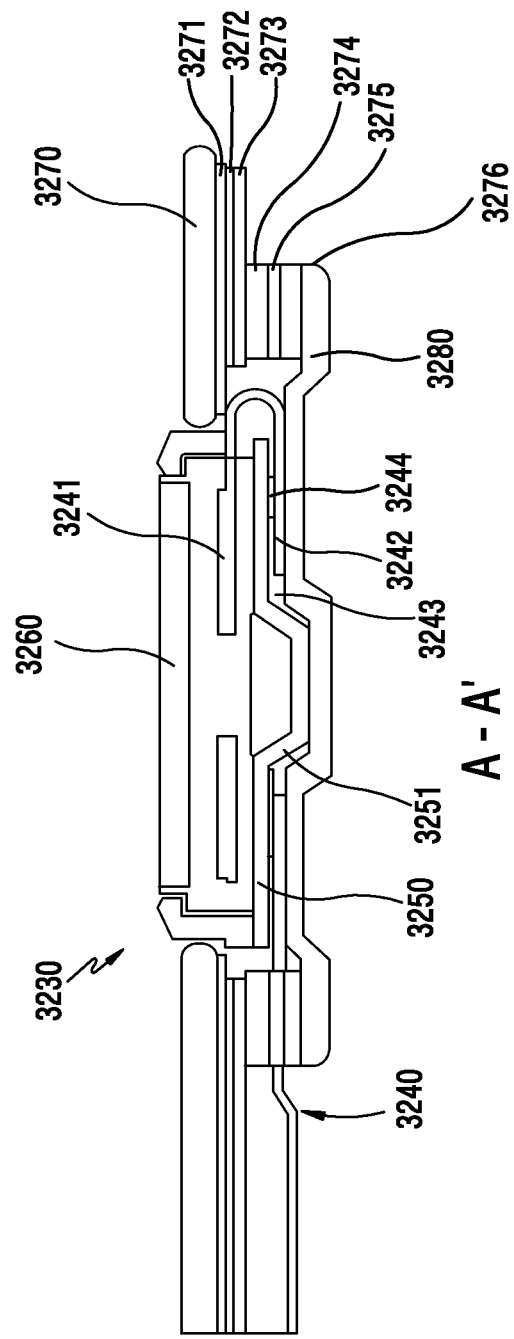

FIGS. 32A to 32C are configuration views illustrating a home key button installed to a wearable electronic device according to various embodiments of the present disclosure.

Referring to FIGS. 32A to 32C, a home key button according to an embodiment of the present disclosure may be applied to a wearable electronic device. According to an embodiment of the present disclosure, the wearable electronic device may be a wrist-wearable electronic device that may be worn on a user's wrist. According to an embodiment of the present disclosure, the home key button applied to the wearable electronic device may be implemented in a waterproof structure.

Referring to FIG. 32A, a wearable electronic device 3200 may include a main body 3210, and one pair of straps 3220 that installed to extend from the opposite ends of the main body 3210 so as to be worn on the user's wrist. According to an embodiment of the present disclosure, a display 3211 may be disposed on the main body 3210, and the home key button 3230 according to the embodiment of the present disclosure may be disposed below the display 3211. According to an embodiment of the present disclosure, the straps 3220 may have a plurality of length adjustment openings 3221 that are formed at certain intervals therein so as to guide the user to wear the main body to be suitable for the user's wrist.

Referring to FIGS. 32B and 32C, the basic configuration of the home key button 3230 applied to the wearable electronic device 3200 may include a left-right symmetric arrangement structure in which the FPCB 3240 passes through the center of the bottom surface of the home key button 3230, as described above. According to an embodiment of the present disclosure, in the home key button 3230, the fingerprint recognition sensor may be disposed in the upper portion of the decoration member to be exposed, and the FPCB 3240 may be stacked at the lower side thereof.

According to various embodiments of the present disclosure, the FPCB 3240 may include a sensor mounting unit that is molded to the decoration member and mounted together with the decoration member, and a diffraction unit that is drawn out from the sensor mounting unit and extends to the bottom side of the home key button, bypassing the home key button. According to an embodiment of the present disclosure, the diffraction unit may be disposed at the center of the bottom surface of the support plate 3250 that is installed to the bottom of the home key button. According to an embodiment of the present disclosure, the FPCB 3240 may further include a connecting portion that is drawn out from the diffraction unit 3242 and is bent a plurality of times so as to avoid the display. According to an embodiment of the present disclosure, the diffraction unit 3242 may include a through-hole 3243 that allows the actuator 3251 of the support plate 3250 to pass therethrough. According to an embodiment of the present disclosure, the diffraction unit 3242 may be fixed by being attached to the bottom surface of the support plate 3250 by a tape 3244.

According to various embodiments of the present disclosure, the home key button 3230 may include a waterproof structure because the home key button 3230 is disposed on the front surface of the main body 3210 that includes the display of the wearable electronic device 3200. According to an embodiment of the present disclosure, on the bottom portion of a window around the home key button 3230, a print film 3271, an OCA 3272, and a TSP 3273 may be sequentially stacked to be used as a part of the display.

According to various embodiments of the present disclosure, a waterproof member 3280 formed of an elastic material may be disposed to completely enclose the support plate 3250 on the bottom portion of the home key button. According to an embodiment of the present disclosure, the waterproof member 3280 may be attached to the bottom surface of the window 3270 by one or more waterproof tapes 3274 and 3276, and a PC sheet 3275. According to an embodiment of the present disclosure, the waterproof member 3280 may be formed of at least one of urethane, silicon, and rubber. Accordingly, even if the home key button 3230 is pressed, the elastic waterproof member 3280 may be pushed downwardly by the support plate 3250 while maintaining the waterproof function.

According to various embodiments of the present disclosure, the housing of the electronic device may be manufactured through dual injection molding of dissimilar materials. According to an embodiment of the present disclosure, the housing may be formed by insert-molding a non-metal member to a metal member. According to an embodiment of the present disclosure, the non-metal member may be formed of a synthetic resin member.

According to various embodiments of the present disclosure, an electronic device that includes a housing including a metal portion in at least an area thereof may require an electric connection structure between a PCB disposed in the inner space of the electronic device and an antenna radiator that is generally disposed on the outer surface of the electronic device. Because the existing electric connection structures of an antenna carrier type, a laser direct structuring (LDS) type, and an FPCB type include a flexible antenna radiator so that they can be vertically connected to a pattern surface, and in the case of a direct print antenna (DPA) directly printed on the housing, because a vertical connection to a radiation pattern is not enabled, an electric connection can be achieved by using a separate metallic press-in pin.

However, the structure using such a press-in pin will additionally require a process of applying a separate structure, and may cause deterioration of a radiation performance of the antenna when a deviation and an error occur according to the assembly. Further, there are issues in that material costs increase due to added components, and the press-in pin cannot be applied to a complicated structure portion, and a peripheral portion may be scratched or deformed in the press-in process.

Further, the FPCB and antenna carrier type of the related art is flexible so that a pattern is movable from a radiation surface of an antenna radiator to a PCB contact surface. An issue may occur in securing a space that is absolutely necessary for pattern movement.

In addition, a screw structure of the related art may cause an electric shock issue. For example, an inner current may be transferred to an outer metal housing through a screw so than the user may be exposed to electric shock. In order to prevent this, a capacitor may be disposed around the screw as an electric safety device. However, this may cause the unit cost to increase, and a separate mounting space may be needed by adopting additional components.

Various embodiments of the present disclosure may provide a housing that is capable of addressing the above-mentioned problems only by a process of manufacturing the housing using a metal member and a non-metal member.

Various embodiments may implement conductive and insulative effects at a desired position only by the processes of insert-molding and processing a non-metal member to a metal member.

Figure 33:
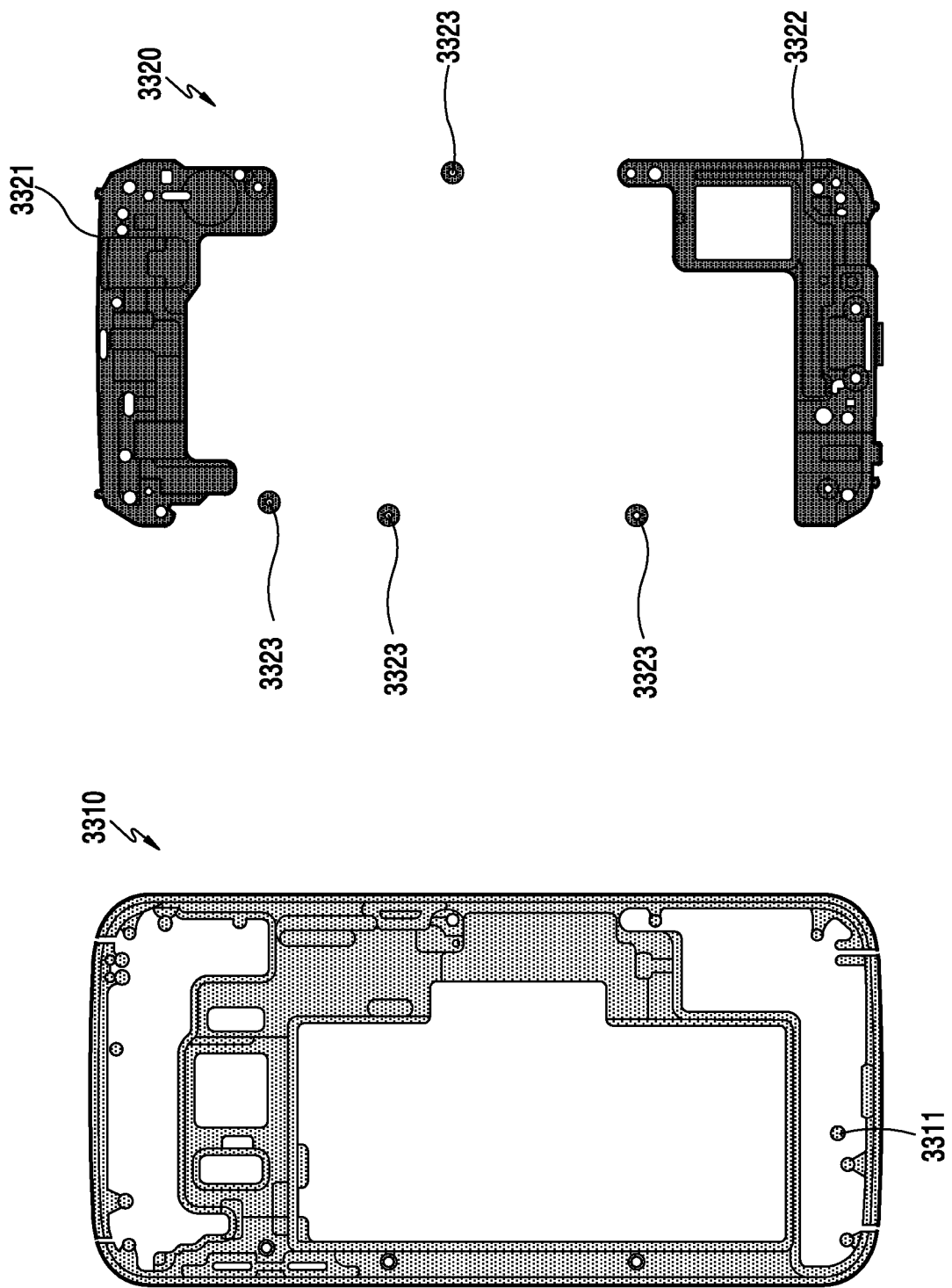
FIG. 33 is a configuration view illustrating a metal member and a non-metal member that are applied to a housing of an electronic device according to various embodiments of the present disclosure.

FIG. 33 is a configuration view illustrating a metal member and a non-metal member which are applied to a housing of an electronic device according to various embodiments of the present disclosure.

Referring to FIG. 33, the housing may include a metal member 3310 and a non-metal member 3320 that is insert-molded to the metal member 3310. According to an embodiment of the present disclosure, the metal member 3310 may include a metal bezel of the above-described housing. According to an embodiment of the present disclosure, the metal member 3310 may include a metal structure that extends to at least a part of the front surface and/or the rear surface of the electronic device from the metal bezel. According to an embodiment of the present disclosure, the metal member 3310 may include a metal filler 3311 that is independently formed in a space separate from the metal bezel.

According to various embodiments of the present disclosure, the non-metal member 3320 may include an upper member 3321 and a lower member 3322. According to an embodiment of the present disclosure, the non-metal member 3320 may include a plurality of insulation members 3323 that are applied to the metal member 3310. According to an embodiment of the present disclosure, the insulation members 3323 may contribute to the insulation between the metal member 3310 and the PCB when fixing the housing and the bracket or fixing the PCB through screws.

Figure 34A:
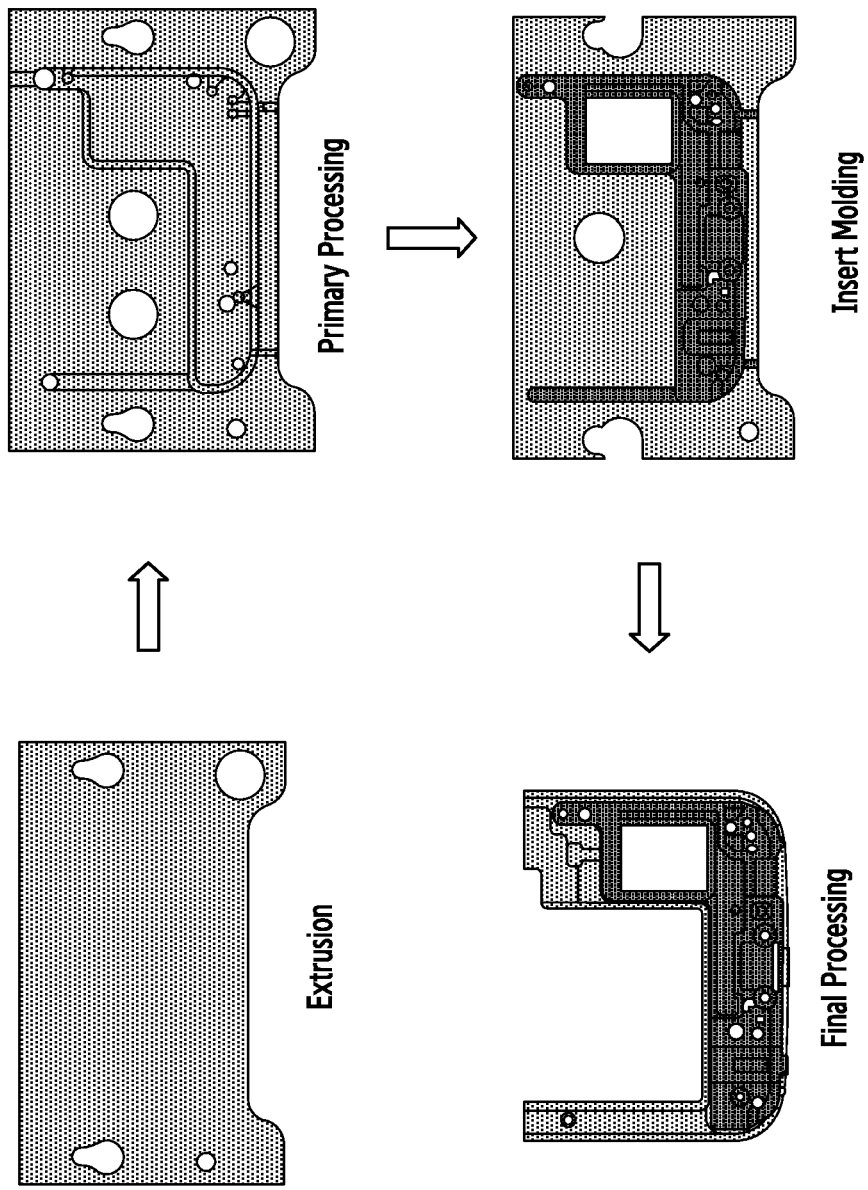
FIGS. 34A and 34B are views illustrating a process of manufacturing a housing of an electronic device according to various embodiments of the present disclosure.
Figure 34B:
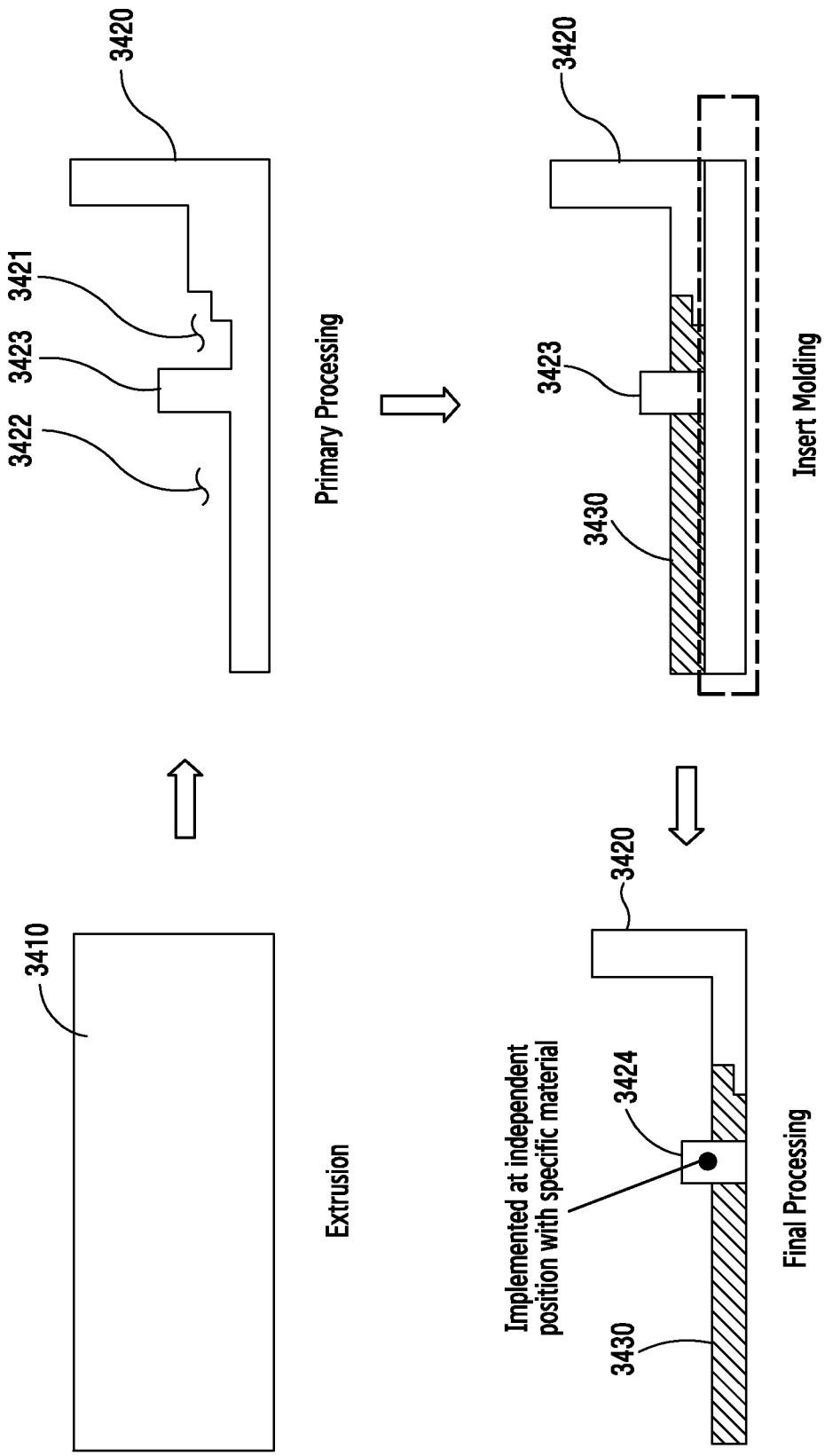
Figure 35A:
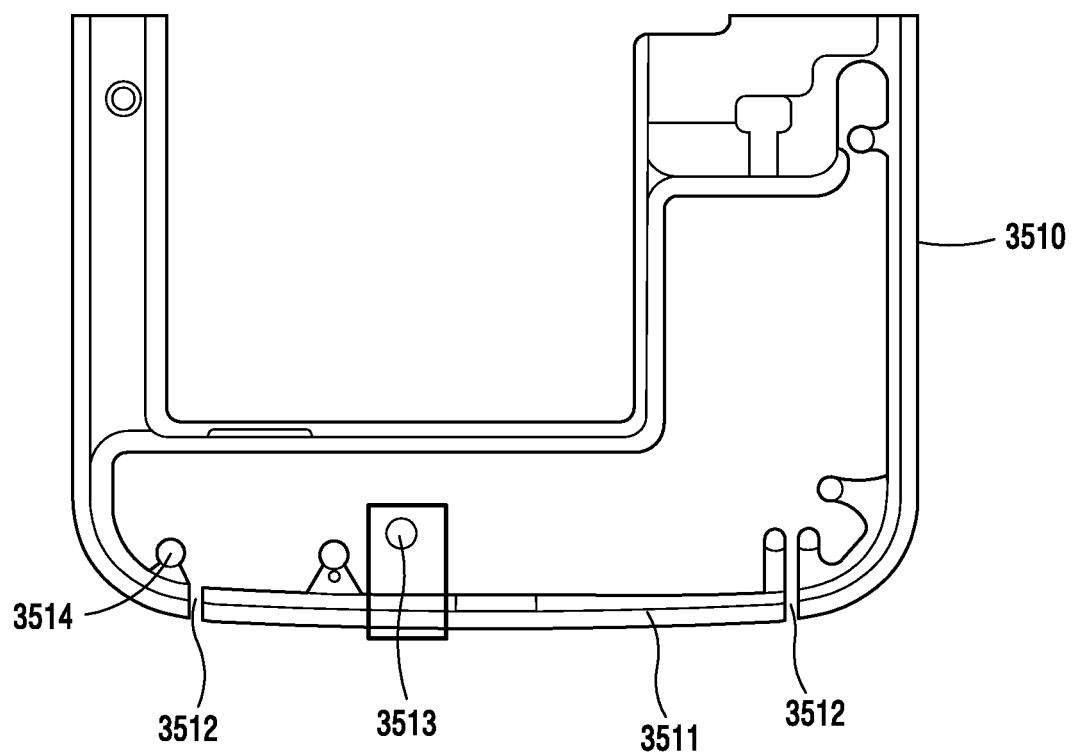
FIGS. 35A and 35B are views illustrating a configuration of a metal filler according to insert-molding of a non-metal member according to various embodiments of the present disclosure.
Figure 35B:
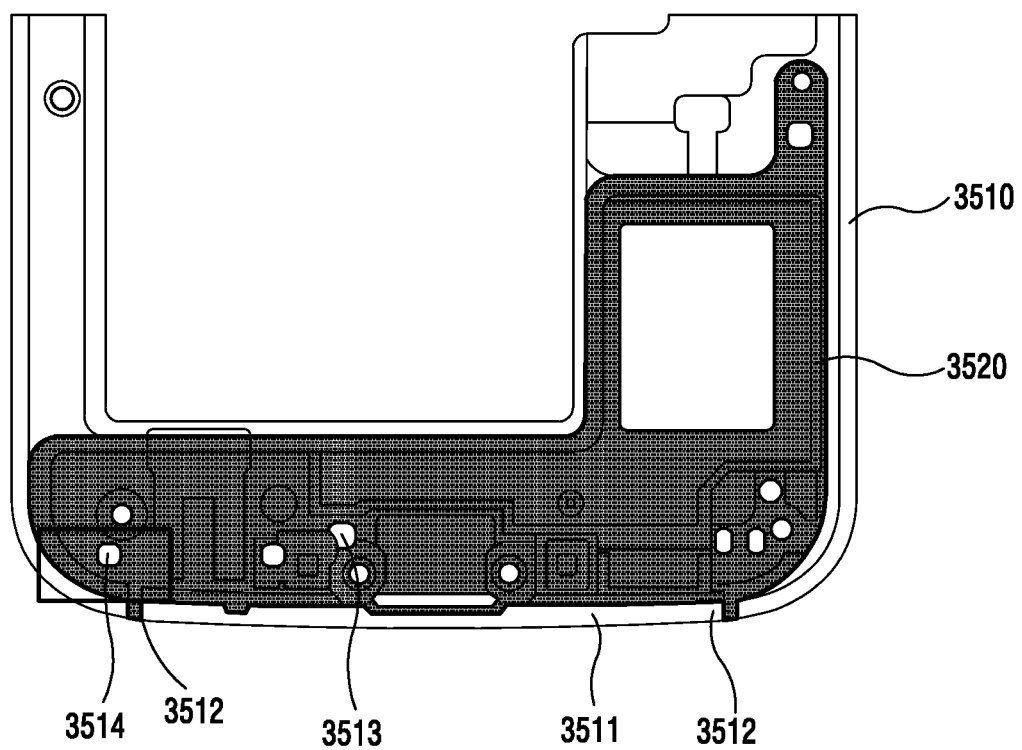

FIGS. 34A and 34B are views illustrating a process of manufacturing a housing of an electronic device according to various embodiments of the present disclosure. FIGS. 35A and 35B are views illustrating a configuration of a metal filler according to insert-molding of a non-metal member according to various embodiments of the present disclosure.

Referring to FIG. 34A, a primary processing may be performed by extruding a plate-type metal base material, and a non-metal member may be insert-molded to the primarily processed metal base material. According to an embodiment of the present disclosure, after the non-metal member is insert-molded to the metal member, a processing process may be finally performed.

Referring to FIG. 34B, a primarily processed base material 3420 may be obtained by extruding a plate-type metal base material 3410. According to an embodiment of the present disclosure, the primarily processed base material 3420 may include a protruding portion 3423 and a plurality of recessed portions 3421 and 3422 that are formed to be relatively lower that the protruding portion 3423. According to an embodiment of the present disclosure, a non-metal member 3430 may be insert-molded to at least a part of the plurality of recessed portions 3421 and 3422 and the protruding portion 3423 of the primarily processed metal base material 3420. According to an embodiment of the present disclosure, when a portion indicated by a dotted line in the insert-molded base material is processed, the protruding portion 3423 may serve as a metal filler 3423 that is disposed independently from the primarily processed base material 3420.

FIGS. 35A and 35B are views illustrating a configuration of a metal filler according to insert-molding of a non-metal member according to various embodiments of the present disclosure.

Referring to FIG. 35A, a metal member is illustrated after the insert-molding and the secondary processing of the non-metal member have been completed. Referring to FIG. 35B, a state is illustrated in which a non-metal member 3520 (e.g., a PC) is insert-molded to a metal bezel 3510. More particularly, FIG. 35B illustrates a metal bezel 3510 and a unit bezel portion 3511 that is formed by a part of the metal bezel 3510 and cut-off portions 3512 to serve as an antenna radiator.

Referring to FIGS. 35A and 35B, the metal bezel 3510 may be disposed to surround the outer periphery of the electronic device, and one pair of cut-off portions 3512 may be formed at a certain interval at the lower side of the metal bezel 3510. According to an embodiment of the present disclosure, by insert-molding the non-metal member 3520 to the cut-off portions 3512, the unit bezel portion 3511 may be formed independently from the metal bezel 3510. According to an embodiment of the present disclosure, the unit bezel portion 3511 may serve as an antenna member. According to an embodiment of the present disclosure, a part of the unit bezel portion 3511 may form a contact portion 3514 that is drawn out to extend to the inside of the electronic device. According to an embodiment of the present disclosure, by being formed independently from the metal bezel 3510 and the unit bezel portion 3511, the metal filler 3513 is operated as a metal island to be used as an electric connection member in the vertical direction between a DPA, which is disposed in the housing, and a PCB that is disposed inside the electronic device.

Figure 36A:
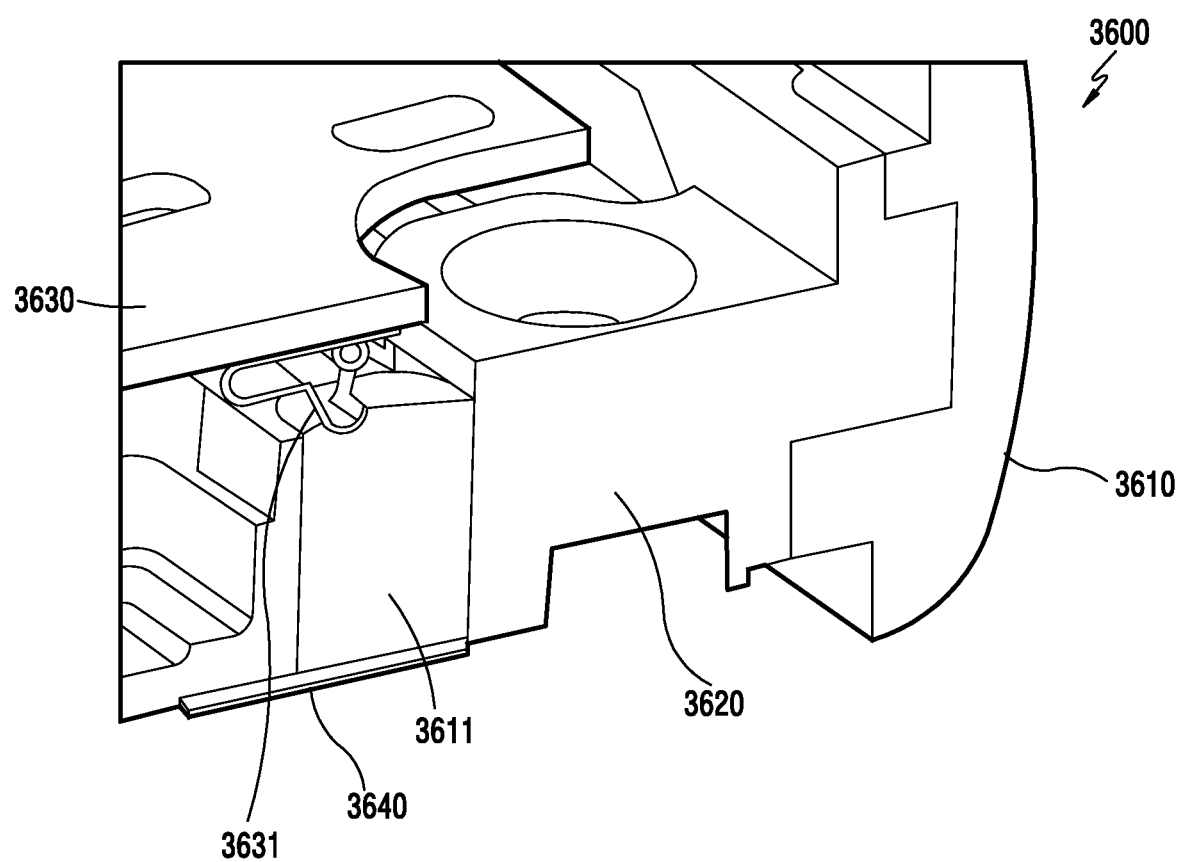
FIGS. 36A and 36B are views illustrating a state in which a metal filler is used as an electric connection member of an antenna device according to various embodiments of the present disclosure.
Figure 36B:
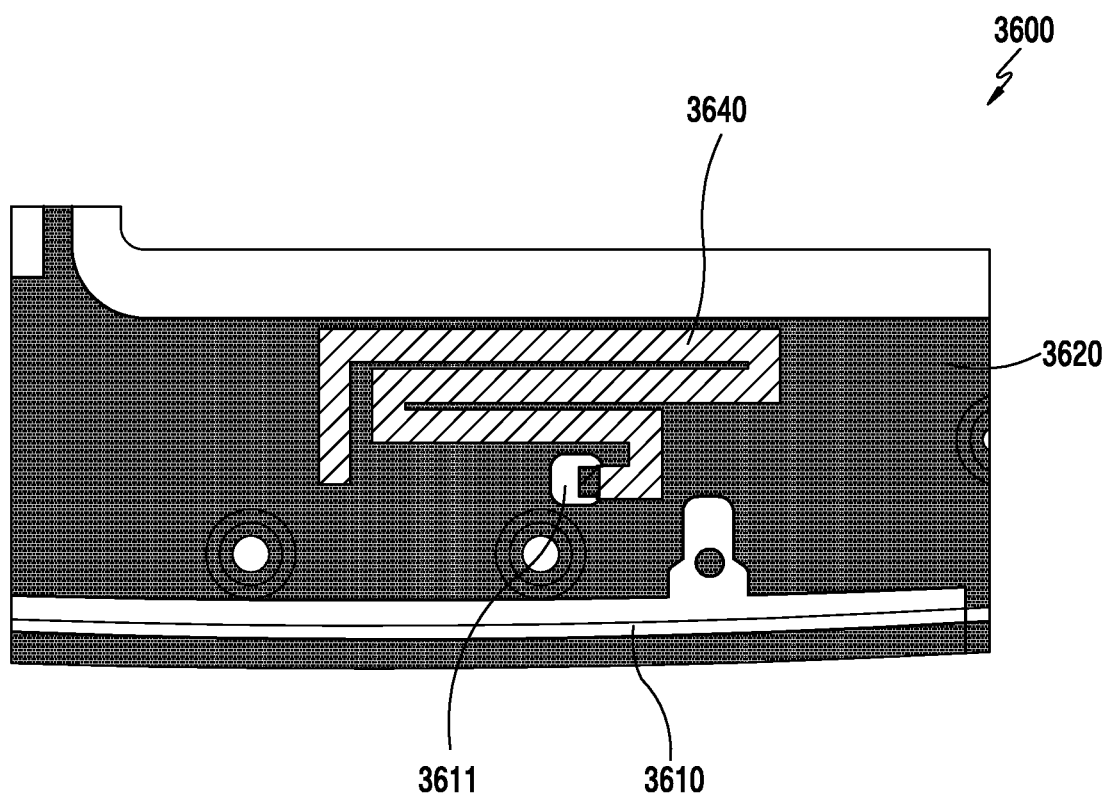

FIGS. 36A and 36B are views illustrating a state in which a metal filler is used as an electric connection member of an antenna device according to various embodiments of the present disclosure.

Referring to FIGS. 36A and 36B, a metal filler 3611 may be disposed to be isolated by a non-metal member 3620 that is insert-molded to a metal member 3610 that is used as the metal bezel. According to an embodiment of the present disclosure, the metal member 3610 and the non-metal member 3620 that is insert-molded to the metal member 3610 may be contributed as a part of the housing 3600 of the electronic device. According to an embodiment of the present disclosure, at least a part of the metal filler 3611 may be disposed to be exposed to the outer surface of the non-metal member 3620 of the housing 3600. According to an embodiment of the present disclosure, at least a part of the metal filler 3610 may be disposed to be exposed to the inner surface of the non-metal member 3620 of the housing 3600.

According to various embodiments of the present disclosure, an antenna radiator 3640 may be disposed on and attached to the outer surface of the housing 3600. Without being limited thereto, however, the antenna radiator 3540 may be formed on the outer surface of the housing 3600 by an LDS or DPA method. According to an embodiment of the present disclosure, the antenna radiator 3640 may be physically in contact with the metal filler 3611 exposed to the outer surface of the housing 3600. According to an embodiment of the present disclosure, a PCB 3630 may be disposed within the electronic device, and an electric connection member 3631 may be interposed between the PCB 3630 and the metal filler 3611. According to an embodiment of the present disclosure, as the electric connection member 3631, various members, such as a C-clip, a thin wire cable, and a flexible printed circuit, may be used.

According to various embodiments of the present disclosure, the antenna radiator (DPA) 3640 attached to the outer surface of the housing 3600 is electrically connected to the PCB 3630 through the metal filler 3611 and the electric connection member 3631, so that the antenna radiator 3640 may be used as an additional antenna radiator of the electronic device or an independent antenna radiator.

Figure 37:
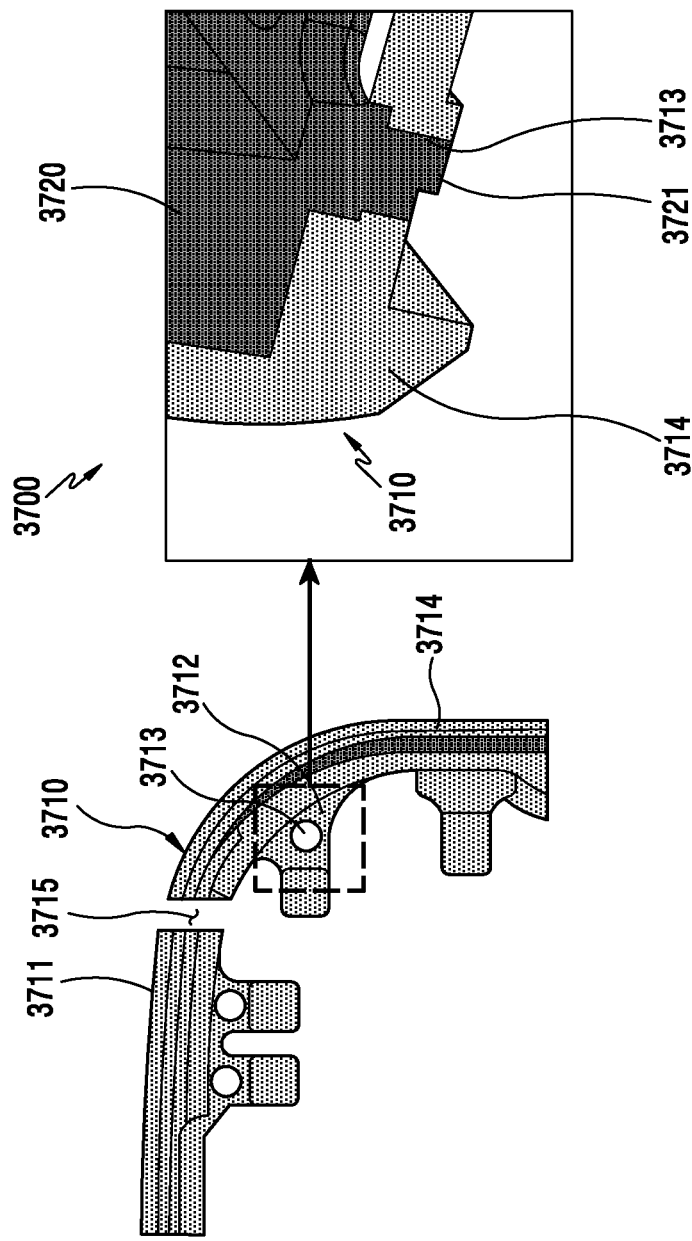
FIG. 37 is a configuration view illustrating a principal portion in a state where a non-metal member is insert-molded to a metal member according to various embodiments of the present disclosure.

FIG. 37 is a configuration view illustrating a principal portion in a state where a non-metal member is insert-molded to a metal member according to various embodiments of the present disclosure.

Referring to FIG. 37, in a housing 3700, the non-metal member 3270 may be formed on a metal member 3170 by insert-molding. According to an embodiment of the present disclosure, because the metal member 3710 and the non-metal member 3720 are bonded to each other through bonding between dissimilar materials, the metal member 3710 and the non-metal member 3720 preferably have a separate and additional binding structure. According to an embodiment of the present disclosure, the metal member 3710 may include a metal bezel 3714 and a unit bezel 3711 that is separated from the metal bezel 3714 by cut-off portions 3715. According to an embodiment of the present disclosure, the metal bezel 3714 may include a flange 3712 that is formed to extend inwardly, and at least one molding opening 3713 may be formed in the flange 3712. Accordingly, when the non-metal member 3720 is insert-molded to the metal member 3710, the non-metal member 3720 may be insert-molded to the molding opening 3713 of the metal member 3710 to serve as a non-metal filler 3721, which may support the binding force between the metal member 3710 and the non-metal member 3720 which are dissimilar materials.

Figure 38A:
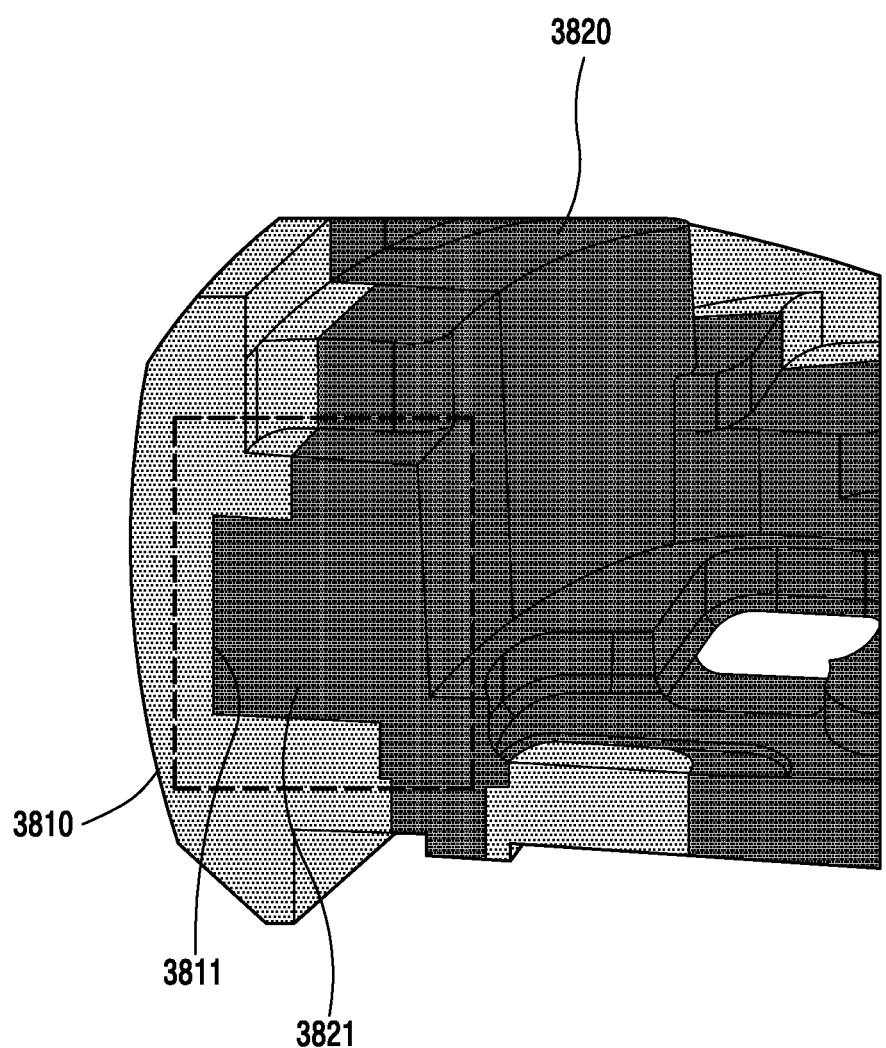
FIGS. 38A to 38C are configuration views illustrating a state in which a non-metal member is insert-molded to a metal member according to various embodiments of the present disclosure.
Figure 38B:
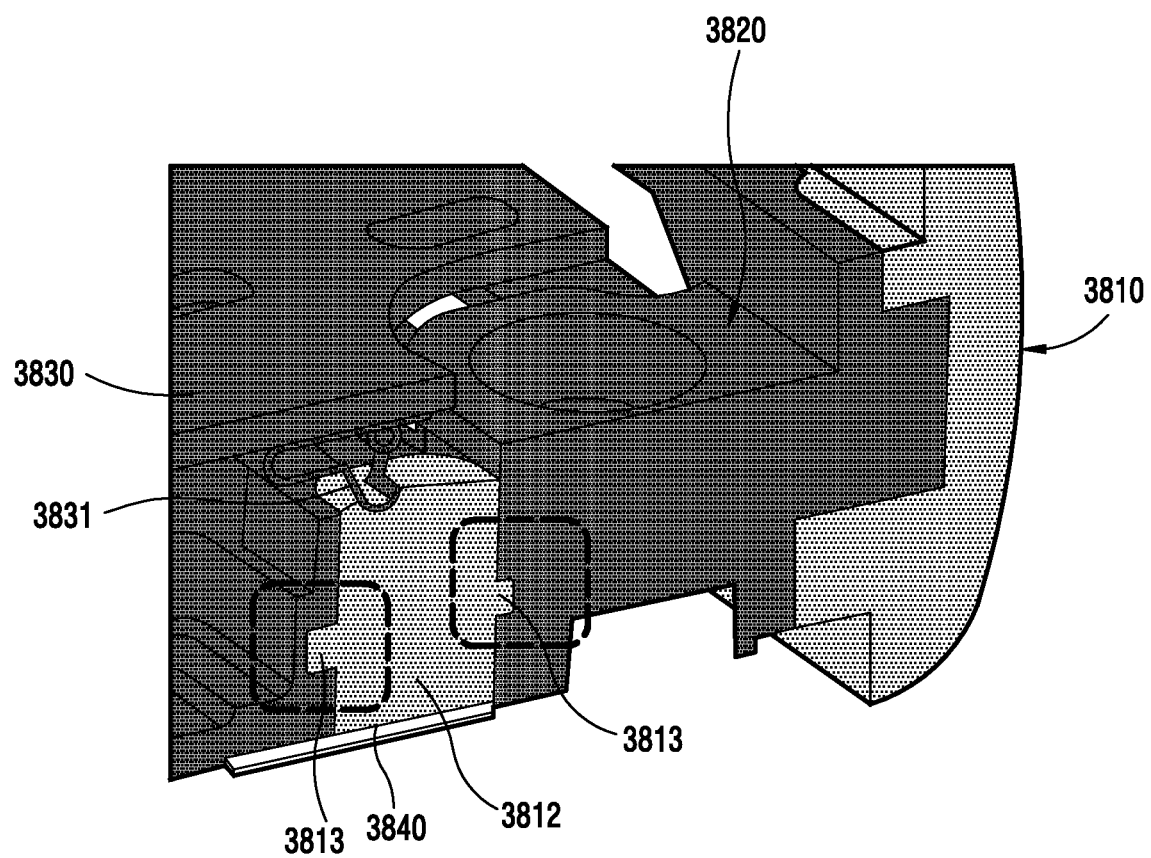
Figure 38C:
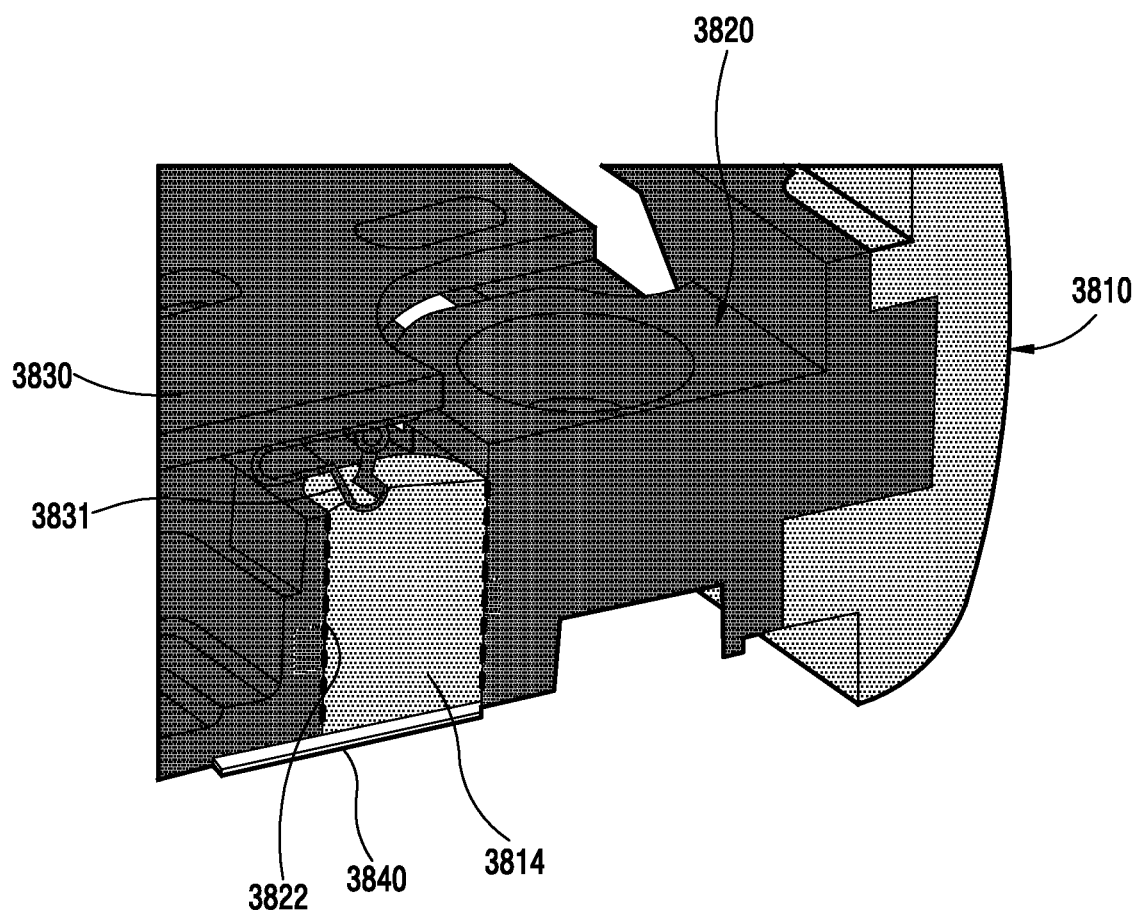

FIGS. 38A to 38C are configuration views illustrating a state in which a non-metal member is insert-molded to a metal member according to various embodiments of the present disclosure. FIGS. 38A to 38C illustrate a bonding structure for improving the adhesion force between dissimilar materials (a metal material and a non-metal material) by the structure of the metal member itself.

Referring to FIG. 38A, a recess 3811 is formed on a metal member 3810, and a non-metal member 3820 may be insert-molded to the recess 3811 to be formed as a protrusion 3821 so as to support the bonding force between dissimilar materials.

Referring to FIG. 38B, the metal member 3810 and the non-metal member 3820 are insert-molded, and a metal filler 3812, which is disposed to be spaced apart from the metal member 3810, causes a plurality of protrusions 3813 to protrude along the outer peripheral surface thereof to be molded as non-metal members. Accordingly, it is possible to prevent in advance the metal filler 3812 from being separated or moved in the vertical direction by a pressing force of an electric connection member 3831, which is installed on the PCB 3830 and has a certain elasticity.

Referring to FIG. 38C, the metal member 3810 and the non-metal member 3820 are insert-molded, and the metal filler 3814, which is disposed to be spaced apart from the metal member 3810, is also processed by performing a process, such as sanding or chemical etching, on the outer surface of the metal filler 3814 during the extrusion process. Thus, the surface frictional force can be increased so that the bonding force of the metal filler 3814 with the non-metal 3820 can be increased. Accordingly, it is possible to prevent in advance the metal filler 3821 from being separated or moved in the vertical direction by the pressing force of the electric connection member 3831, which is installed on the PCB 3830 and has certain elasticity.

Figure 39A:
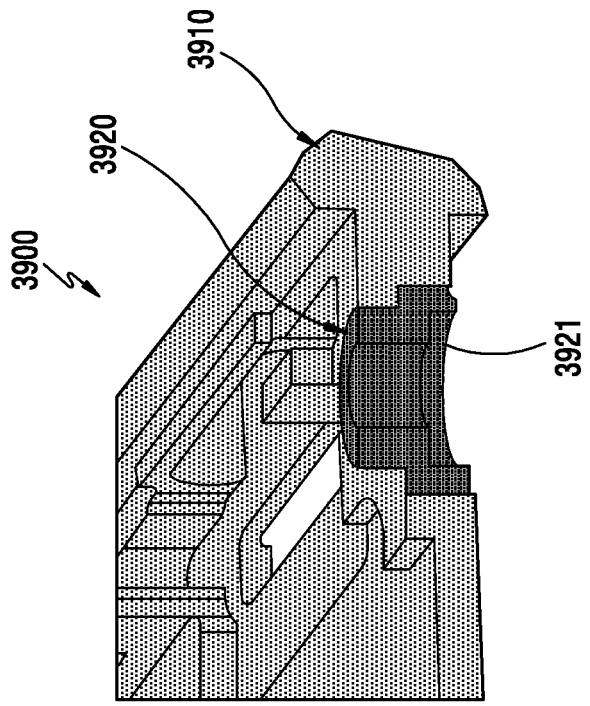
FIGS. 39A and 39B are configuration views illustrating a state in which, when a non-metal member is insert-molded to a metal member, a part of the non-metal member is used as an insulation member according to various embodiments of the present disclosure.
Figure 39A:
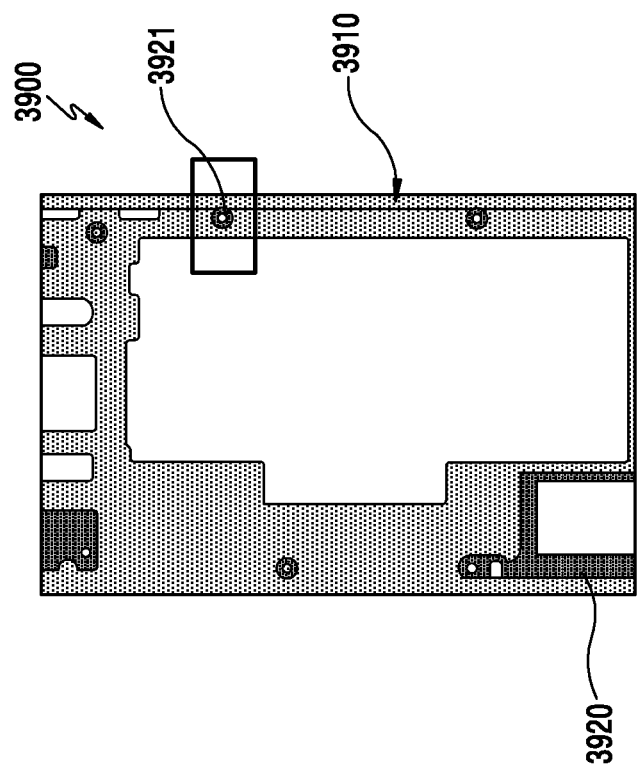
Figure 39B:
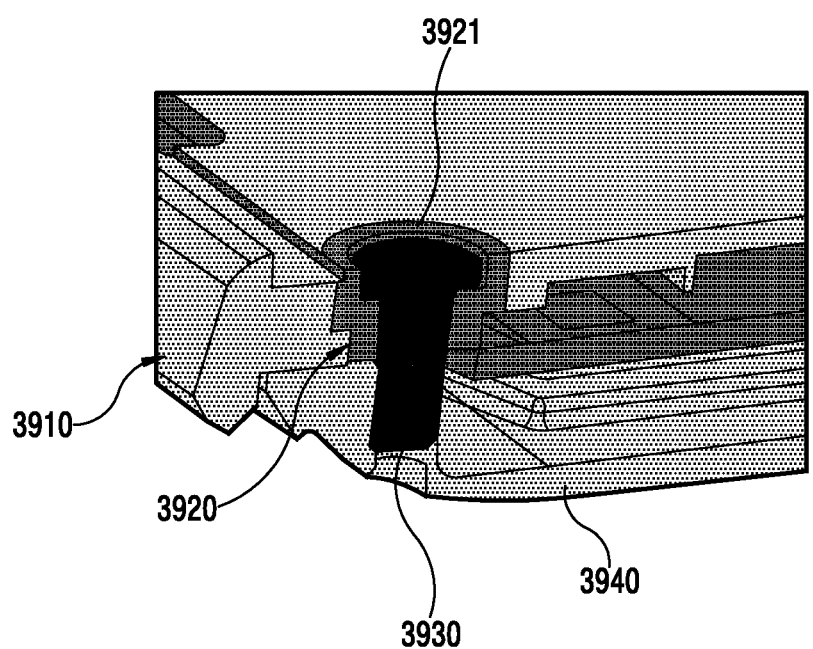

FIGS. 39A and 39B are configuration views illustrating a state in which, when a non-metal member is insert-molded to a metal member, a part of the non-metal member is used as an insulation member according to various embodiments of the present disclosure.

Referring to FIGS. 39A and 39B, a housing 3900 may be formed by insert-molding a non-metal member 3920 to a metal member 3910. According to an embodiment of the present disclosure, on the metal member 3910, one or more insulation members 3921 by the non-metal member 3920 may be disposed. According to an embodiment of the present disclosure, each insulation member 3921 may accommodate a screw 3930, and may be configured to prevent in advance an electric shock accident that is caused by electric power applied to the metal member 3910 through a structure (e.g., a PCB) 3940 within the electronic device.

According to an embodiment of the present disclosure, the insulation member 3921, which is insert-molded in the metal member 3910, may be formed in a hollow shape to have a depth that is at least the same as the entire height of the metal member 3910. According to an embodiment of the present disclosure, the screw 3930 inserted into the insulation member 3921 may be fastened to another structure 3940 of the electronic device. According to an embodiment of the present disclosure, the other structure 3940 may be a PCB, a bracket, and the like. Accordingly, the metal member 3910 is maintained in the state in which it is completely insulated from a structure within the electronic device by the insulation member 3921, so that an electric shock accident can be prevented in advance.

According to various embodiments of the present disclosure, it is possible to provide a portable electronic device that includes a front glass cover that forms a front surface of the electronic device, a rear cover that forms a rear surface of the electronic device, a bezel that surrounds a space formed by the front cover and the rear cover, a display device that is embedded in the space and includes a screen area that is exposed through the front cover, a metal structure that is positioned within the space and includes a first face that faces the front cover and a second face that faces the rear cover, a non-metal structure that is positioned within the space, which partially overlaps with the metal structure, and includes a first surface that faces the front cover and a second surface that faces the rear cover, and a metal filler that extends through a part of the non-metal structure from the first surface to the second surface of the non-metal structure.

The metal filler is formed of a material that is the same as that of the metal structure, and includes a first end portion adjacent to the first surface and a second end portion adjacent to the second surface. The first end portion and/or the second end portion are aligned to form the same planes with a part of the first surface and/or a part of the second surface, respectively.

According to various embodiments of the present disclosure, the first end portion may be aligned to form the same plane with the first surface, and the second end portion may protrude from the second surface.

According to various embodiments of the present disclosure, the first end portion may protrude from the first surface, and the second end portion may be aligned to form the same plane with the second surface.

According to various embodiments of the present disclosure, the electronic device may further include an antenna pattern adjacent to the first surface or the second surface, and the antenna pattern may be electrically connected with the metal filler.

According to various embodiments of the present disclosure, the electronic device may further include a communication circuit within the space, and the communication circuit may be electrically connected to the antenna pattern through the metal filler.

According to various embodiments of the present disclosure, the electronic device may further include a flexible conductive structure that forms an electric connection at the first end portion or the second end portion.

According to various embodiments of the present disclosure, the electronic device may further include a PCB within the space, and the PCB may be disposed to be electrically in contact with the flexible conductive structure.

According to various embodiments of the present disclosure, the PCB may be positioned between the front cover and the non-metal structure, the flexible conductive structure may be positioned between the PCB and the first end portion of the metal filler, and the electronic device may further include an antenna pattern that is positioned between the rear cover and the non-metal structure and is electrically in contact with the second end portion of the metal filler.

According to various embodiments of the present disclosure, the bezel may be formed of a metal that is the same as that of the metal structure, and may be integrally formed with at least a part of the metal structure.

According to various embodiments of the present disclosure, at least a part of the bezel may form a part of an antenna of the electronic device.

According to various embodiments of the present disclosure, it is possible to provide a portable electronic device that includes a front glass cover that forms a front surface of the electronic device, a rear cover that forms a rear surface of the electronic device, a bezel that surrounds a space that is formed by the front cover and the rear cover, a display device that is embedded within the space and includes a screen area that is exposed through the front cover, a metal structure that is positioned within the space, and includes a first face that faces the front cover and a second face that facing the rear cover, a non-metal structure that is positioned within the space, partially overlaps with the metal structure, and includes a first surface that faces the front cover and a second surface that faces the rear cover, and a non-metal filler that extends from the first face of the metal structure to the second face through a part of the metal structure. The non-metal filler is formed of a material that is the same as that of the non-metal structure, and includes a first end portion adjacent to the first face of the metal structure and a second end portion adjacent to the second face of the metal structure. The first end portion and/or the second end portion are aligned with a part of the first face and/or a part of the second face so as to form the same planes, respectively.

According to various embodiments of the present disclosure, the non-metal filler may further include a through-hole and a fastener that is inserted into the through-hole.

According to various embodiments of the present disclosure, it is possible to provide a method of manufacturing an electronic device. The method includes an operation of manufacturing a structure that includes a bezel that forms at least a part of a side surface to surround a space formed by a front cover and a rear cover of the electronic device, and a metal structure and a non-metal structure that are connected with the bezel. The operation of manufacturing the structure includes an operation of extruding a metal plate, an operation of forming at least a part of the metal structure on the extruded metal plate, in which the metal structure includes at least one protruding portion, an operation of forming at least a part of the non-metal structure by insert-molding the metal plate so as to form at least a part of the non-metal structure, in which the non-metal structure encloses at least a part of the protruding portion, and an operation of simultaneously cutting at least a part of the metal structure and a part of the non-metal structure and aligning one face of the protruding portion and a part of the surface of the non-metal structure to form the same plane.

According to various embodiments of the present disclosure, the method may further include an operation of installing the rear cover that forms the rear surface of the electronic device.

According to various embodiments of the present disclosure, the method may further include an operation of installing the front glass cover that forms the front surface of the electronic device.

According to various embodiments of the present disclosure, because the electronic device is capable of providing information that may be simultaneously output in various direction through a display that has a curved area, and through this, is capable of intuitionally transferring the information and improving the convenience of use.

Figure 40:
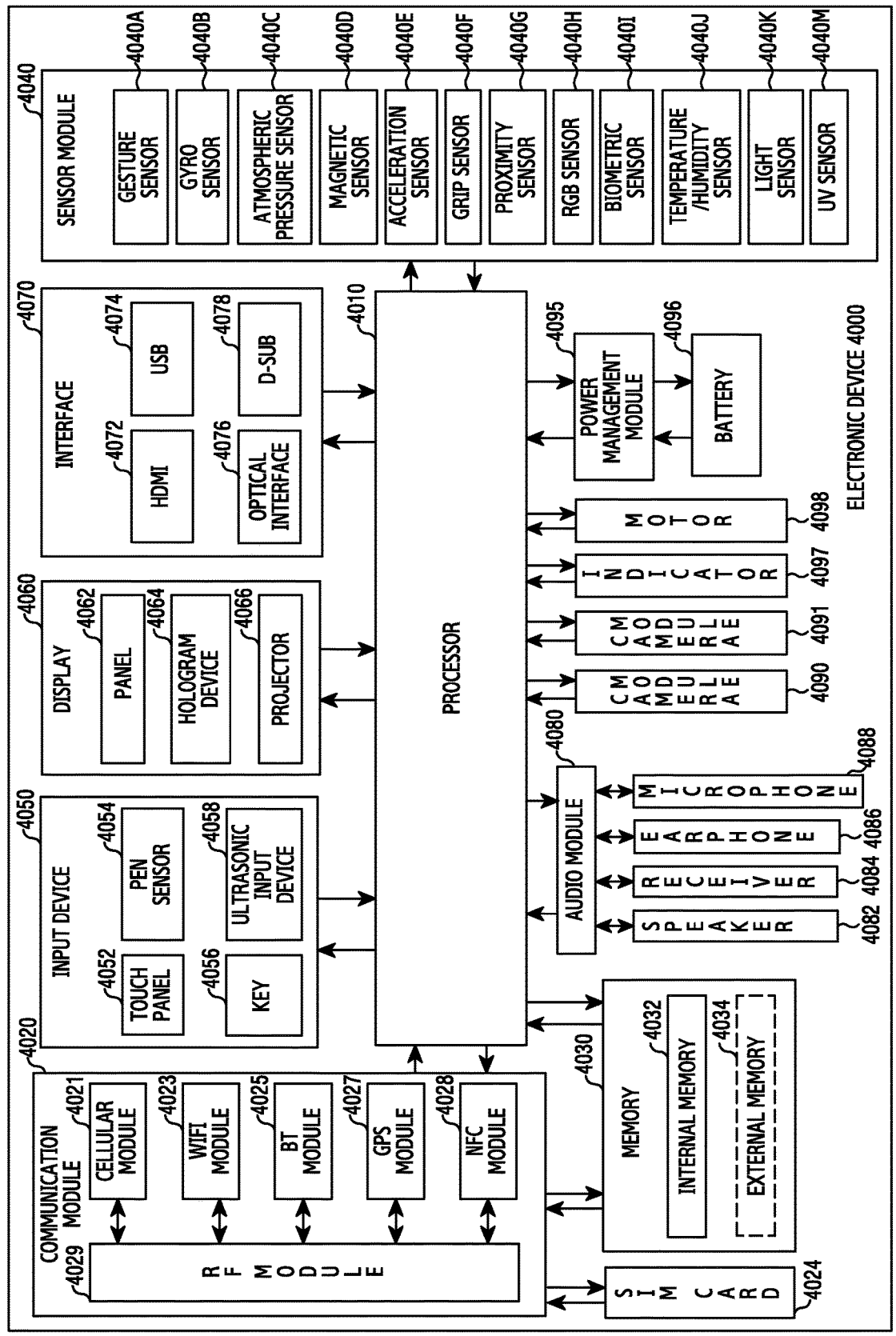
FIG. 40 illustrates a block diagram of a configuration of an electronic device according to various embodiments of the present disclosure.

FIG. 40 is a block diagram of a configuration of an electronic device according to various embodiments of the present disclosure.

Referring to FIG. 40, a configuration of election device 4000 is provided. The electronic device 4000 may entirely or partially constitute the electronic device 101 of FIG. 1, the device 200 of FIGS. 2A to 3. Electronic device 4000 includes at least one AP 4010, a communication module 4020, a SIM card 4024, a memory 4030, a sensor module 4040, an input device 4050, a display 4060, an interface 4070, an audio module 4080, a camera module 4091, a power management module 4095, a battery 4096, an indicator 4097, and a motor 4098.

The AP 4010 controls a plurality of hardware or software elements connected to the AP 4010 by driving an operating system or an application program. The AP 400 processes a variety of data, including multimedia data, and performs arithmetic operations. The AP 4010 may be implemented, for example, with a system on chip (SoC). The AP 4010 may further include a graphics processing unit (GPU).

The communication module 4020 (e.g., the communication interface 160) performs data transmission/reception in communication between other electronic devices (e.g., the second external electronic device 104 or the server 106) connected with the electronic device 4000 through a network. The communication module 4020 includes a cellular module 4021, a Wi-Fi module 4023, a Bluetooth (BT) module 4025, a GPS module 4027, an NFC module 4028, and a radio frequency (RF) module 4029.

The cellular module 4021 provides a voice call, a video call, a text service, an internet service, and the like, through a communication network (e.g., LTE, LTE-A, CDMA, WCDMA, UMTS, WiBro, and GSM, and the like). In addition, the cellular module 4021 identifies and authenticates the electronic device 4000 within the communication network by using a SIM card 4024. The cellular module 4021 may perform at least some of functions that can be provided by the AP 4010. For example, the cellular module 4021 may perform at least some of multimedia control functions.

The cellular module 4021 includes a CP. Further, the cellular module 4021 may be implemented, for example, with an SoC. Although elements, such as the cellular module 4021 (e.g., the CP), the memory 4030, and the power management module 4095, are illustrated as separate elements with respect to the AP 4010 in FIG. 40, the AP 4010 may also be implemented such that at least one part (e.g., the cellular module 4021) of the aforementioned elements is included in the AP 4010.

The AP 4010 or the cellular module 4021 (e.g., the CP) loads an instruction or data, which is received from each non-volatile memory connected thereto or at least one of different elements, to a volatile memory and processes the instruction or data. In addition, the AP 4010 or the cellular module 4021 stores data, which is received from at least one of different elements or generated by at least one of different elements, into the non-volatile memory.

Each of the Wi-Fi module 4023, the BT module 4025, the GPS module 4027, and the NFC module 4028 includes a processor for processing data transmitted/received through a corresponding module. Although the cellular module 4021, the Wi-Fi module 4023, the BT module 4025, the GPS module 4027, and the NFC module 4028 are illustrated in FIG. 40 as separate blocks, according to an embodiment of the present disclosure, at least some (e.g., two or more) of the cellular module 4021, the Wi-Fi module 4023, the BT module 4025, the GPS module 4027, and the NFC module 4028 may be included in one integrated chip (IC) or IC package. For example, at least some of processors corresponding to the cellular module 4021, the Wi-Fi module 4023, the BT module 4025, the GPS module 4027, and the NFC module 4028 (e.g., a communication processor corresponding to the cellular module 4021 and a Wi-Fi processor corresponding to the Wi-Fi module 4023) may be implemented with an SoC.

The RF module 4029 transmits/receives data, for example an RF signal. The RF module 4029 may include, for example, a transceiver, a power amp module (PAM), a frequency filter, a low noise amplifier (LNA), and the like. In addition, the RF module 4029 may further include a component for transmitting/receiving a radio wave on a free space in wireless communication, for example, a conductor, a conducting wire, and the like. Although it is illustrated in FIG. 40 that the cellular module 4021, the WiFi module 4023, the BT module 4025, the GPS module 4027, and the NFC module 4028 share one RF module 4029, according to an embodiment of the present disclosure, at least one of the cellular module 4021, the Wi-Fi module 4023, the BT module 4025, the GPS module 4027, the NFC module 4028 may transmit/receive an RF signal via a separate RF module.

The SIM card 4024 is a card which is inserted into a slot formed at a specific location of the electronic device 4000. The SIM card 4024 includes unique identification information (e.g., an integrated circuit card identifier (ICCID)) or subscriber information (e.g., an international mobile subscriber identity (IMSI)).

The memory 4030 (e.g., the memory 400) includes an internal memory 4032 or an external memory 4034.

The internal memory 4032 may include, for example, at least one of a volatile memory (e.g., a dynamic random access memory (DRAM), a static RAM (SRAM), a synchronous DRAM (SDRAM), and the like) or a non-volatile memory (e.g., a one-time programmable read-only memory (OTPROM), a PROM, an erasable and programmable ROM (EPROM), an electrically erasable and programmable ROM (EEPROM), a mask ROM, a flash ROM, a NAND flash memory, a NOR flash memory, and the like). The internal memory 4032 may be a solid state drive (SSD).

The external memory 4034 may include a flash drive, and may further include, for example, compact flash (CF), secure digital (SD), micro-SD, mini-SD, extreme Digital (xD), memory stick, and the like. The external memory 4034 may be operatively coupled to the electronic device 4000 via various interfaces.

The electronic device 4000 may further include a storage unit (or a storage medium), such as a hard drive.

The sensor module 4040 measures a physical quantity or detects an operation state of the electronic device 4000, and converts the measured or detected information into an electric signal. The sensor module 4040 includes, for example, at least one of a gesture sensor 4040A, a gyro sensor 4040B, a barometric pressure sensor 4040C, a magnetic sensor 4040D, an acceleration sensor 4040E, a grip sensor 4040F, a proximity sensor 4040G, a color sensor 4040H (e.g., a red, green, blue (RGB) sensor), a bio sensor 4040I, a temperature/humidity sensor 4040J, an illumination sensor 4040K, and a UV sensor 4040M. Additionally or alternatively, the sensor module 4040 may include, for example, an E-node sensor, an electromyography (EMG) sensor, an electroencephalogram (EEG) sensor, an electrocardiogram (ECG) sensor, a fingerprint sensor, and the like. The sensor module 4040 may further include a control circuit for controlling at least one or more sensors included therein.

The input device 4050 includes a touch panel 4052, a (digital) pen sensor 4054, a key 4056, or an ultrasonic input unit 4058.

The touch panel 4052 recognizes a touch input, for example, by using at least one of an electrostatic type, a pressure-sensitive type, and an ultrasonic type. The touch panel 4052 may further include a control circuit. In case of the electrostatic type of touch panel 4052, not only is physical contact recognition possible, but proximity recognition is also possible. The touch penal 4052 may further include a tactile layer. In this case, the touch panel 4052 provides the user with a tactile reaction.

The (digital) pen sensor 4054 may be implemented, for example, by using the same or similar method of receiving a touch input of the user or by using an additional sheet for recognition.

The key 4056 may be, for example, a physical button, an optical key, a keypad, or a touch key.

The ultrasonic input unit 4058 is a device by which the electronic device 4000 detects a sound wave through a microphone 4088 by using a pen which generates an ultrasonic signal, and is capable of radio recognition.

The electronic device 4000 may use the communication module 4020 to receive a user input from an external device (e.g., a computer or a server) connected thereto.

The display 4060 (e.g., the display 150) includes a panel 4062, a hologram 4064, or a projector 4066.

The panel 4062 may be, for example, an LCD, an AM-OLED, and the like. The panel 4062 may be implemented, for example, in a flexible, transparent, or wearable manner. The panel 4062 may be constructed as one module with the touch panel 4052.

The hologram 4064 uses an interference of light and displays a stereoscopic image in the air.

The projector 4066 displays an image by projecting a light beam onto a screen. The screen may be located inside or outside the electronic device 4000.

The display 4060 may further include a control circuit for controlling the panel 4062, the hologram 4064, or the projector 4066.

The interface 4070 includes, for example, an HDMI 4072, a USB 4074, an optical communication interface 4076, or a D-subminiature (D-sub) 4078. The interface 4070 may be included, for example, in the communication interface 160 of FIG. 1. Additionally or alternatively, the interface 4070 may include, for example, Mobile high-definition link (MHL) (not shown), SD/multi-media card (MMC) or infrared data association (IrDA).

The audio module 4080 bilaterally converts a sound and electric signal. At least some elements of the audio module 40040 may be included in the input/output interface 140 of FIG. 1. The audio module 4080 converts sound information which is input or output through a speaker 4082, a receiver 4084, an earphone 4086, the microphone 4088, and the like.

The camera module 4091 is a device for image and video capturing, and may include one or more image sensors (e.g., a front sensor or a rear sensor), a lens, an image signal processor (ISP) (not shown), or a flash (not shown, e.g., an LED or a xenon lamp).

The power management module 4095 manages power of the electronic device 4000. The power management module 4095 may include a power management IC (PMIC), a charger IC, or a battery gauge.

The PMIC may be placed inside an IC or SoC semiconductor. Charging is classified into wired charging and wireless charging. The charger IC charges a battery, and prevents an over-voltage or over-current flow from a charger. The charger IC includes a charger IC for at least one of the wired charging and the wireless charging.

The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge measures, for example, a residual quantity of the battery 4096 and a voltage, current, and temperature during charging. The battery 4096 stores or generates electricity and supplies power to the electronic device 4000 by using the stored or generated electricity. The battery 4096 may include a rechargeable battery or a solar battery.

The indicator 4097 indicates a specific state, for example, a booting state, a message state, a charging state, and the like, of the electronic device 4000 or a part thereof (e.g., the AP 4010).

The motor 4098 converts an electric signal into a mechanical vibration.

The electronic device 4000 includes a processing unit (e.g., a GPU) for supporting mobile TV. The processing unit for supporting mobile TV processes media data according to a protocol of, for example, digital multimedia broadcasting (DMB), digital video broadcasting (DVB), media flow, and the like.

Each of the aforementioned elements of the electronic device according to various embodiments of the present disclosure may consist of one or more components, and names thereof may vary depending on a type of electronic device. The electronic device according to various embodiments of the present disclosure may include at least one of the aforementioned elements. Some of the elements may be omitted, or additional other elements may be further included. In addition, some of the elements of the electronic device may be combined and constructed as one entity, so as to equally perform functions of corresponding elements before combination.

The term "module" used herein may imply a unit including one of hardware, software, and firmware, or a combination of them. The term "module" may be interchangeably used with terms, such as unit, logic, logical block, component, circuit, and the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure includes at least one of an application-specific IC (ASIC) chip, a field-programmable gate arrays (FPGAs), and a programmable-logic device, which are known or will be developed and which perform certain operations.

According to various embodiments of the present disclosure, at least some parts of a device (e.g., modules or functions thereof) or method (e.g., operations) may be implemented with an instruction stored in a computer-readable storage media for example. The instruction may be executed by one or more processors (e.g., the processor 4010), to perform a function corresponding to the instruction. The computer-readable storage media may be, for example, the memory 4030. At least some parts of the programming module may be implemented (e.g., executed), for example, by the processor 4010. At least some parts of the programming module may include modules, programs, routines, sets of instructions, processes, and the like, for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module according to various embodiments of the present disclosure may further include at least one or more elements among the aforementioned elements, may omit some of them, or may further include additional elements. Operations performed by a module, programming module, or other elements may be executed in a sequential, parallel, repetitive, or heuristic manner. In addition, some of the operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a front window forming at least part of a front surface of the electronic device, the front window comprising a first planar portion, a first bent portion, and a second bent portion, the first bent portion and the second bent portion being bent in opposite ends of the first planar portion;
   a rear surface comprising a second planar portion, a third bent portion, and a fourth bent portion, the third and fourth bent portions bent in opposite ends of the second planar portion;
   a flexible display module comprising a planar display portion visible via the first planar portion of the front window, a first bent display portion visible via the first bent portion of the front window, and a second bent display portion visible via the second bent portion of the front window; and
   a metal housing disposed along an outer periphery of the electronic device, the metal housing comprising a first side portion and a second side portion opposite the first side portion, an upper portion and a lower portion opposite the upper portion, the first side portion and the second side portion having a first height, and the upper portion and the lower portion having a second height greater than the first height,
   wherein in a corner where the first side portion and the upper portion are interconnected, and in a corner where the first side portion and the lower portion are interconnected, a height of the first side portion gradually increases both a front portion adjoined with the first bent portion and a rear portion adjoined with the third bent portion from the first height to the second height,
   wherein first bent portion extends to the first side portion, and
   wherein in the corner where the first side portion and the upper portion are interconnected, and in the corner where the first side portion and the lower portion are interconnected, the front window gradually decreases according to the increase of the height of the first side portion.

2. The electronic device of claim 1, wherein in a corner where the second side portion and the upper portion are interconnected and in a corner where the second side portion and the lower portion are interconnected, a height of the second side portion gradually increases from the first height to the second height.

3. The electronic device of claim 2,
wherein a first edge portion of the second bent portion adjoined to the corner where the second side portion and the upper portion are interconnected has a shape being conformed to the gradual change of the corner, and
wherein a second edge portion of the second bent portion adjoined to the corner where the second side portion and the lower portion are interconnected has a shape being conformed to the gradual change of the corner.

4. The electronic device of claim 1, wherein the metal housing is a metal bezel.

5. The electronic device of claim 4, wherein the metal bezel is disposed to extend to at least a part of a rear surface of the electronic device, which is continuous to the outer periphery.

6. The electronic device of claim 4, wherein the metal bezel defines at least a part of a thickness of the electronic device along the outer periphery of the electronic device.

7. The electronic device of claim 4, wherein the metal bezel is formed in a closed loop shape.

8. The electronic device of claim 1,
wherein a first edge portion of the first bent portion adjoined to the corner where the first side portion and the upper portion are interconnected has a shape being conformed to the gradual change of the corner, and
wherein a second edge portion of the first bent portion adjoined to the corner where the first side portion and the lower portion are interconnected has a shape being conformed to the gradual change of the corner.

9. The electronic device of claim 1, wherein the first bent portion and the second bent portion of the front window are configured as a part of side surfaces of the electronic device together with the first side portion and the second side portion of the metal housing, respectively.

10. The electronic device of claim 1, wherein the flexible display module has a shape corresponding to that of the front window.

11. The electronic device of claim 1, further comprising a rear window forming a rear surface of the electronic device.

12. The electronic device of claim 11, wherein the rear window comprises a central planar portion and first and second bent portions disposed on either side of the planar portion, respectively.

13. The electronic device of claim 11, wherein the front window is disposed on a front surface of the metal housing, and the rear window is disposed on the rear surface of the metal housing.

14. The electronic device of claim 1, further comprising at least one of a microphone device, a speaker device, an interface connector port, and an ear jack hole disposed in the lower portion of the metal housing.

15. The electronic device of claim 1, further comprising at least one of a socket device, an infrared sensor module, and an auxiliary microphone device disposed in the upper portion of the metal housing.

* * * * *